April 4, 1967 C. A. WASHBURN 3,312,779
COLOR TELEVISION IMAGE REPRODUCTION SYSTEM
Filed Aug. 10, 1964 24 Sheets-Sheet 1

INVENTOR
CLAYTON A. WASHBURN
BY John A. Harvey
ATTORNEY

COLOR SEPARATION — DEFLECTION WAVEFORMS

CONTROL WAVEFORM SWITCHING

CHROMINANCE PLANE
MAX. WHITE

COLOR CONE

CONVERTED SIGNAL COMPOSITION

SATURATION SIGNAL

April 4, 1967 C. A. WASHBURN 3,312,779

COLOR TELEVISION IMAGE REPRODUCTION SYSTEM

Filed Aug. 10, 1964 24 Sheets-Sheet 9

AUTOMATIC POSITION ERROR CORRECTION SYSTEM

HORIZONTAL AFC CIRCUIT WITH ERROR POSITION PHASE CONTROL

CRT SCREEN-EDGE DETAILS

HORIZONTAL DEFLECTION & HV ANODE SUPPLY

April 4, 1967 C. A. WASHBURN 3,312,779

COLOR TELEVISION IMAGE REPRODUCTION SYSTEM

Filed Aug. 10, 1964

24 Sheets-Sheet 17

COLOR TELEVISION IMAGE REPRODUCTION SYSTEM

Filed Aug. 10, 1964

United States Patent Office 3,312,779

Patented Apr. 4, 1967

3,312,779

COLOR TELEVISION IMAGE REPRODUCTION SYSTEM

Clayton A. Washburn, 24 Andrea Lane, Thornwood, N.Y. 10594

Filed Aug. 10, 1964, Ser. No. 389,824
28 Claims. (Cl. 178—5.4)

This application is a continuation-in-part of application Ser. No. 358,700, filed Apr. 10, 1964, now abandoned.

The present invention relates to color television image reproduction systems and, more particularly, to reproduction systems which employ a cathode-ray form of image reproduction tube having a single cathode-ray gun.

Present day color television transmissions provide for the transmission of both a luminance signal, conveying information required to reproduce a monochrome image, and a chrominance signal conveying color information required to convert the monochrome image to one in color.

A television image is conventionally reproduced by use of a cathode-ray form of image reproducing tube. One such tube in widespread current use for reproduction of color television images is one having three cathode-ray guns for creation of three individual and mutually independent cathode-ray beams. Each of these is focused to a fine point at the image reproduction surface, and all are deflected in unison to trace a raster of interlaced parallel fine-line scan traces on the screen structure of the tube. The screen structure includes a so-called shadow mask supported a small distance from the fluorescent screen of the tube. The shadow mask is fabricated of thin sheet metal having parallel rows of closely spaced small apertures through which each cathode-ray beam is projected at an angle individual to that beam and different from the angle of another beam. The fluorescent screen itself is comprised by clusters of small dots of phosphor materials, there being one such cluster associated with each aperture of the shadow mask and each cluster including three differing phosphor materials fluorescing in individual ones of the three primary colors. The orientation of the dots in the clusters is such that each cathode-ray beam when projected through the apertures of the shadow mask excites only the dots of an individual primary color. The three cathode-ray beams are concurrently modulated in intensity by the television luminance signal to reproduce a monochrome image in the absence of the chrominance signal. They are individually modulated in intensity by individual signals derived from the chrominance signal and representative of the three primary colors in the image, and this additional modulation serves to convert the monochrome signal to one in color. This form of image reproducing tube is not only of relatively large size and excessively complex and costly in construction, requiring high precision in the positioning of the shadow mask apertures in relation to the phosphor dot clusters of the fluorescent screen, but is undesirably characterized by reduced light output to the extent that all of the electrons of each cathode-ray beam cannot pass through the shadow mask apertures. A color television receiver using such tube is thus more costly than desired, requires a scanning yoke of relatively large physical size and precise construction, and is characterized by numerous undesirable and relatively unstable critical adjustments to enusure coordinated focus and scanning in unison of the three cathode-ray beams.

To avoid the high cost and complexity of a color television receiver employing a triple-gun form of cathode-ray image reproducing tube as last described, it has been proposed that the image reproducing tube have a single electron gun and a fluorescent screen comprised by vertically displaced sets of horizontally oriented phosphor stripes. The phosphor stripes of each set are composed of individual ones of three phosphor materials fluorescing in individual ones of the thre primary colors. The luminance and chrominance signals modulate the intensity of the single cathode-ray beam, and interlaced grids of horizontally oriented conductors are spaced a small distance from the fluorescent screen and are energized at the chrominance carrier signal frequency. The electrical fields created by these energized grids effect color separation by causing the horizontally scanned cathode-ray beam to have a small vertical deflection movement and thus impact the phosphor stripes successively in each set and in synchronism and according to the transmission of chrominance information. This proposed arrangement not only requires a more costly and complex image reproducing tube construction than is desirable, especially in respect the precision of alignment of the deflection grid structure in relation to the alignment of the phosphor stripes, but involves difficult adjustments to attain adequate color image reproduction and has the serious disadvantage that excessively large amounts of radio frequency power are required for excitation of the deflection grid structure. It is difficult to prevent this large radio frequency power from radiating and thus creating severe interference with the operation of other television receivers.

One further form of proposed color television reproducing systems meriting brief consideration is one also employing a single-gun cathode-ray image reproducing tube. The fluorescent screen of this tube has successive sets of horizontally oriented three-color phosphor stripes, and a conductive stripe is laid adjacent to and behind a corresponding one of the phosphors in each color set. A pulse index electrical signal is generated by secondary electron emission from each conductive stripe as the cathode-ray beam is deflected across it. This pulse signal is used in the receiver to control the phase of the chrominance signal information so that the primary color representative signals of the latter are maintained in synchronous relation to a vertical component of scanning movement of the cathode-ray beam across successive ones of the phosphor color stripes in each set. Color is thus added to what would otherwise be the reproduction of a monochrome image by luminance signal intensity modulation of a cathode-ray beam. While this arrangement enables a relatively simple image reproducing tube construction, the color receiver itself is complicated by required addition of radio-frequency synchronizing-control circuitry, there are severe problems in avoiding undesired color contamination, additional problems are created by the necessity of isolating the cathode-ray beam index information from the picture signal information, and there is an undesirably low time (duty cycle) utilization of the single-gun cathode-ray beam.

It is an object of the present invention to provide a new and improved color television image reproducing system which avoids one or more of the disadvantages and limitations of prior such systems.

It is a further object of the invention to provide a color television image reproducing system of substantially simplified construction and reduced cost, and one exhibiting high reliability and stability of its operational characteristics over prolonged periods of use.

It is an additional object of the invention to provide a novel color television image reproduction system which not only enables substantial simplification and cost reduction in fabricating the color television picture tube used for color and monochrome image display, reduces the physical size and avoids the critical adjustments required in using prior forms of color television picture tubes, but also one which permits attainment of substantial improvement in the color, brilliance and resolution with which a color image may be reproduced.

It is yet a further object of the invention to provide an improved color television image reproducing system which attains the foregoing enumerated objects by employing a new and simplified manner of accomplishing effective separation and use of the color signals conveying the required image chrominance information.

Other objects and advantages of the invention will appear as the detailed description thereof proceeds in the light of the drawings forming a part of this application, and in which.

Figure 1:
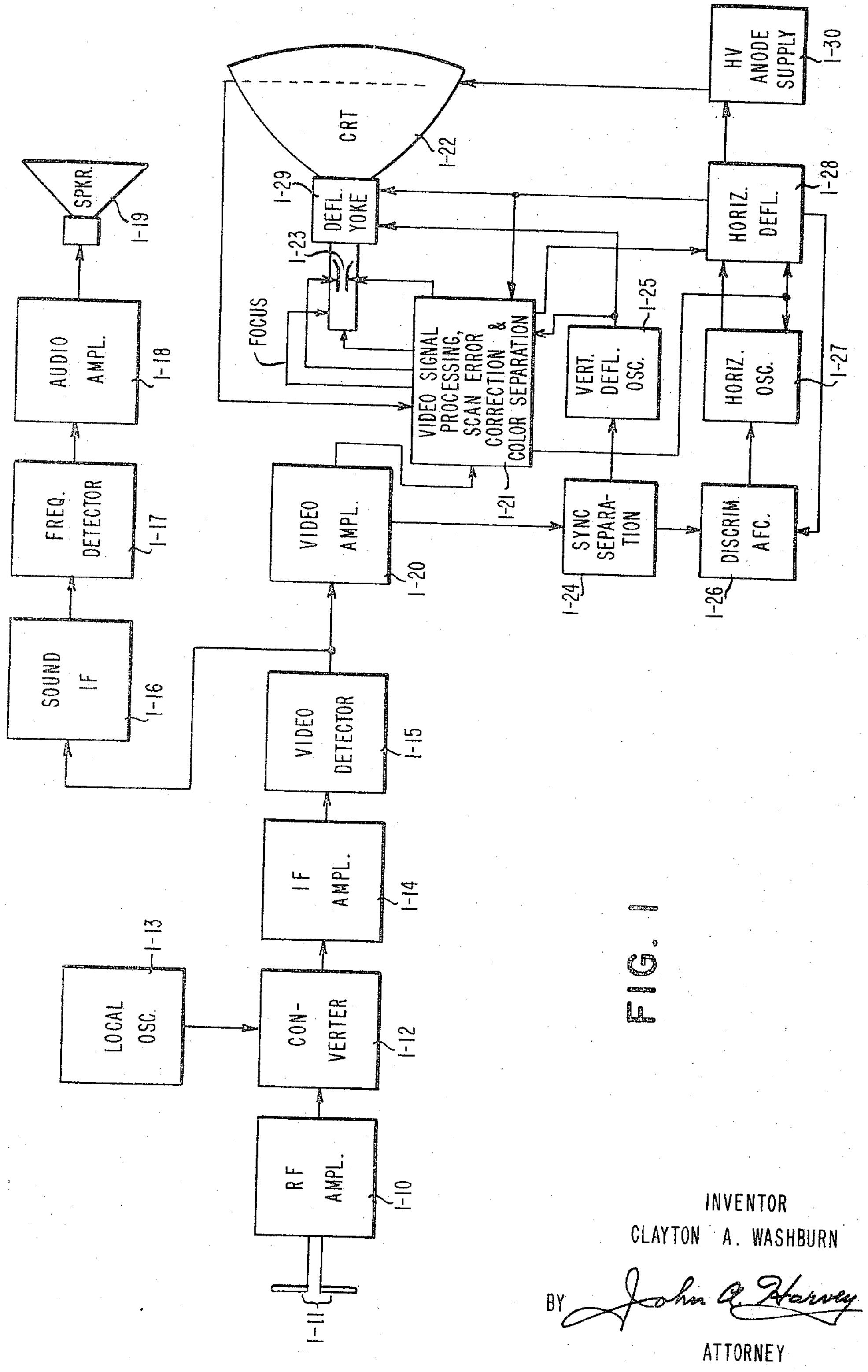
FIG. 1 represents in block diagram a complete color television image reproduction system embodying the present invention.
Figure 2:
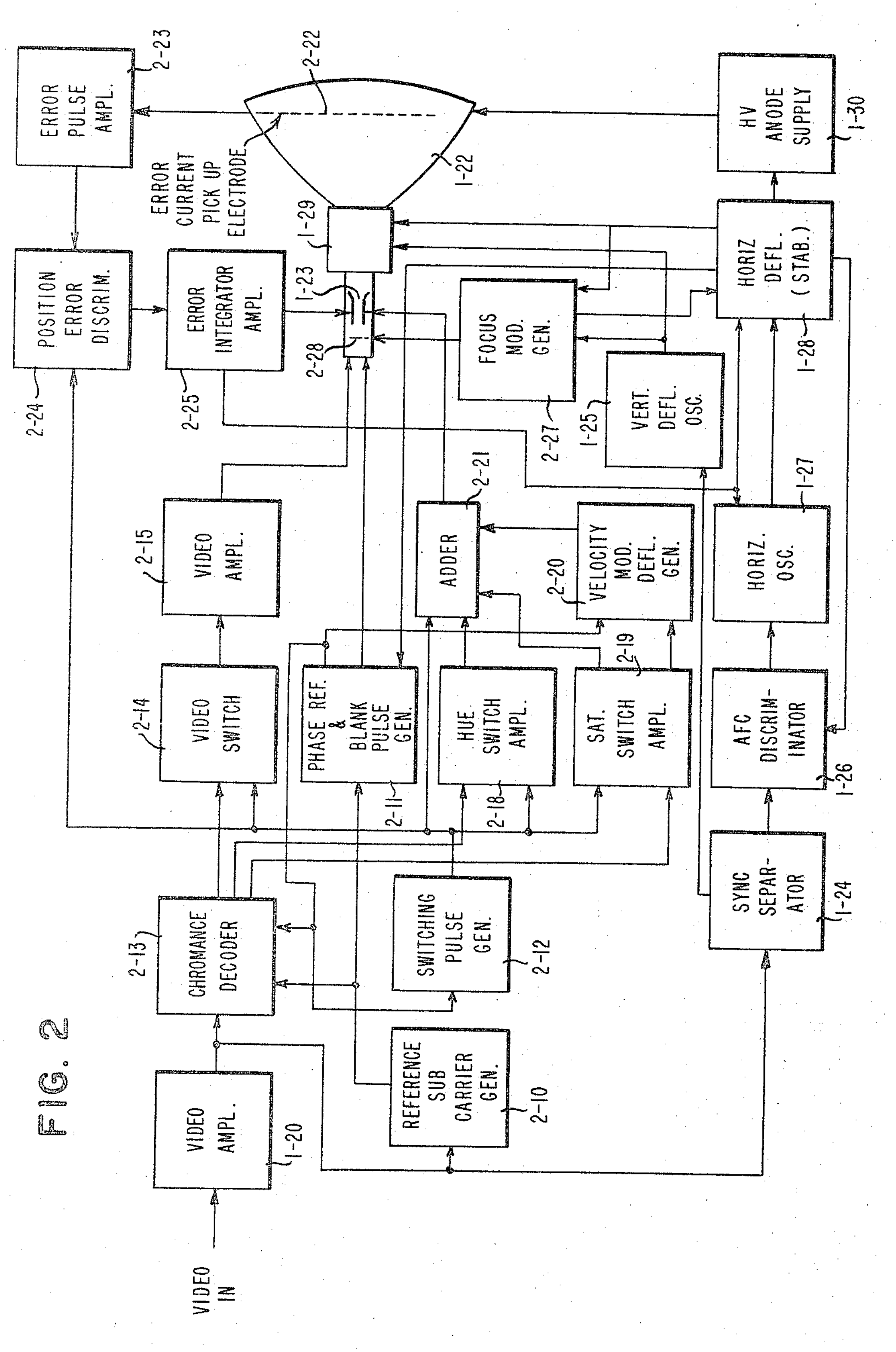
FIG. 2 represents in block diagram the construction of a chrominance signal translation and deflection control unit used in the FIG. 1 image reproduction system.
Figure 3:
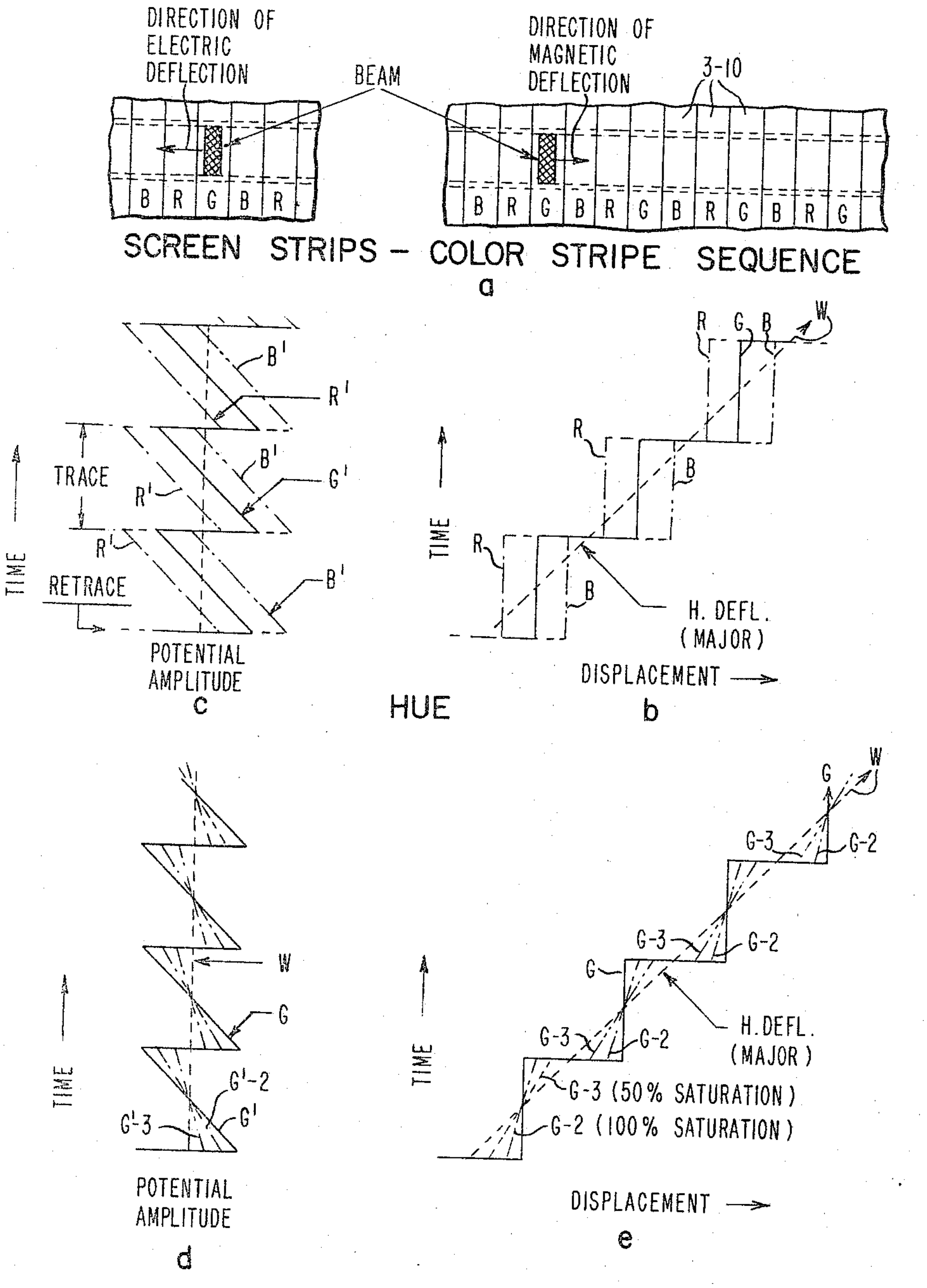
Figure 4:
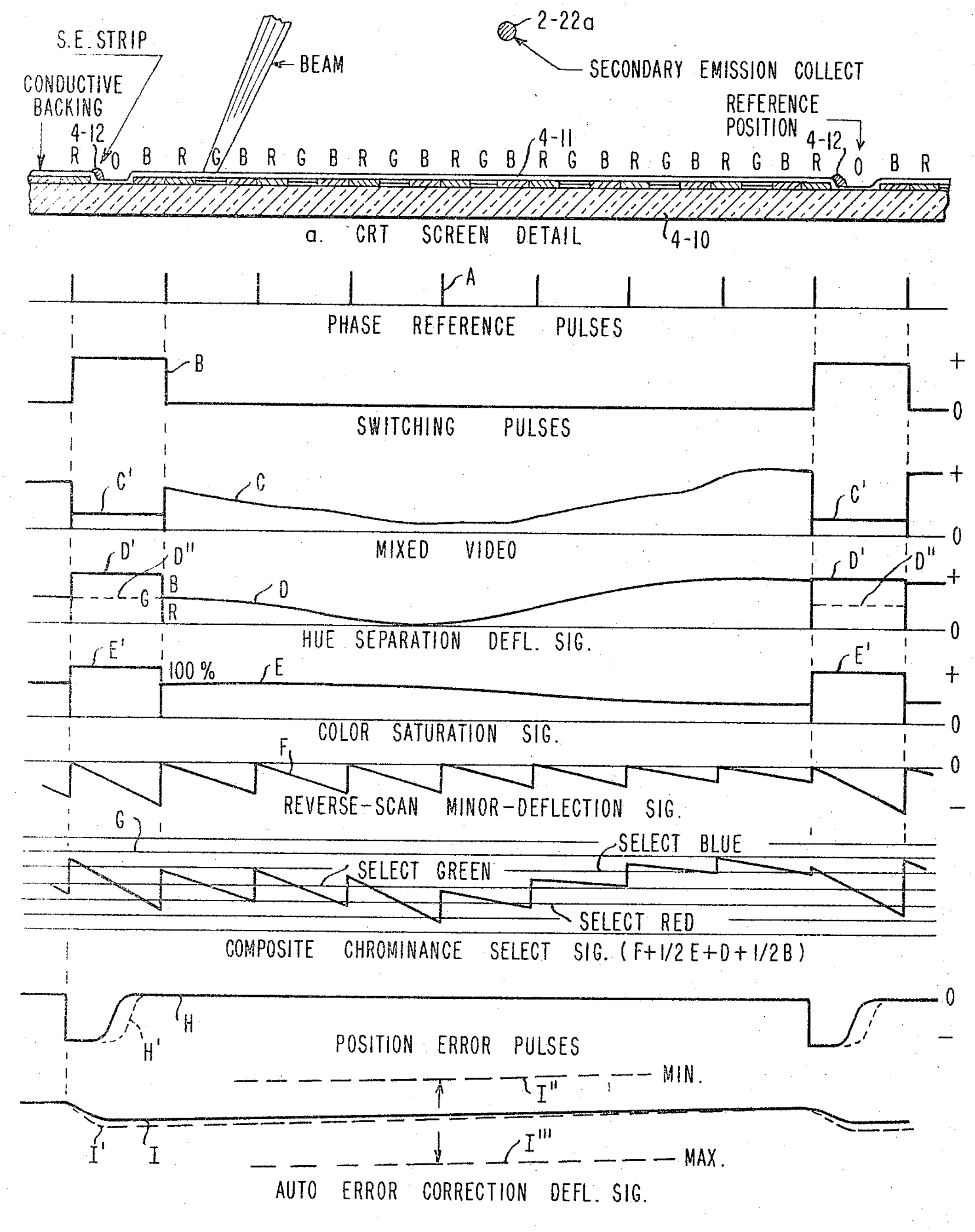
Figure 5:
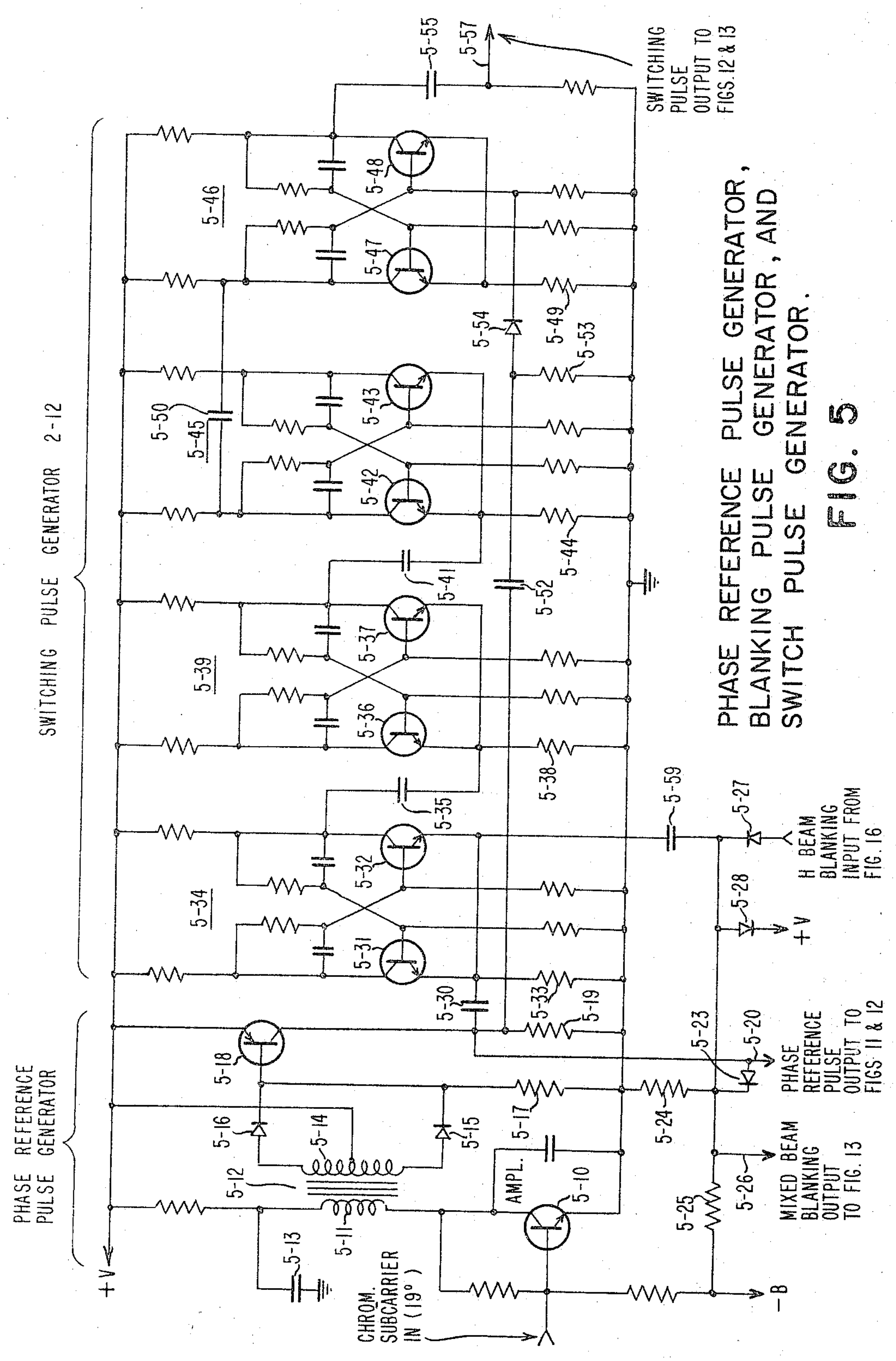
Figure 6:
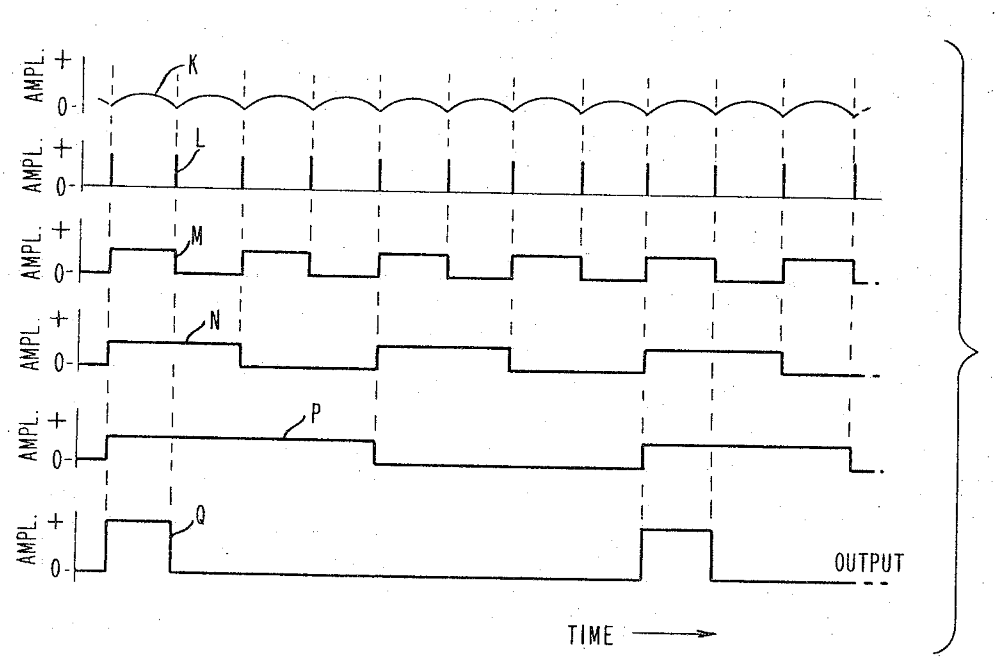
Figure 7:
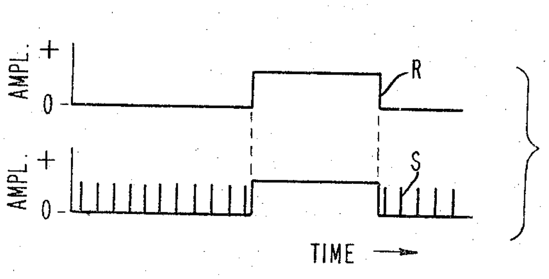
Figure 8B:
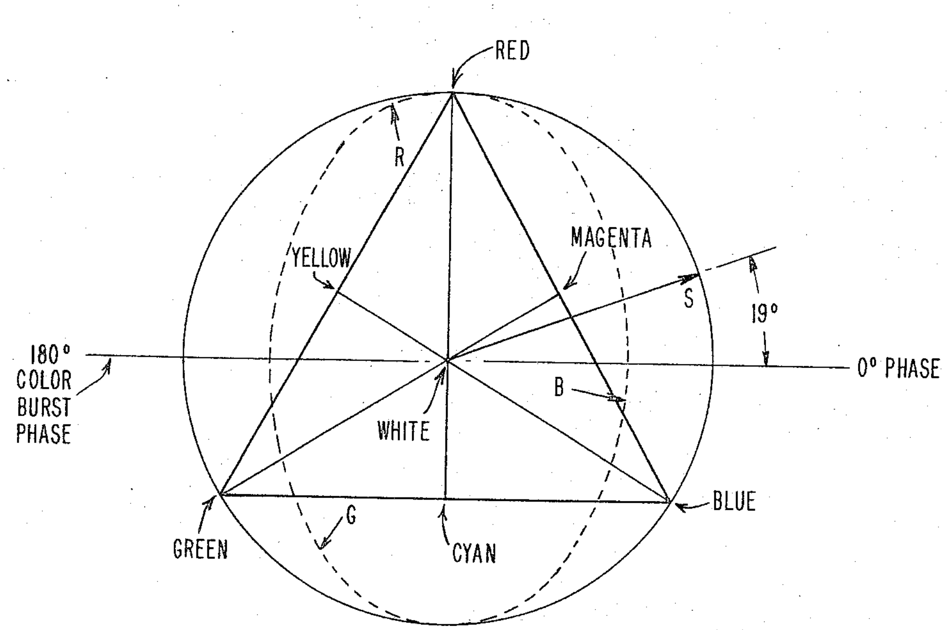
Figure 8A:
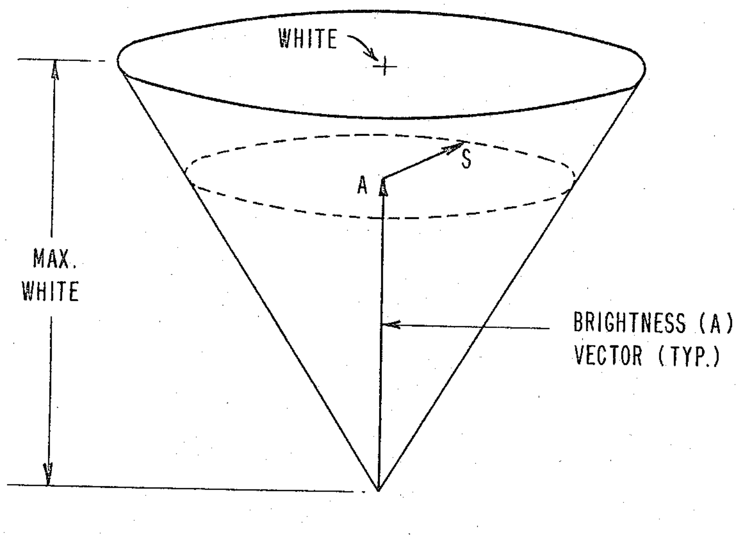
Figure 9:
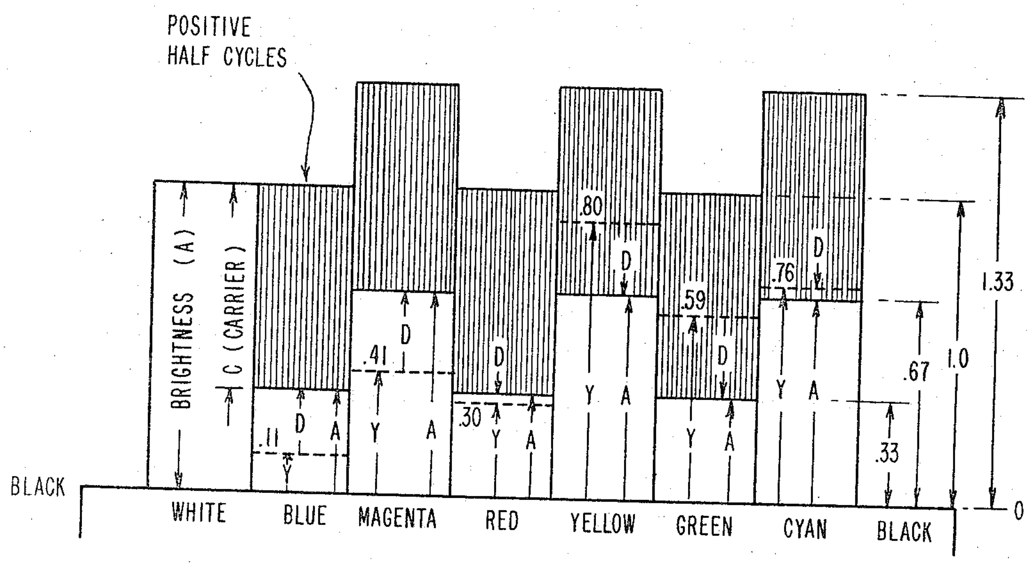
Figure 10:
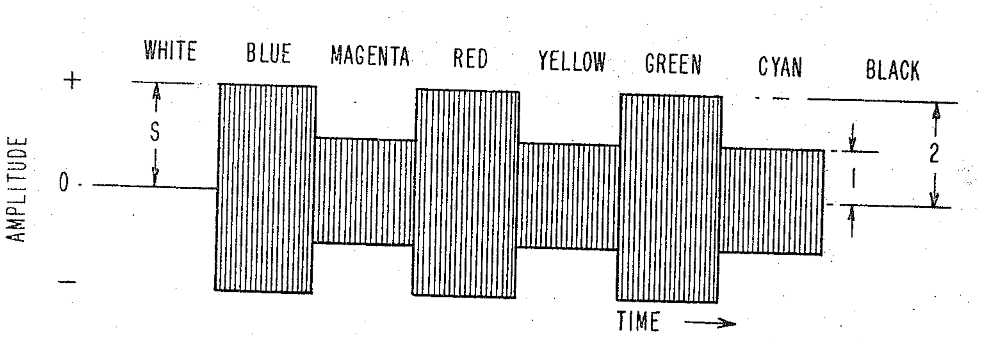
Figures 11, 11A:
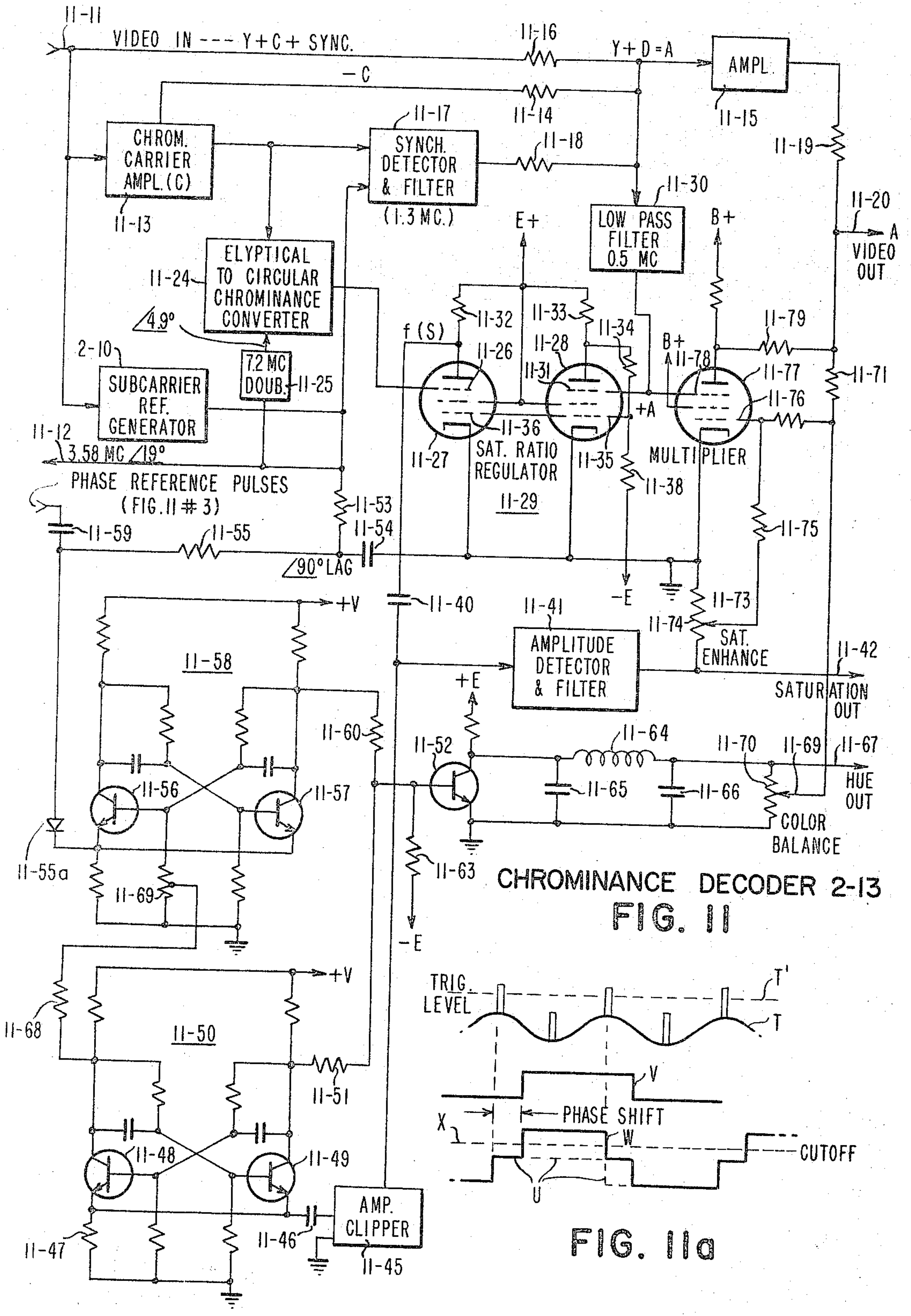
Figure 12:
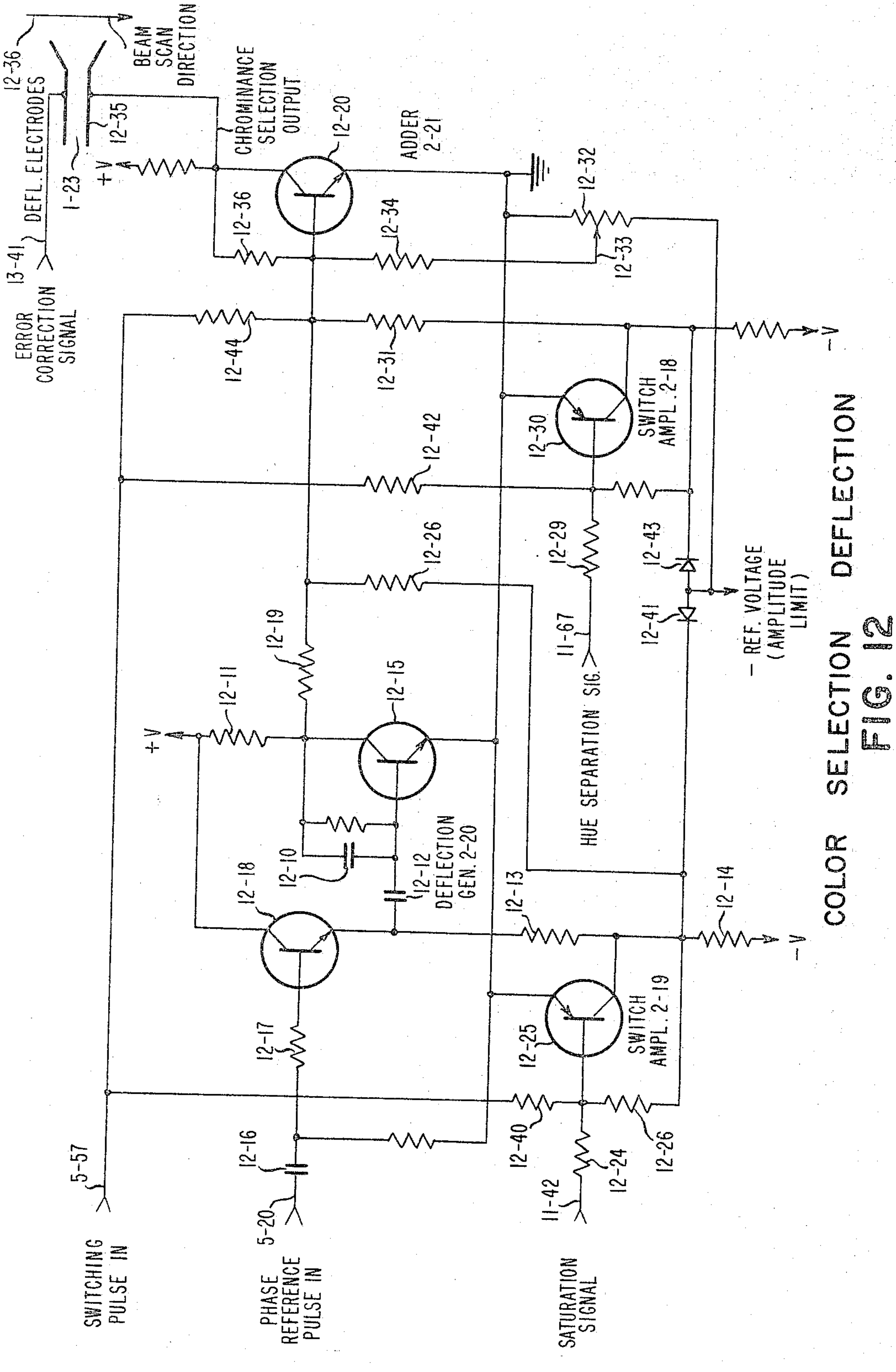
Figure 13:
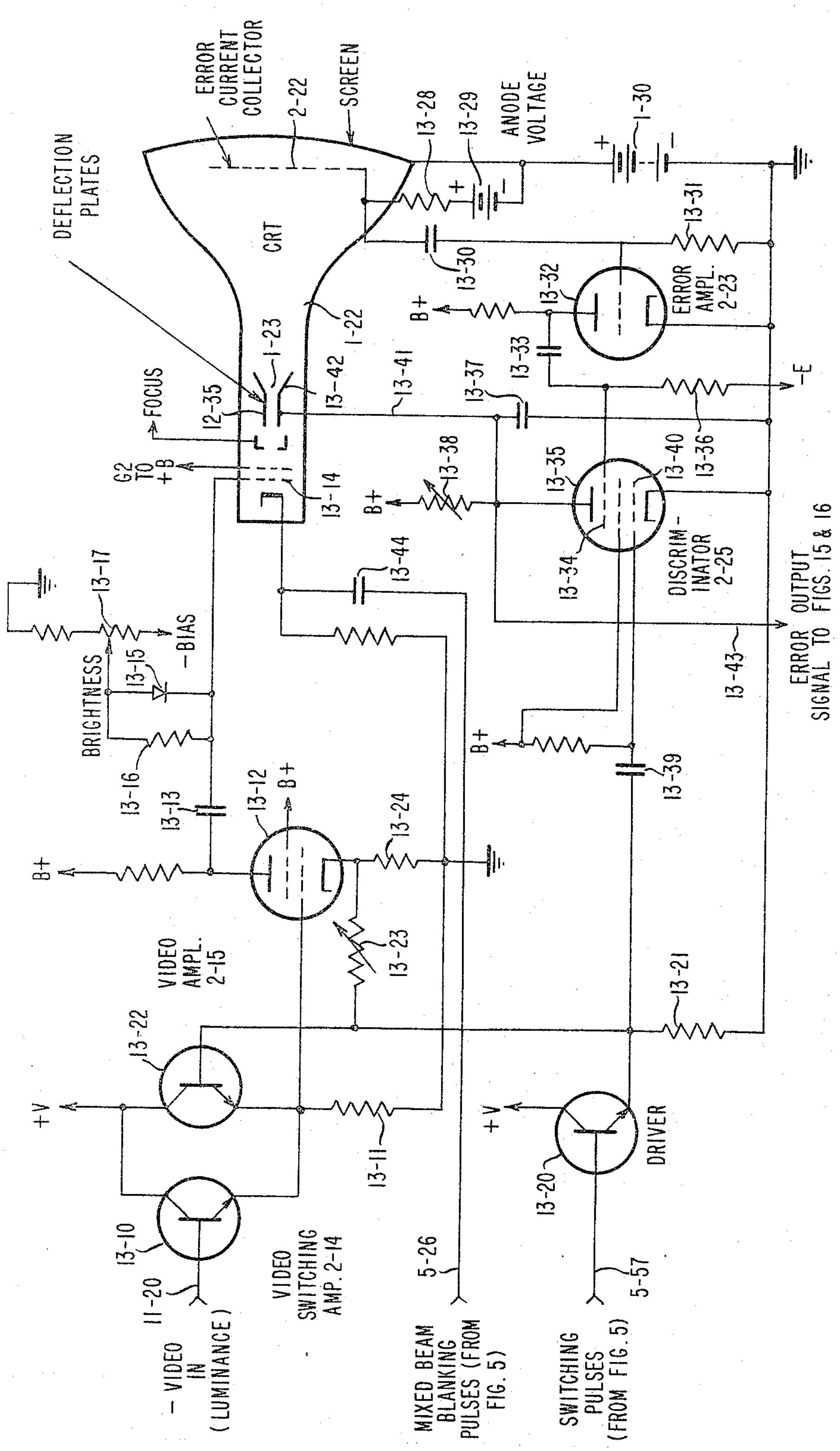
Figure 15:
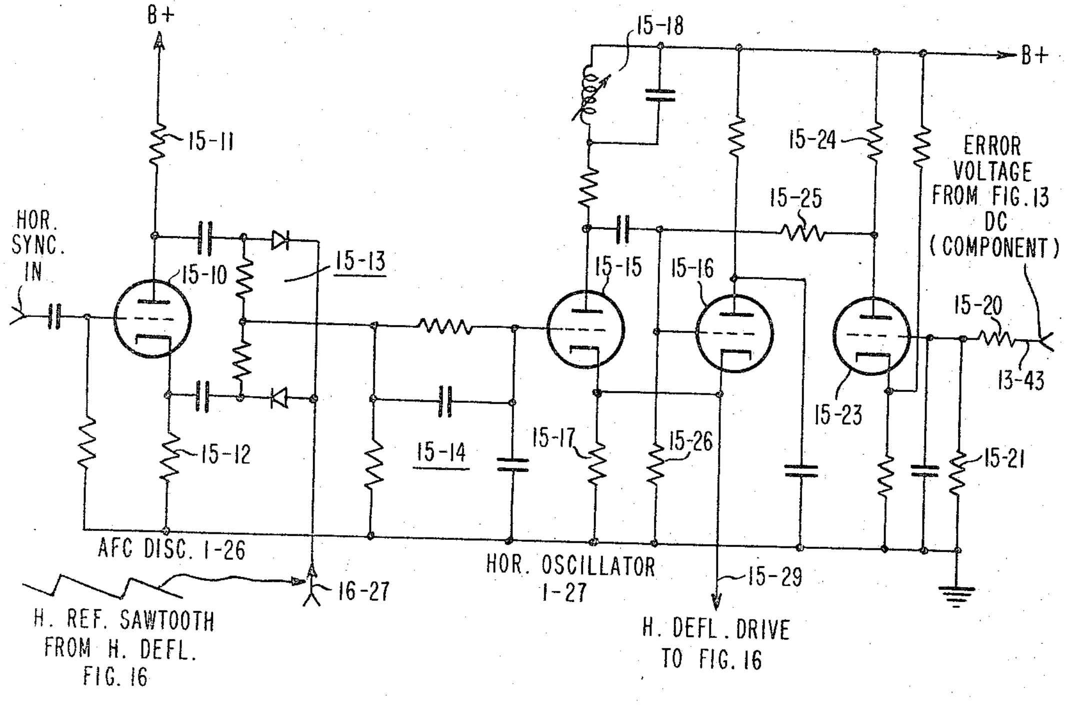
Figure 14:
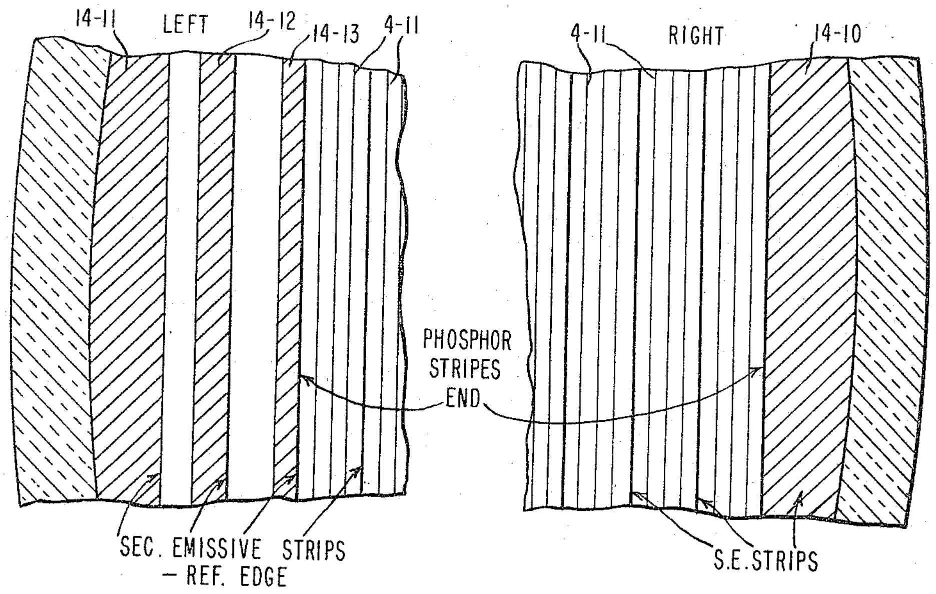
Figure 16:
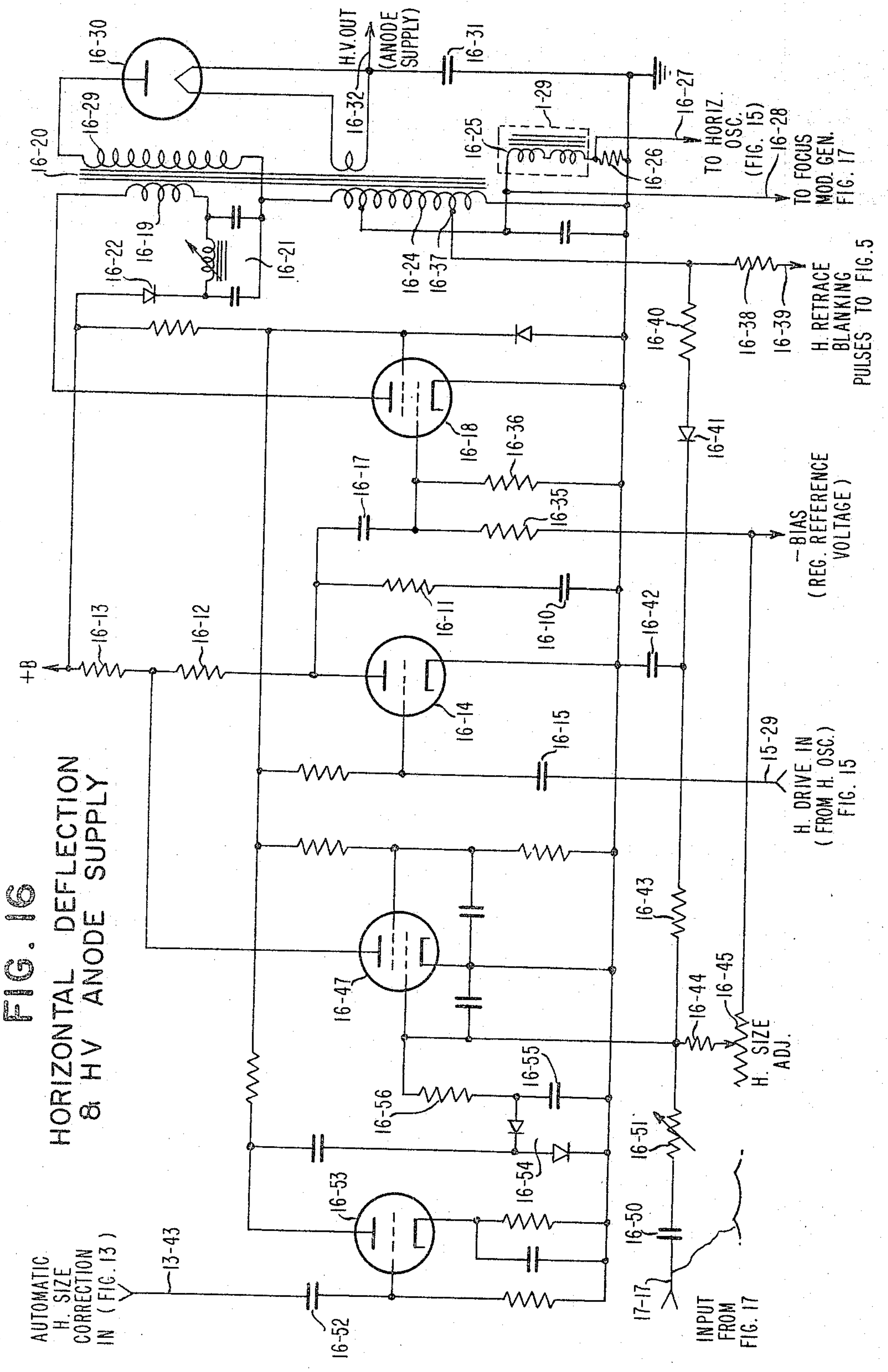
Figures 17, 17A:
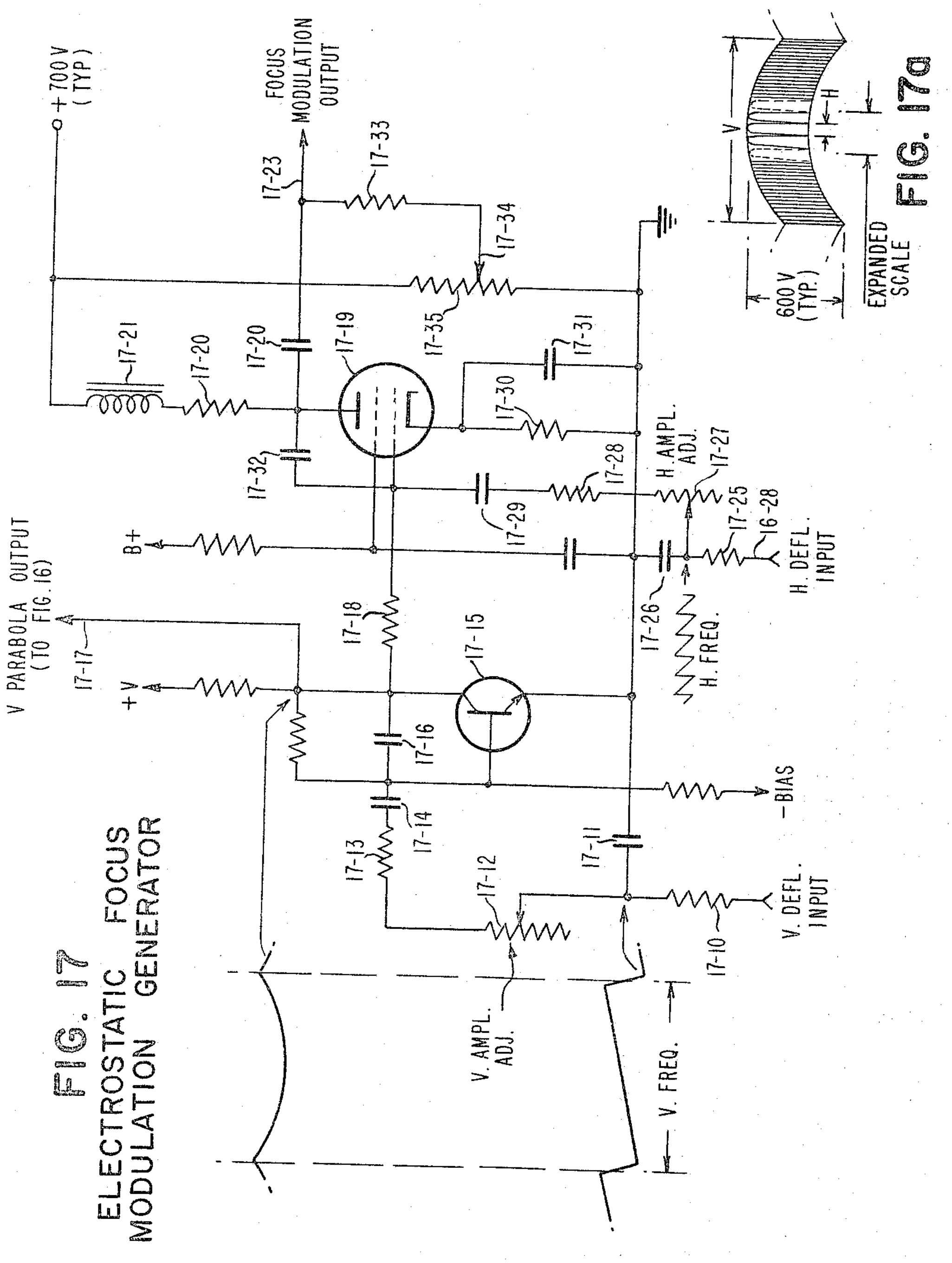
Figure 18:
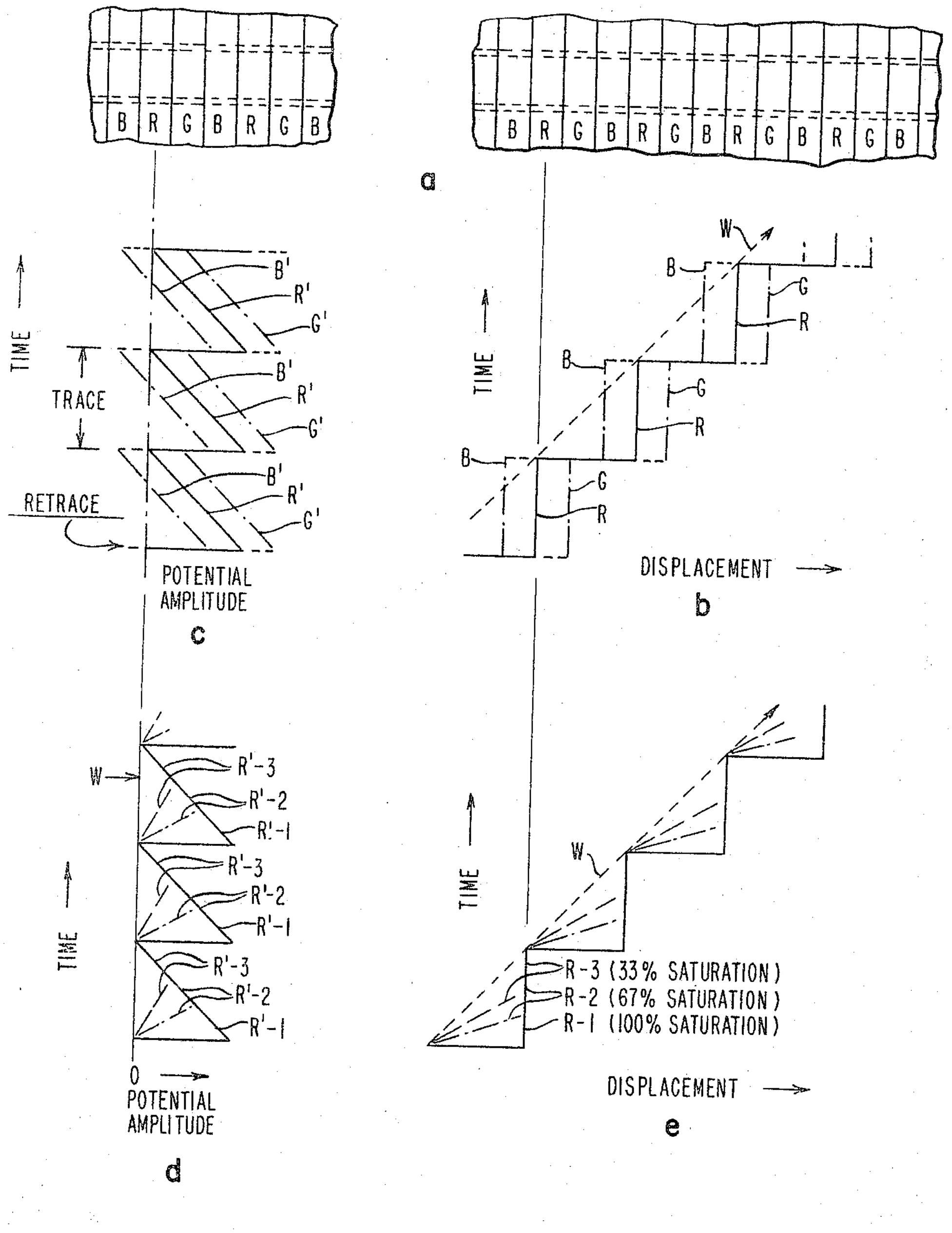
Figure 19:
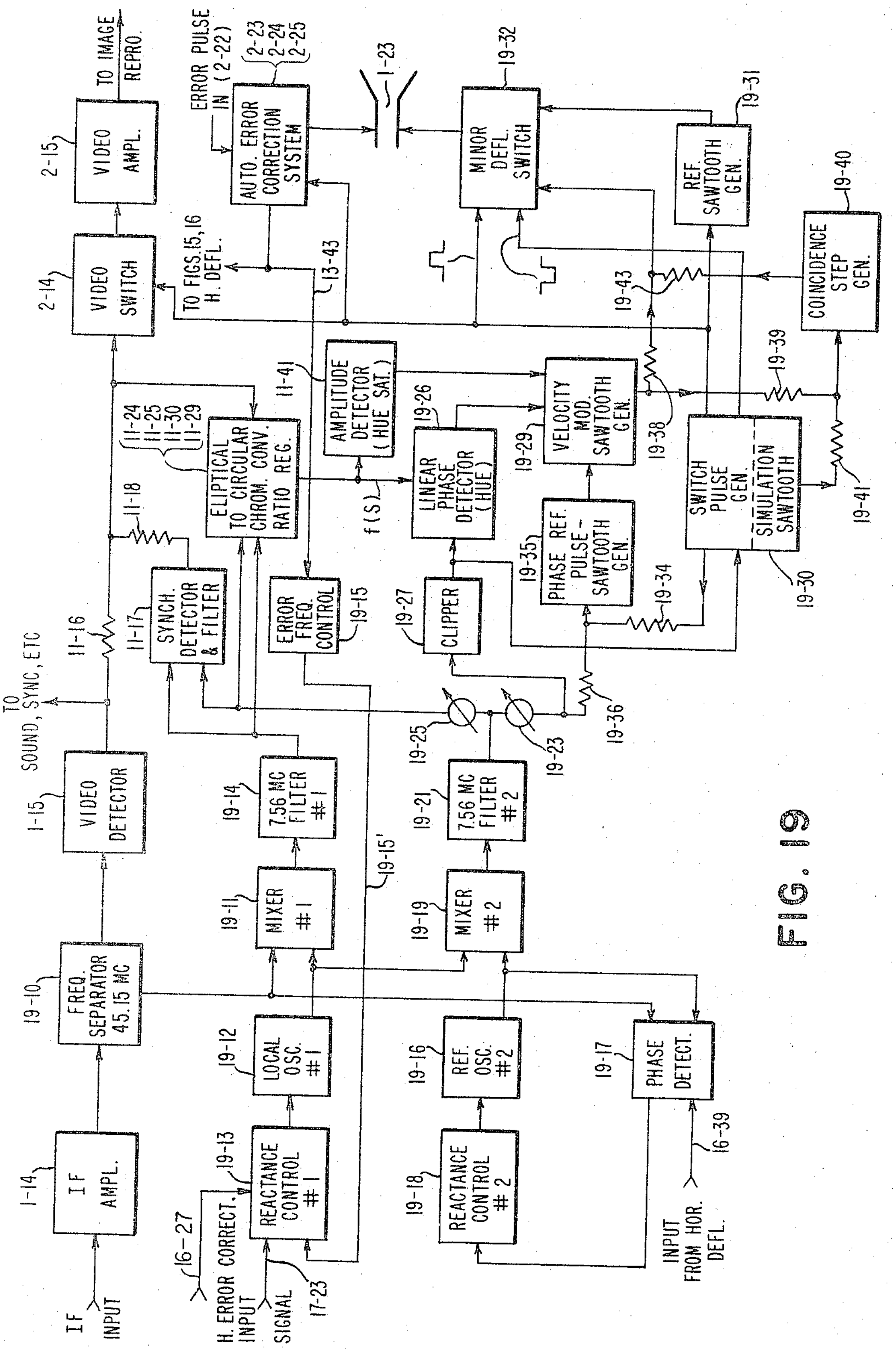
Figure 20:
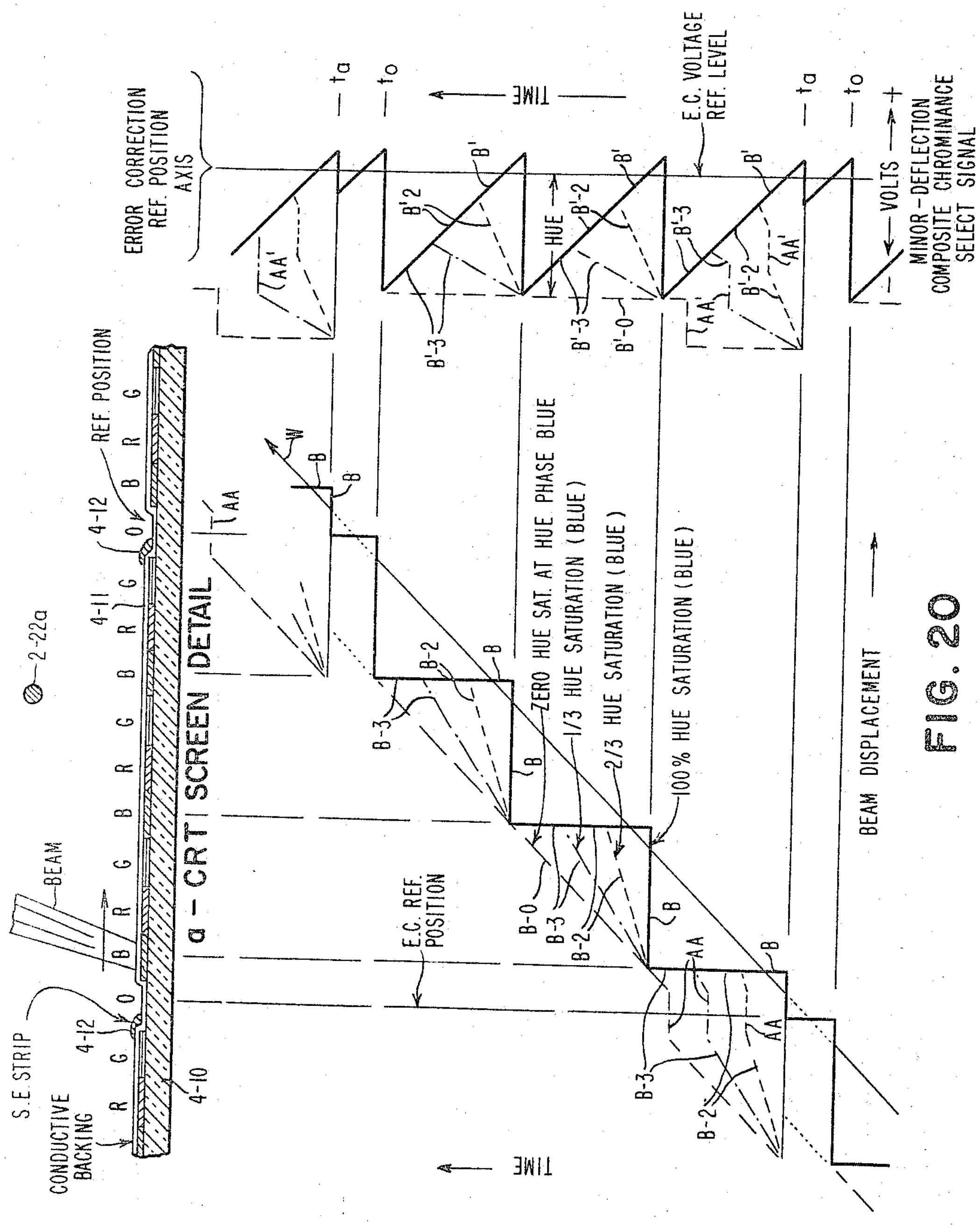
Figure 21:
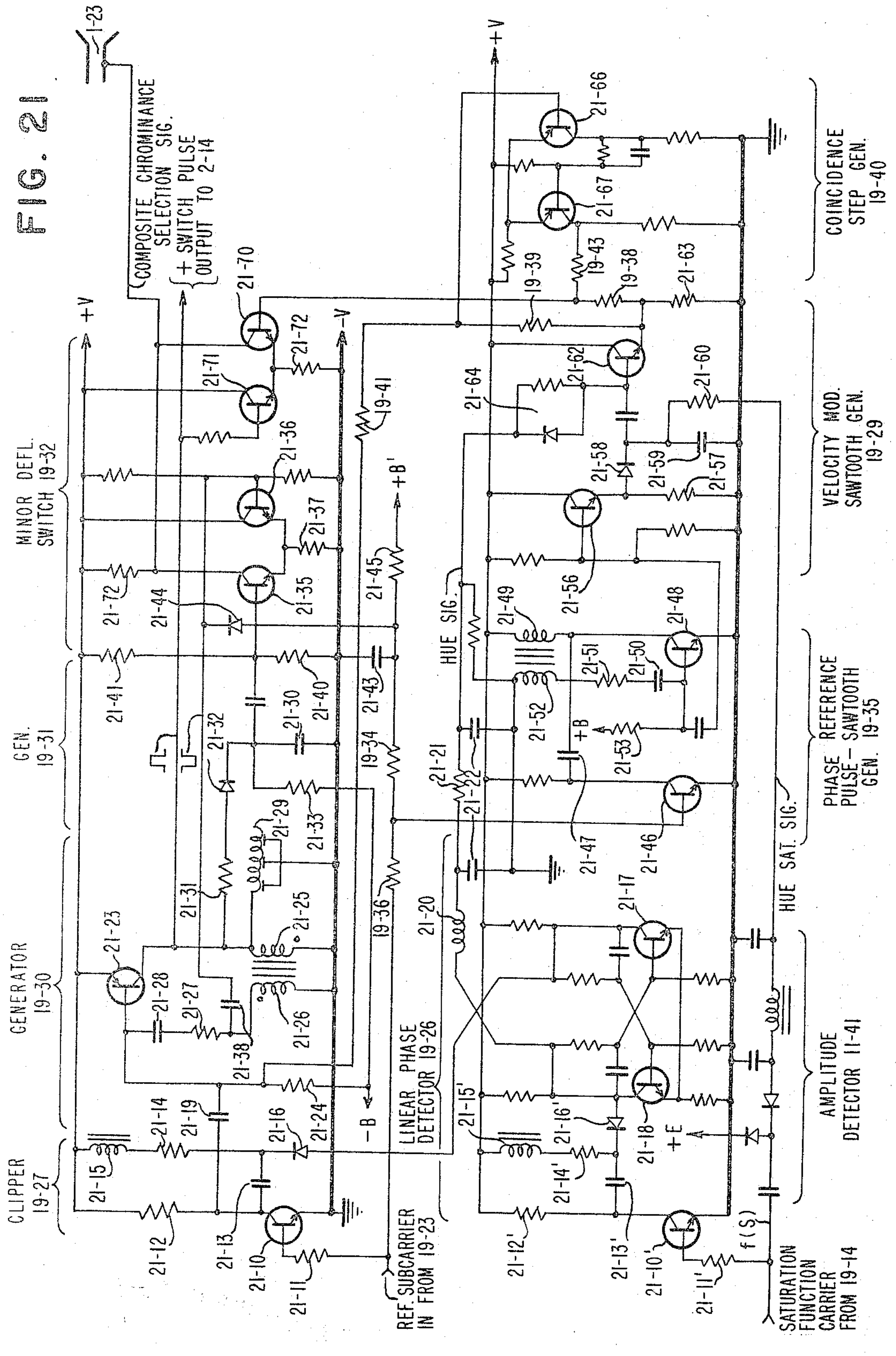
Figure 22:
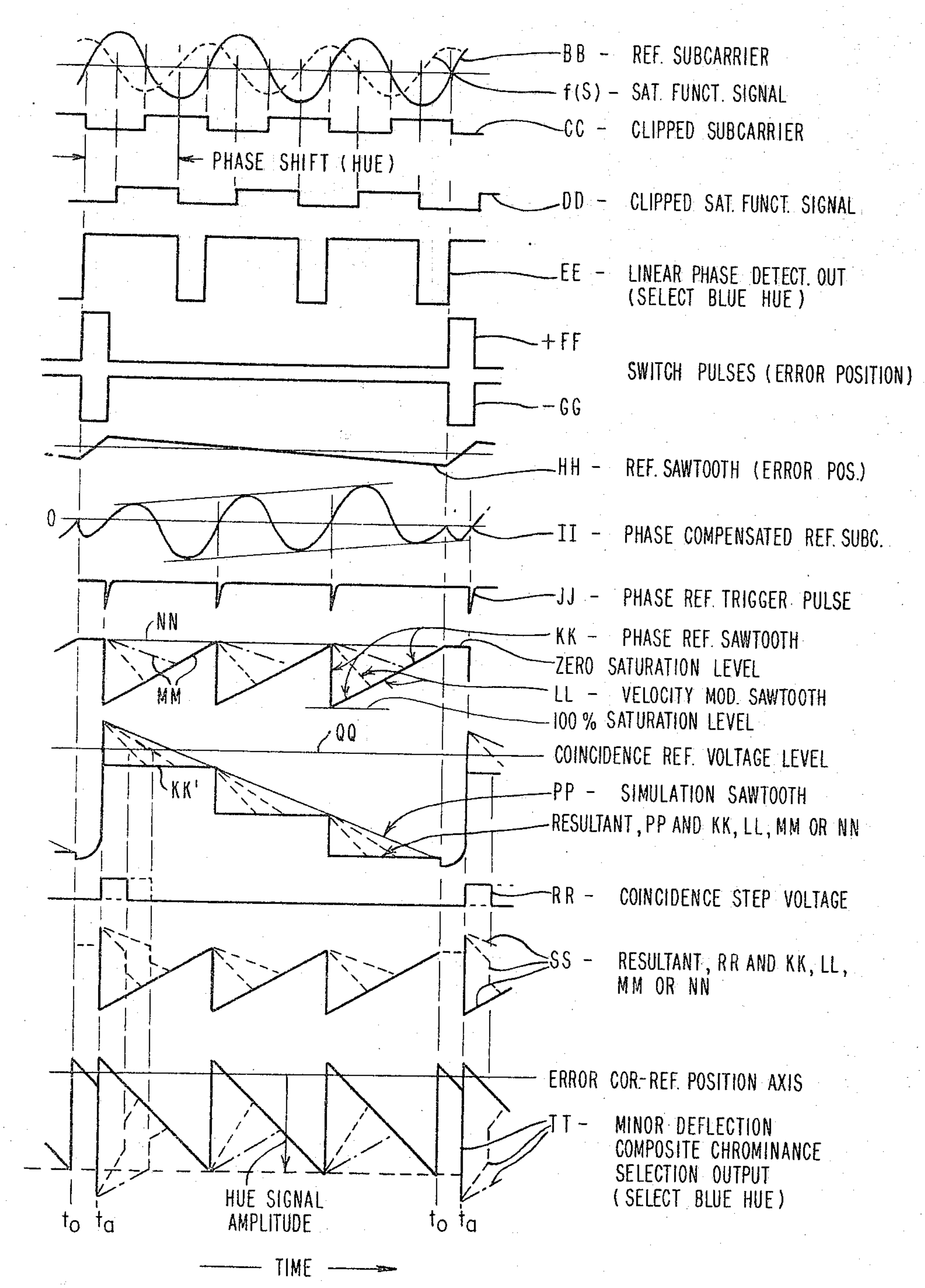
Figure 23:
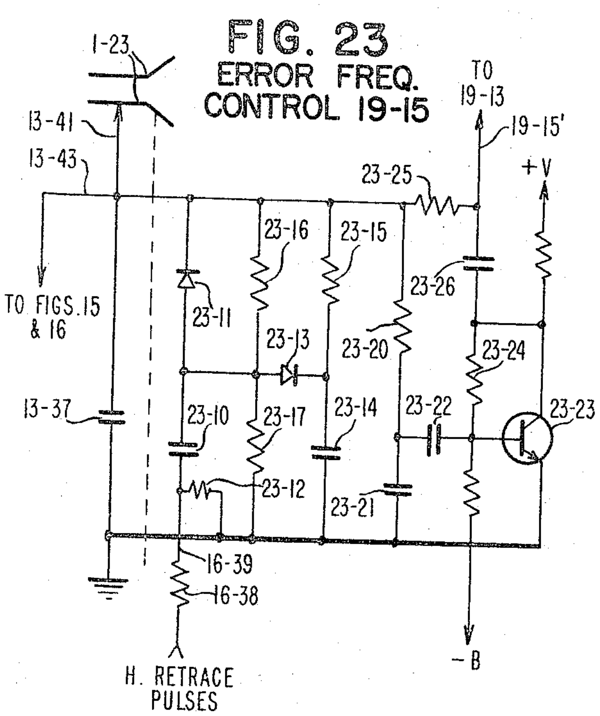
Figure 24:
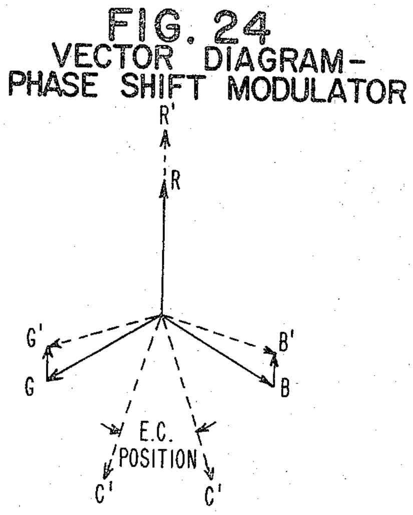
Figure 27:
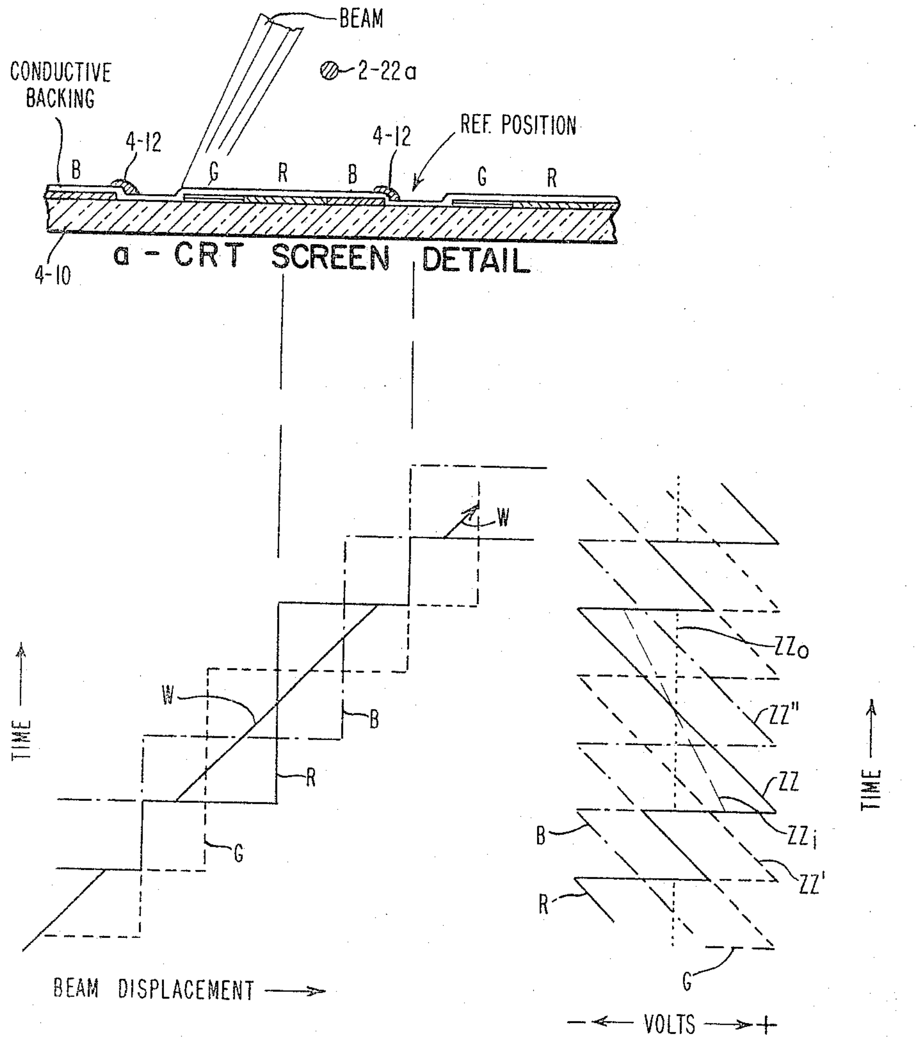
Figure 28:
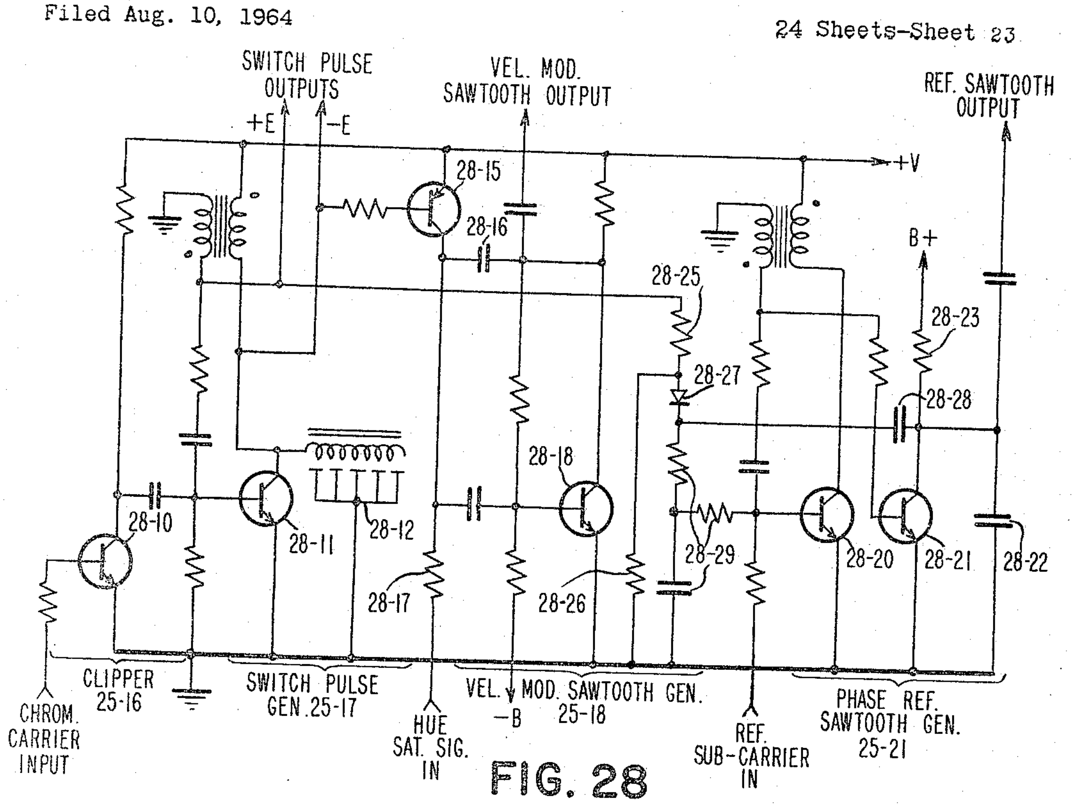
Figures 31A, 31B:
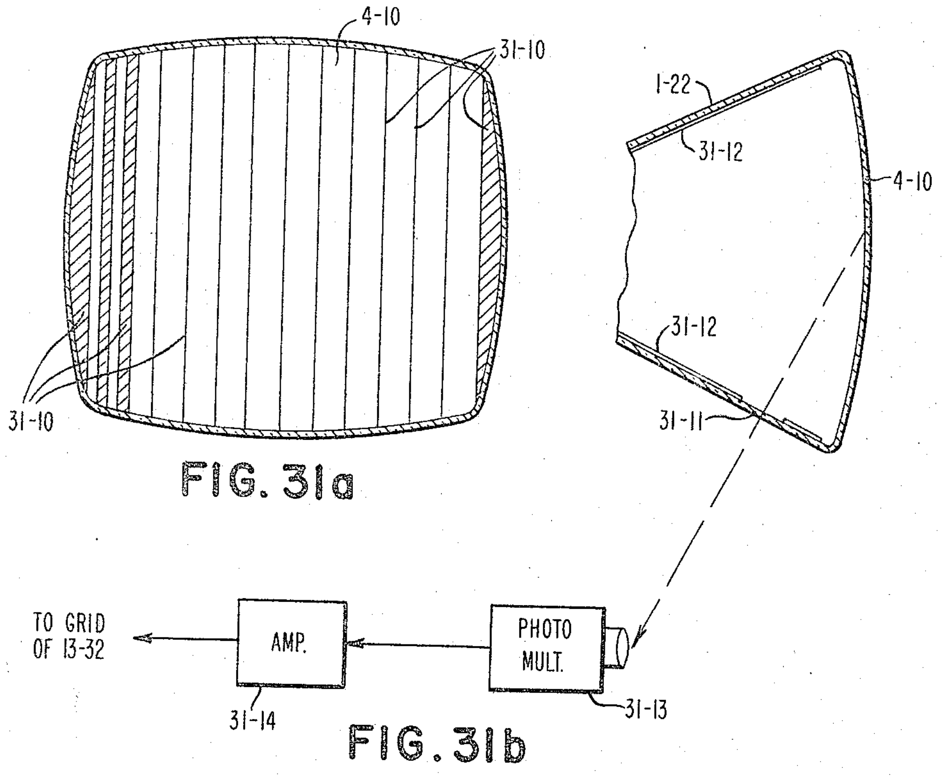
Figure 29:
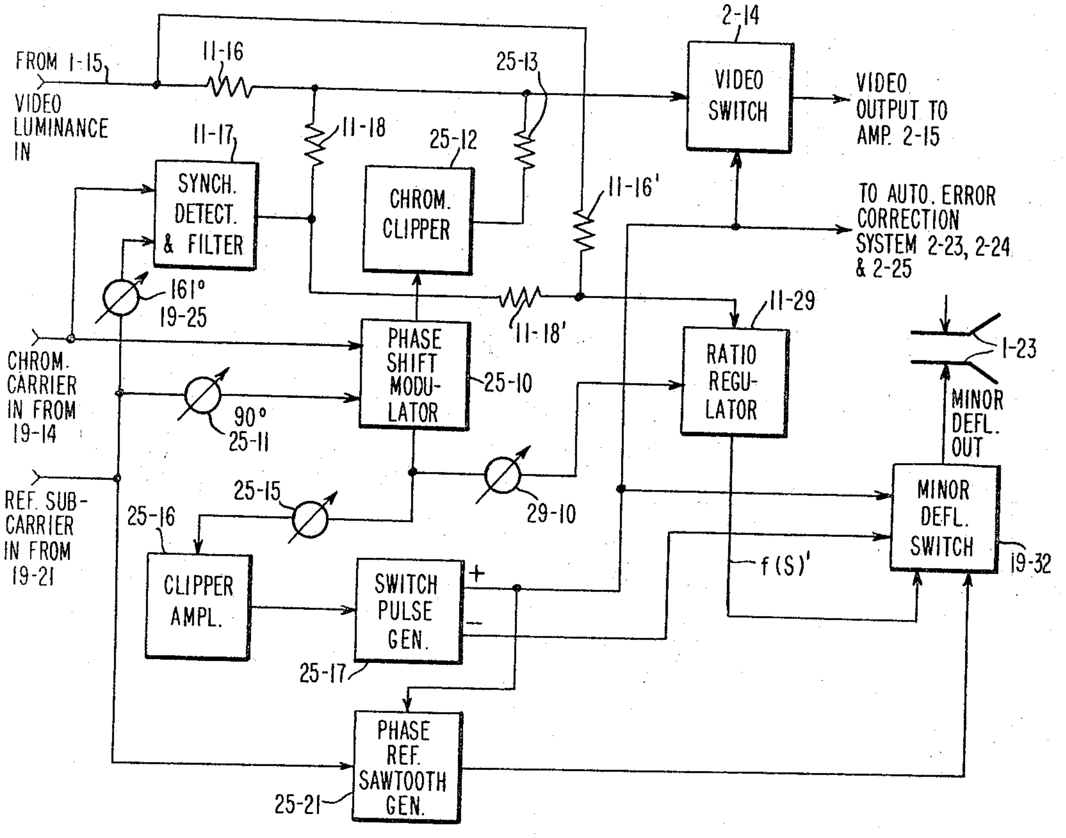
Figure 30:
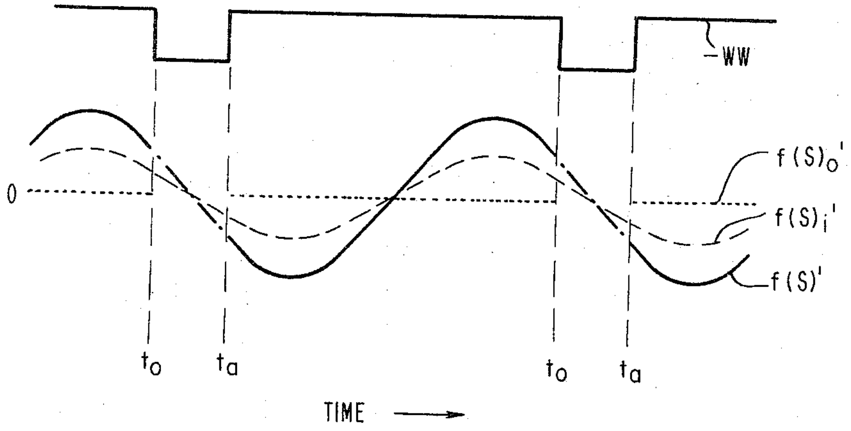

FIG. 3 graphically represents time-displacement scanning characteristics of the image reproducing tube cathode-ray beam, and FIG. 4 shows a fragmentary cross-sectional view illustrating the tube fluorescent screen construction and the waveforms of time-displacement related voltages developed at selected points in the FIG. 1 system;

FIG. 5 shows the circuit arrangement of several generators used in the FIG. 2 control unit, FIGS. 6 and 7 graphically representing the waveforms of certain voltages developed in this control unit;

FIG. 8*a*, 8*b* and 9 graphically represent certain phase and amplitude characteristics of a conventional color television chrominance carrier signal and the amplitude of a brightness signal together with the phase and amplitude characteristics of a derived chrominance carrier signal, and FIG. 10 graphically represents the amplitude characteristic of a saturation signal derived from these signals;

FIG. 11 is a circuit diagram, partly schematic, of a chrominance decoder used in a color image reproduction system embodying the present invention, FIG. 11*a* graphically representing voltage relationships occurring at selected points in the decoder;

FIG. 12 is a circuit diagram of a color selection signal deflection arrangement used in the FIG. 2 control unit;

FIG. 13 is the electrical circuit arrangement of an automatic position error correction system shown schematically in the FIG. 2 control unit, FIG. 14 illustrating constructional features of the image reproducing tube fluorescent screen which are provided for effective operation of the error correction system;

FIGS. 15 and 16 show the electrical circuits of improved horizontal scan uits preferably employed in an image reproduction system embodying the present invention;

FIG. 17 is the electrical circuit diagram of an electrostatic focus modulation generator shown schematically in the control unit of FIG. 2; and FIG. 17*a* graphcially represents voltage waveforms developed therein;

FIG. 18 graphically represents time-displacement scanning characteristics of a modified form of color image reproduction system embodying the invention and shown in block diagram in FIG. 19, FIG. 20 illustrating a fragmentary cross-sectional view of a modified fluorescent screen construction with related scan-control voltage waveforms and the time-displacement scanning effected by the FIG. 19 system;

FIG. 21 shows the electrical circuit arrangement of component units used in the FIG. 19 system, and FIG. 22 represents the time-related waveforms of voltages developed therein;

FIG. 23 is the electrical circuit diagram of an error correction system unit used in the FIG. 19 system;

FIG. 24 is a vector diagram used in explanation of an additionally modified form of television image reproduction system embodying the invention and shown in block diagram in FIG. 25, the operation of the latter being explained with reference to certain time-related voltage waveforms shown in FIG. 26 and which are partially shown again in FIG. 27 in relation to a further modified form of fluorescent screen construction and a mode of time-displacement scanning which characterizes operation of the FIG. 25 system, FIG. 28 showing the electrical circuits of several components used in this modified form of system;

FIG. 29 represents in block diagram an additionally modified form of image reproduction system embodying the invention, FIG. 30 graphically representing certain voltage waveforms developed during operation of the latter; and FIGS. 31*a* and 31*b* illustrate another type of automatic error correction system embodying the present invention.

Referring now more particularly to FIG. 1 of the drawings, there is shown in block diagram form a complete color television image reproducing system embodying the present invention. The system includes a tunably selective radio-frequency amplifier 1–10 of one or more stages and having an input circuit coupled to a conventional antenna 1–11 to receive a selectable television signal. An output circuit of the amplifier 1–10 is coupled to an input circuit of a tunably selective heterodyne converter 1–12 which also receives heterodyne oscillations of selectable frequency from a source 1–13. An intermediate frequency television signal is developed in an output circuit of the converter 1–12 and is amplified by a conventional intermediate frequency amplifier 1–14. The television signal modulation components and accompanying frequency-modulated audio carrier signal are derived in the output circuit of a video detector 1–15. The frequency-modulated audio carrier signal accompanying the television signal is amplified by an intermediate frequency amplifier 1–16, and the audio modulation components are derived by a frequency detector 1–17. The resultant audio signal is amplified by an audio amplifier 1–18 and is reproduced by a loud speaker 1–19.

The television video signal developed in the output circuit of the video detector 1–15 is amplified by a video amplifier 1–20 and is supplied to a unit 1–21 which processes the video signal to derive a brightness signal used to modulate the intensity of the cathode-ray beam developed by a single-gun form of cathode-ray image reproducing or picture tube 1–22. The unit 1–21 is responsive both to the chrominance and luminance components of the video signal to develop a minor-deflection color separation signal which is supplied to horizontal-scan-control deflection electrodes 1–23 of the picture tube 1–22 to effect reproduction of the image in color. The unit 1–21 further exerts control over certain scanning operations as will be explained more fully hereinafter. The synchronizing signal components of the television signal amplified by the amplifier 1–20 are supplied to asynchronizing signal separator unit 1–24 where the vertical synchronizing signal is derived and applied to synchronize the operation of a vertical deflection oscillator 1–25. The horizontal synchronizing signal is also separated by the unit 1–24 and is supplied to a conventional discriminator and automatic frequency control unit 1–26 which effects synchronized operaton of a horizontal scanning oscillator 1–27. The latter generates a pulse voltage which is amplified and reshaped by a horizontal scanning deflection unit 1–28 to develop and apply to the horizontal scanning winding of a deflection yoke 1–29 scanning currents of saw-tooth waveform. These scanning currents cooperate with the scanning currents of saw-tooth waveform which are developed by the deflection oscillator 1–25 and are supplied to the vertical deflection winding of the yoke 1–29 to cause the cathode-ray beam of the tube 1–22 to scan interlaced rasters of horizontal scanning lines on the fluorescent screen of the tube 1–22. A high unidirectional energizing voltage is derived by a high voltage supply unit 1–30 from the scanning voltages developed by the horizontal deflection unit 1–28, and this high voltage is supplied to energize the output anode of the electron gun of the image reproducing tube 1–22.

The components 1–10—1–20 and 1–24—1–25 of the television system just described operate in conventional manner. These units cooperate with the novel unit 1–21, the novel picture tube 1–22, and units 1–26—1–28 of improved constructions, all having novel operational characteristics more fully described hereinafter, to reproduce from the received monochrome or color television signal (with its accompanying sound signal) a monochrome or color image and accompanying sound.

The construction of the unit 1–21 in FIG. 1 is shown more fully in block diagram form in FIG. 2 in association with the picture tube 1–22 and scanning components 1–24—1–30. It includes a reference subcarrier generator 2–10, which is of conventional construction and is synchronized in operation by the color burst synchronizing in operation by the color burst synchronizing signal component of a color television signal to effect generation of a nominal 3.58 megacycle (actual 3.579545 megacycle) subcarrier signal. This reference subcarrier signal is supplied to a reference-phase and blanking-pulse generator unit 2–11, which generates short-duration reference-phase potential pulses at a periodicity twice that of the subcarrier signal. These reference-phase pulses are supplied as cathode-ray beam extinction or blanking pulses, together with line-retrace blanking pulses supplied from the horizontal deflection amplifier 1–28 to the unit 2–11, to the cathode electrode of the picture tube 1–22. The phase reference pulses generated by the unit 2–11 are also supplied to a switching pulse generating unit 2–12 which, for the particular scan-error correction system hereinafter described by way of example, generates switching pulses of rectangular waveform and having a periodicity one-quarter that of the subcarrier wave generated by the unit 2–10. The phase reference pulses of the unit 2–11 and the subcarrier signal generated by the unit 2–10 are supplied with the video signal translated by the video amplifier 1–20 to a chrominance decoder unit 2–13.

The decoder performs several functions. The chrominance information of the color television signal carries a small amount of image brightness information, and this brightness information is derived by the decoder 2–13 and added to the luminance signal translated by the video amplifier 1–20 to provide a brightness or monochrome signal conveying all of the brightness information of the image to be reproduced. This brightness signal is translated through a video switch unit 2–14 and a video amplifier 2–15 and is supplied to the cathode-ray-beam intensity-control electrode of the picture tube 1–22 to modulate the cathode-ray beam current in conformity with the instantaneous amplitude of the brightness signal. A present day color television signal has a 3.58 chrominance carrier signal which is modulated in phase according to the chrominance hue information and is modulated in amplitude according to the hue-saturation information. The locus of the chrominance carrier amplitude, for 100% hue saturation, is an elliptical function with change of hue. The decoder 2–13 converts this elliptical function amplitude variation of the chrominance carrier signal to one of circular function in which the chrominance carrier representative of a 100% saturation has uniform amplitude with variation of hue. The phase of the converted-amplitude chrominance carrier signal is now utilized by the decoder 2–13 to derive and supply to a hue switch amplifier unit 2–18 a unidirectional hue selection potential having minimum amplitude corresponding to selection of a magenta hue and maximum amplitude corresponding to selection of a purple hue. The manner in which the hue selection potential effects such hue selection is explained hereinafter. The ratio of the prevailing amplitude of the converted-amplitude chrominance carrier signal to the prevailing amplitude of the derived brightness signal is now accurately representative of the hue saturation for all values of the brightness signal, and this ratio is ascertained by the decoder 2–13 to derive and apply to a saturation switch amplifier unit 2–19 a unidirectional potential having a preselected maximum aplitude representative of 100% saturation and zero amplitude representative of zero saturation (white light).

The unidirectional saturation signal translated by the saturation switch amplifier unit 2–19 is applied to a velocity modulation deflection-signal generator unit 2–20. The latter operates under time control of the phase-reference pulses generated by the unit 2–11 to generate a minor deflection signal of saw-tooth waveform and of amplitude varying directly with the amplitude of the color saturation signal translated by the amplifier 2–19. The hue signal translated by the hue switch amplifier 2–18, one-half of the saturation signal translated by the saturation switch amplifier 2–19, and the minor-deflection signal generated by the generator unit 2–20 are all combined by an adder 2–21. The resultant combinational signal is applied to the horizontal-scan deflection electrodes 1–23 of the picture tube 1–22 as a cathode-ray beam deflection control signal which is effective by control of the horizontal motion and positioning of the cathode-ray beam to select both the hue and hue saturation of the color image reproduced by the picture tube 1–22.

As will presently be explained more fully, the fluorescent screen of the picture tube 1–22 is formed of vertically oriented stripes (oriented normal to the direction of horizontal scan of the cathode-ray beam) arranged in repetitive color sets of red, green and blue fluorescent phosphors. To maintain correct positioning of the cathode-ray beam with respect to these repetitive sets of color stripes, a beam deflection error correction system is provided. This system includes an array of vertically oriented and horizontally spaced secondary emission stripes fabricated on the rear surface of the fluorescent screen of the picture tube 1–22, and a conductive grid structure 2–22 fixedly supported in spaced relation to the rear surface of the fluorescent screen. The grid structure 2–22 supplies an error correction pulse signal through an error pulse amplifier 2–23 to a position error discriminator 2–24, which operates under control of the switching pulses generated by the unit 2–12. The discriminator 2–24 develops an output beam-position error pulse signal which is integrated by an error integrating amplifier 2–25 to develop and apply to the deflecting electrodes 1–23 an automatic error correction potential. This error correction operation is accomplished periodically during the horizontal scan of the cathode-ray beam and under controlled conditions established by the switching pulses of the generator 2–12. These controlled conditions are such that the video switch 2–14 temporarily halts translation of the brightness signal from the decoder unit 2–13 and temporarily effects translation of a standard reference brightness signal, the hue switching amplifier 2–18 halts translation of the hue signal supplied by the decoder 2–13 and effects translation of a standard reference hue signal, the saturation switch amplifier 2–19 halts translation of the saturation signal supplied by the decoder 2–13 and effects translation of a standard reference saturation signal, and the velocity modulation deflection generator 2–20 is operatively responsive to the standard reference saturation signal supplied by the amplifier 2–19 to generate a 100% saturation deflection signal. Thus an error correction positioning of the horizontally scanning cathode-ray beam is periodically effected under preestablished standardized conditions to maintain correct displacement of the beam in relation to successive color stripe sets of the fluorescent screen whereby correct hue selection and saturation are insured.

During each horizontal retrace cycle, the deflection error correction system continues to be operative in a manner similar to that just described for each line trace interval. However, the horizontal synchronizing pulses of the video signal cause the cathode-ray beam to be extinguished or blanked for an interval corresponding to the order of seven or eight switching pulses and this esults in an error in the correction information which ends to deflect the cathode-ray beam much too far to he left for correct positioning to begin a new horizontal race. In order to make up for this retrace error and assure that the cathode-ray beam position is corrected by the time video unblanking occurs, the picture tube 1–22 is provided on the rear surface of its face plate with secondary emissive wide stripes at both the left and right hand edges of the image reproduction area. This construction will be explained more fully hereinafter, but it may be noted at this time that there are typically one or two switching pulses after video blanking but before retrace starts and there are two or three switching pulses which occur at the end of the retrace but before video unblanking occurs. Extra wide secondary emissive stripes positioned at the left and right sides of the image reproduction area assure that the cathode-ray beam dwells on at least one such stripe until the retrace error is corrected. Since the beam retraces from the right to the left side of the image area, the right hand edges of the secondary emissive stripes (preferably being three in number) on the left side of the image reproduction area are positioned to provide correct beam referencing position; that is, the beam normally finishes its retrace too far to the left to begin a new retrace motion and the wide stripes at the left hand margin of the image area provide relatively large amplitude and prolonged duration correction deflection pulses needed rapidly to shift the beam deflection to the correct position at which it just moves off of the right edge of the secondary emissive stripe adjacent the image area.

The blanking pulses generated by the unit 2–11 and supplied to the cathode electrode of the picture tube 1–22 serve to extinguish the cathode-ray beam of the picture tube at the beginning and end of each switching pulse interval and during the horizontal retrace interval to avoid reproduction by the picture tube of any transient conditions arising from the periodic error correction operations last described.

Since the cathode-ray beam of the picture tube 1–22 is deflected by the deflection yoke 1–29 through vertical and horizontal angles converging to a point in the deflection yoke 1–29, and since the fluorescent screen of the picture tube is formed on a generally spherical face plate surface of larger radius, the focus of the cathode-ray beam to a fine spot at the center of the fluorescent screen generally should be modified to maintain the beam sharply focused at the horizontal and vertical edges of the fluorescent screen. This focus modification is accomplished by a focus modulation generator 2–27 which receives vertical and horizontal deflection potentials developed across the respective vertical and horizontal windings of the deflection yoke 1–29, converts these potentials to a periodic potential having combined parabolic waveform at both the vertical and horizontal scanning frequencies, and supplies this focus modification potential to a focus electrode 2–28 provided in the picture tube 1–22.

The manner in which the units 2–18—2–21 effect color separation and saturation control as above-described will now be considered more fully by reference to FIGS. 3 and 4. As shown in FIG. 3*a*, the fluorescent screen of the picture tube 1–22 is fabricated of a succession of adjacent stripes 3–10 of fluorescent materials oriented vertically or normal to the direction of horizontal scan by the cathode-ray beam of the tube. As indicated by the reference letters R, G and B repetitively applied to each successive group of three adjacent stripes 3–10, the fluorescent phosphor materials are selected to emit fluorescent light of red, green and blue hues which have equal brightness when the phosphor materials are bombarded by an electron beam of a given constant value of beam current. A group of three successive stripes, shown by way of example as having equal widths, have combined widths corresponding to the distance traveled by the cathode-ray beam while moving at constant scan velocity and during an interval corresponding to one-half cycle of the chrominance carrier signal. Suitable fluorescent phosphor materials from which the stripes 3–10 may be fabricated are well known in the art, as is the process for depositing the stripes on the face plate of the picture tube by use of a silk screening technique or a photographic technique employing for each color phosphor a photosensitive material exposed to light through an appropriate slotted opaque mask and developed.

As a constant-current cathode-ray beam scans across the phosphor stripes 3–10 at constant velocity, as indicated by the major deflection broken line arrow W of FIG. 3*b*, successive stripes emit equal quantities of red, green and blue light. This tricolor light when combined in the human eye appears as white light. In a manner which will presently be explained more fully, the cathode-ray beam may be permitted to scan the fluorescent screen at constant velocity and thus produce white light as just described or the beam scanning may be controlled to effect scanning motion in steps of which each step has a width equal to the width of three successive stripes 3–10 and a step rise centered upon a hue selection position extending from one end edge to the other edge of each groups of three stripes. Thus as indicated by the solid-line stair-step scan curve G of FIG. 3*b*, it will be evident that for the stepped scanning motion last mentioned the beam dwells during each chrominance carrier half cycle interval only upon a green phosphor stripe and then jumps forward to dwell upon the succeeding green phosphor stripe during the succeeding one-half cycle of the chrominance carrier. The scanning beam then produces emission of green light alone. Likewise should the step scan be retarded (displaced to the left) to cause the beam to dwell upon the red phosphor stripes or be advanced (displaced to the right) to cause the beam to dwell upon the blue phosphor stripes as indicated by the representative stair-step broken-line curves R and B of FIG. 3*b*, only red or only blue light is produced. Displacement of the step scan to cause the beam to dwell upon the intersection of red and green phosphor stripes produces a yellow hue by emission of equal quantities of red and green light, or displacement of the step scan to cause the beam to dwell upon the intersection of green and blue phosphor stripes will produce cyan hue by emission of equal quantities of green and blue light. A retarding displacement causing the beam to dwell near the edge of a red stripe selects a magenta hue, while an advancing displacement causing the beam to dwell on the edge of a blue stripe selects a purple hue. Thus by controlling the beam scan in steps with concurrent displacement of the beam dwell position along the color stripes of the successive tricolor stripe sets, image coloring in any hue is accomplished.

The cathode-ray beam is controlled to scan in steps as just described by applying to the deflecting electrodes 1–23 of the picture tube 1–22 a minor-deflection potential of saw-tooth waveform generated in the output circuit of the adder 2–21 and having such polarity as applied to the deflecting electrodes 1–23 as to effect a reverse direction of horizontal beam scan. The amplitude of the saw-tooth minor scan potential may be selected to produce a reverse amount of horizontal beam scan which just equals the amount of the major forward horizontal beam scan produced by the magnetic field of the horizontal winding of the scanning yoke 1–29. The scan motion of the cathode-ray beam is advanced by the retrace portion of the minor scan potential and then halts during the long scan trace portion of the latter, again stepping forward during the retrace portion of the minor scan potential. A saw-tooth scanning potential of the type just described is represented by the solid-line curve G' of FIG. 3*c*, and is shown as generated in such time relation to the normal scanning position of the cathode-ray beam in relation to the color stripes as to halt the motion of the beam on the green phosphor stripes. This time-position relation is indicated by the electrical axis, the broken vertical line in FIG. 3c, of the saw-tooth potential centering upon a green stripe G of the fragment of stripes shown just above curve G' and which represent a corresponding group of stripes shown in FIG. 3a. Note in this respect that the retrace portion of each saw-tooth potential advances the position of the cathode-ray beam to a green stripe where the succeeding trace portion of the saw-tooth potential retards further forward movement of the cathode-ray beam to retain it on the green stripe.

As will be explained more fully hereinafter in connection with the detailed construction and operation of the units 2–18—2–21 of FIG. 2, the saw-tooth reverse-scan potential is combined with the unidirectional hue selection signal in the adder 2–21. The unidirectional hue selection signal effectively provides a component of electric field beam deflection which advances the position of the beam at any moment to an extent dependent upon the instantaneous amplitude of the hue selection signal. When the amplitude of the hue selection signal nears zero value, there is near minimum advancement of the position of the cathode-ray beam so that the electrical axis of the saw-tooth reverse-scan potential may be considered as centered upon a red phosphor stripe as represented by the broken line saw-tooth potential R' of FIG. 3c and thereby effects selection of a red hue by producing the stepped beam scan represented by the broken line curve R of FIG. 3b. Zero amplitude of the hue selection signal centers the electrical axis of the saw-tooth potential near the remote edge of a red phosphor stripe to effect selection and reproduction of a magenta hue. Near maximum amplitude of the hue selection signal produces large advancement of the beam position, which may be considered as equivalent to centering the electrical axis of the saw-tooth reverse-scan potential on a blue stripe as indicated by the broken line curve B' in FIG. 3c with resultant selection of a blue hue by beam stepped-scan motion as represented by the broken line curve B of FIG. 3b. Maximum amplitude of the hue selection signal centers the electrical axis of the saw-tooth potential on the remote edge of a blue phosphor stripe to effect reproduction of a purple hue. Thus the amplitude of the hue selection signal causes hue selection by the stepped scanning movement of the cathode-ray beam across the fluorescent screen of the picture tube.

FIGS. 3d and 3e illustrate the manner in which color saturation control of a green color, to use this color by way of example, is effected by reason of the saturation signal control over the amplitude with which the saw-tooth reverse-scal potential is generated by the generator 2–20. Curve G' of FIG. 3d corresponds to curve G' of FIG. 3c and represents a saw-tooth reverse-scan potential of maximum amplitude as required to effect stepped scanning of the cathode-ray tube beam as just described. Such stair-step scanning is represented again in FIG. 3e by the solid-line curve G which corresponds to curve G of FIG. 3b. If the amplitude of the saturation signal translated by the amplifier 2–19 of FIG. 2 decreases, the amplitude of the saw-tooth reverse-scan potential generated by the generator 2–20 also decreases in amplitude as represented by the broken-line curve G'–2 of FIG. 3d. This reduced amplitude saw-tooth reverse-scan potential no longer produces a reverse beam scan just equal to the amount of forward beam scan so that the cathode-ray beam now moves horizontally forward a small distance between steps as represented by the broken line curve G–2 of FIG. 3e. Further reduced amplitude of the saw-tooth potential as represented by curve G'–3 of FIG. 3d permits a larger forward motion of the beam as represented by curve G–3 of FIG. 3e. And when the amplitude of the saw-tooth reverse-scan potential is reduced to zero, the cathode-ray beam moves horizontally forward with constant scanning velocity as represented by the broken line arrow W of FIG. 3e.

The cathode-ray beam is generated and focused on the fluorescent screen with rectangular cross-section having its long dimension or length oriented vertically and delineating the width of a scanned line. In practice, the short dimension or width of the rectangular cross-section beam is selected to be equal approximately to one-half the width of a color stripe, as represented by the cross-hatched area positioned on the green phosphor stripe of FIG. 3a. With this value of beam cross-sectional width, a reduced saw tooth reverse-scan potential as represented by curve G'–2 of FIG. 3d permits the beam to move from one edge to the other edge of a color stripe as represented by curve G–2 of FIG. 3e but nevertheless causes the beam to remain on the same color stripe throughout its range of limited motion thus causing phosphor light emission of one given color only. A further reduced amplitude of the saw-tooth reverse-scan potential such as that represented by curve G'–3 of FIG. 3d, by reason of a further reduced amplitude of the saturation signal, permits more movement of the beam between steps as represented by curve G–3 of FIG. 3e. This more extensive motion of the beam causes it to dwell approximately one-quarter of the time on say a red phosphor stripe, to dwell half of the time on the succeeding green phosphor stripe, and to dwell for the remaining one-quarter time on the succeeding blue phosphor stripe. The resultant predominant green color is thus 50% saturated by white light resulting from the addition of the red and blue light and an equal quantity of the green light. It will accordingly be evident that the change of amplitude of the saw-tooth reverse-scan potential according to corresponding changes of amplitude of the saturation signal effects change of the saturation of any hue selected at any time by the controlled stepped-scan positioning of the cathode-ray beam. While saturation control has been described in connection with selection of a green hue, it will further be evident that saturation control prevails for any hue selected at a given time.

In further considering the operation of the FIG. 2 arrangement, reference is made to FIG. 4 and particularly to FIG. 4a which illustrates a horizontal cross-sectional view of a small portion of the picture tube fluorescent screen. It was earlier explained that the fluorescent screen is fabricated of vertically oriented fluorescent phosphor stripes placed upon the inner surface of the glass face plate 4–10 of the picture tube and that it is comprised of successive tricolor sets of blue (B), red (R) and green (G) light emissive phosphor stripes. An aluminized coating 4–11 is preferably formed in conventional manner on the rear surface of the fluorescent screen for improved image contrast and brilliance. It was also earlier mentioned that vertically oriented secondary emissive scan error-correction stripes were fabricated with uniform horizontal spacings on the rear surface of the fluorescent screen. In practice, these secondary emissive stripes 4–12 are fabricated on the rear surface of the aluminized coating 4–11 and are shown by way of example as spaced by eight sets of red, blue and green phosphor stripes. It was further earlier mentioned that one tricolor set of such stripes corresponded in composite width to the distance moved by the scanning beam during an interval corresponding to one-half cycle of the chrominance carrier signal. In practice, the width of each set of tricolor stripes is made slightly less than the value last stated to permit insertion in the screen format of a zero reference position (used for beam positioning error correction presently to be described) of approximately 1½ stripe width within the leading one-third portion of which a secondary emissive stripe 4–12 is located leaving a stripe-width portion which is treated to minimize secondary emission. This zero reference position is devoid of phosphor as shown and thus does not produce light output when the cathode-ray beam dwells for a slight interval at the reference position, but the reference position is so small that the absence of light output at the reference position is not discernible. FIG. 4*a* also shows one conductor **2–22*a* of the secondary emission collector grid structure 2–22** which is provided in the picture tube and supported in proximate spaced relation, by means not shown, to the fluorescent screen.

The phase reference potential pulses generated by the unit 2–11 are represented by a curve A of FIG. 4 and, as earlier mentioned, have a periodicity twice that of a subcarrier signal generated by the generator 2–10. These phase reference pulses are supplied to the switching pulse generator 2–12 to produce switching pulses, represented by curve B, which have a periodicity one-quarter that of the subcarrier signal generated by the generator 2–10.

These switching pulses so control the video switch unit 2–14 as to permit the translation by this unit of the video brightness signal, represented by curve C of FIG. 4, during the intervals between switching pulses but cause the video switch unit 2–14 to translate during each switching pulse interval a standard reference-amplitude brightness signal represented by the uniform amplitude portion C′ of curve C.

The switching pulses represented by curve B so control the hue switch amplifier unit 2–18 as to permit translation by this unit to the adder 2–21 of the hue separation signal developed by the chrominance decoder 2–13, and represented by curve D of FIG. 4, during the interval between switching pulses but cause the hue switch amplifier 2–18 to translate during the interval of each switching pulse a standard hue-reference signal represented by the uniform amplitude portion D′ of curve D. It may be noted in this respect that the hue reference amplitude D′ corresponds to that required to select a magenta hue by the stepping scan control of the cathode-ray beam earlier described, whereas successively lesser amplitudes of the hue separation signal effect selection successively of blue, green and red hues as indicated by the letters B, G and R placed at various amplitude levels of the hue separation signal. The hue-reference amplitude D′ is reduced to one-half value, corresponding to selection of a green hue as represented by the broken-line D″, by operation of the adder 2–21 wherein a one-half amplitude switching pulse is subtracted from the hue-reference signal during each switching pulse interval.

The switching pulses of the generator 2–12 also so control the saturation switch amplifier unit 2–19 as to permit translation of the saturation signal represented by the curve E of FIG. 4 and which is developed by the chrominance decoder 2–13, during the intervals between switching pulses but cause translation during each switching pulse of a standard reference saturation signal amplitude represented by the uniform amplitude portions E′ of curve E. It may be noted that the standard reference saturation signal amplitude represented by the portion E′ of curve E corresponds to more than 100% saturation and is supplied with this amplitude to the generator 2–20 to effect, as explained in connection with FIG. 3, a stair-stepped scanning motion of the cathode-ray beam without movement between steps (i.e., a stepped scanning motion such as that represented by curve G of FIG. 3*e*). A one-half amplitude saturation signal is supplied from the amplifier 2–19 to the adder 2–21 for a purpose presently to be explained.

The saturation switch signal translated by the saturation switch amplifier 2–19 so controls the velocity modulation deflection generator 2–20 as to cause this unit to generate a saw-tooth reverse-scan signal, represented by curve F in FIG. 4, having a periodicity corresponding to that of the phase reference pulses represented by curve A and having an amplitude varying with the amplitude of the color saturation signal represented by curve E (including its standard reference amplitude portions E′). The adder 2–21 combines the hue separation signal translated by the amplifier 2–18, the half-amplitude color saturation signal translated by the amplifier 2–19, the saw-tooth reverse-scan deflection signal generated by the generator 2–20, and reverse-polarity half-amplitude switching pulses to develop and apply to the deflection electrodes 1–23 a composite chrominance selection signal represented by curve G of FIG. 4. The half-amplitude saturation signal component of this composite signal is effective to maintain the electrical axis of the saw-tooth reverse-scan deflection signal centered upon a phosphor stripe selected at any time by the hue separation signal as explained in connection with FIGS. 3*b* and 3*c*. The composite chrominance selection signal is thus effective by control of the scanning beam movement, as explained in connection with FIG. 3, to select image hue and to control the hue saturation in the color image reproduced by the picture tube.

The scan error correction units 2–23—2–25 maintain automatic correction of the cathode-ray beam positioning as the beam moves across the phosphor stripes in timed relation to successive chrominance carrier cycles, thus insuring correct hue selection throughout a scanned line. To this end, the horizontal line scan amplitude has a value selected silghtly less than normal so that the beam tends to lag very slightly behind its correct positioning as indicated by the projection of the phase reference pulses of curve A of FIG. 4 onto the fluorescent screen illustrated in FIG. 4*a*. This lag corresponds to the slight crowding of the sets of tricolor phosphors as positioned between the secondary emissive stripes 4–12, but does not allow for the narrow non-light producing zero reference position space which follows each secondary emissive stripe 4–12. It will be noted from FIG. 4*a* that this reference position space is positioned at the region of a green hue selection position of the fluorescent screen, which position it will later be shown corresponds closely to the green hue phase angle of the circularly-converted chrominance carrier signal. Upon the occurrence of each switching pulse represented by curve B of FIG. 4, the cathode-ray beam current is established at a reference value represented by the portion C′ of curve C, the hue separation signal is effectively established at the green hue selection amplitude represented by the portion D″ of curve D and thus immediately effects movement of the cathode-ray beam positioning to the region of a secondary emissive stripe 4–12, and the color saturation signal is also raised to maximum amplitude represented by the portion E′ of curve E to cause the generation of a maximum amplitude saw-tooth reverse-scan signal which halts scanning motion of the cathode-ray beam to maintain it positioned on the secondary emissive stripe 4–12. The resultant secondary emission from the secondary emissive stripe 4–12 is collected by the collector grid structure 2–22 of the picture tube to develop and apply to the error pulse amplifier 2–23 a correction potential pulse represented by curve H of FIG. 4. This pulse is applied to the discriminator 2–24 to produce an error correction potential change represented by curve I of FIG. 4 having an amplitude of change varying with the width of the error correction pulse represented by curve H. This error correction potential change is amplified by the amplifier 2–25 and is applied to the deflection electrodes 1–23 to move the cathode-ray beam forward toward the zero reference position of the fluorescent screen. As the beam moves onto the reference position, it moves off of the secondary emissive stripe 4–12 so that the production of secondary emission is reduced and the error correction pulse terminates. Thus if the beam position lags unduly, secondary emission from the secondary emissive stripe 4–12 occurs during a longer interval to produce an error correction pulse of wider width as represented by the broken-line portion H′ of curve H and this in turn produces an error correction potential change of larger amplitude as represented by the broken line curve I′ of FIG. 4 to effect a greater forward displacement of the cathode-ray beam sufficient to insure its movement into the zero reference position of the fluorescent screen during the interval of a switching pulse. Accordingly, the termination of each switching pulse finds the cathode-ray beam correctly located at the zero reference position in readiness to begin its continued forward scanning motion toward the next reference position at which a similar position corrective operation will take place.

It may be noted in respect to this error corrective operation that, as earlier mentioned, a similar corrective positioning of the beam takes place following the line retrace interval to leave the beam positioned just off the inner edge of a broad secondary emissive stripe located just to the left of the image reproduction area of the picture tube. The magnitude of this error correction potential over a line scan interval reflects, on a cumulative basis, deviations of the horizontal scan amplitude and phase from normal. Thus if the phase is normal but the scan amplitude is excessive, the amplitude of the error correction potential has a finite value at the initiation of line scan and cumulatively decreases with subsequent repetitive error corrections as the beam moves to the center of the image area and thereafter cumulatively increases by repetitive error corrections made as the beam moves from the center of the image area to the right hand margin thereof. Retarded phase of horizontal scan tends cumulatively to increase the error signal amplitude throughout the line scanning interval. The range of error correction potential change throughout a line interval is indicated by the minimum-amplitude and maximum-amplitude broken lines I'' and I''' associated with curve I in FIG. 4. It will be evident from the foregoing description of the line-interval deflection error correction operation that the waveform of the error correction voltage during a line scanning interval provides a continuous plot of the errors in the major deflection system including amplitude and centering or phasing errors as well as deflection nonlinearities. The error correction minimizes the linearity requirements on the horizontal scanning system, yet at the same time enables use of the linearity correction potential for automatic adjustment of the amplitude and phase of the horizontal deflection system to maintain them within the range of correction capability of the error correction system as will hereinafter be explained more fully in the detailed description of the horizontal scanning units 1–26—1–28.

It will be evident from the foregoing description of the FIG. 2 arrangement that the method of color separation employed imposes no restrictions on the cathode-ray beam efficiency and introduces no requirements for any close alignment accuracies such as are required in using an apertured-mask type of image reproduction picture tube or one employing color separation beam-deflection grids. A receiver embodying the present invention requires a minimum of energy for color separation, and utilizes the cathode-ray beam full time regardless of signal color content.

The detailed construcion and operation of those component units in FIG. 2 which are not conventional will now be considered beginning with the phase reference and blanking pulse generator unit 2–11 and the switching pulse generator 2–12.

*Reference phase and blanking pulse generator 2–11 and switch pulse generator 2–12*

The circuit arrangement of the phase reference pulse generator, the blanking pulse generator, and the switching pulse generator is shown in FIG. 5.

It includes a transistor amplifier 5–19 of conventional construction and to which the output reference subcarrier of the generator 2–10 of FIG. 2 is supplied for amplification. It is to be noted in this respect that the reference subcarrier after generation by the generator 2–10 has its phase shifted in the output circuit of the latter to a phase angle of 19° (considered with reference to the video signal subcarrier burst synchronizing oscillation at 180°). The primary winding 5–11 of a transformer 5–12 is included in the collector circuit of the transistor amplifier 5–10 and is tuned by a condenser 5–13 to resonance at the subcarrier frequency so that sinusoidal subcarrier oscillations are developed across the transformer primary winding 5–11. Sinusoidal subcarrier oscillations are accordingly developed in the center-tapped secondary winding 5–14 of the transformer 5–12 and are full-wave rectified by diode rectifiers 5–15 and 5–16 to develop across a resistor 5–17 a voltage of full-wave rectification waveform and having a periodicity twice that of the subcarrier oscillations. This voltage of full-wave rectification waveform is applied to the base electrode of a conventional transistor amplifier 5–18 which includes the resistor 5–17 in its base bias circuit, and the polarity of the voltage is such that the amplifier 5–18 is non-conductive except for the very short intervals when the full-wave rectification voltage is near its zero voltage value. There is thus developed across the collector load resistor 5–19 of the amplifier 5–18 phase reference pulses of brief pulse duration and having a periodicity twice that of the reference subcarrier signal. These phase reference pulses are supplied through an output circuit 5–20 to the chrominance decoder 2–13 and the velocity modulation deflection generator 2–20 described hereinafter in reference FIGS. 11 and 12.

The phase reference potential pulses developed across the load resistor 5–19 are supplied through a diode rectifier 5–23 to a resistive potential divider comprised by series resistors 5–24 and 5–25 which reduces the amplitude of the pulses and supplies them to a blanking pulse output circuit 5–26. Horizontal retrace pulses from the horizontal amplifier 1–28, described more fully hereinafter, are supplied through a diode rectifier 5–27 to an amplitude limiting diode rectifier 5–28 having its cathode biased by a source of positive potential as shown to establish a preselected amplitude limiting level. The horizontal retrace pulses thus limited in amplitude to provide retrace blanking pulses are also supplied to the blanking pulse output circuit 5–26.

The phase reference pulses developed across the load resistor 5–19 are also coupled through a condenser 5–30 to the common emitter electrodes of a pair of transistors 5–31 and 5–32 which have base and collector electrodes cross-coupled to provide a conventional bistable multivibrator utilizing a common cathode coupling resistor 5–33 and providing a first pulse-periodicity divider stages 5–34. Potential pulses developed in the collector electrode circuit of the transistor 5–32 are coupled through a condenser 5–35 to the common emitter electrodes of a pair of transistors 5–36 and 5–37 likewise having base and collector electrodes cross-coupled to provide a conventional bistable multivibrator using a common cathode coupled resistor 5–38 and providing a second pulse-periodicity divider stage 5–39. Potential pulses developed in the collector circuit of the transistor 5–37 are coupled through a condenser 5–41 to the common emitter electrodes of a pair of transistors 5–42 and 5–43 having base and collector electrodes cross-coupled to provide a conventional bistable multivibrator utilizing a common cathode coupling resistor 5–44 and providing a third pulse-periodicity divider stage 5–45. A fourth bistable multivibrator 5–46 likewise includes a pair of transistors 5–47 and 5–48 having emitter electrodes connected together and utilizing a common cathode coupling resistor 5–49 and having base and emitter electrodes cross-coupled to provide a conventional bistable multivibrator. Negative potential pulses developed in the collector circuit of the transistor 5–42 are coupled through a condenser 5–50 to the collector electrode of a transistor 5–47 to render the latter conductive when the transistor 5–42 becomes conductive. Phase reference pulses developed across the load resistor 5–19 are coupled through a series condenser 5–52 to a shunt resistor 5–53, and phase reference pulses developed across the latter are supplied through a diode rectifier 5–54 to the base electrode of the transistor 5–48 to render the latter conductive one phase reference pulse interval after it has been rendered non-conductive by multivibrator operation. Potential pulses developed in the collector electrode circuit of the transistor 5–48 are coupled through a condenser 5–55 to a switching pulse output circuit 5–57 which, as earlier explained, extends to a number of the receiver component units to control their operations.

FIG. 6 graphically represents voltage waveforms developed at selected points in the generator arrangement just described. The full-wave rectifier potential developed across the rectifier load resistor 5–17 is represented by curve K of FIG. 6, and the phase reference pulses developed across the collector load resistor 5–19 of the transistor amplifier 5–18 are represented by curve L of FIG. 6. It will be apparent that a phase reference pulse is developed at the zero and 180 cyclic reference points of the reference subcarrier generated in the output circuit of the generator 2–10, so that the phase reference pulses have a periodicity twice that of the reference subcarrier signal. The output potential pulses of the first divider stage 5–34 are represented by curve M of FIG. 6, and it will be seen that they have a periodicity one-half that of the phase reference pulses represented by curve L of FIG. 6. The output pulses of the second divider stage 5–39 are represented by curve N of FIG. 6, and it will be seen that they have a periodicity one-quarter that of the phase reference pulses represented by curve L of FIG. 6. The output pulses of the third frequency divider stage 5–45 are represented by curve P of FIG. 6, and have a periodicity one-eighth that of the phase reference pulses. As shown by curve Q of FIG. 6, and as earlier mentioned, the conductive state of the transistor 5–42 of the third divider stage 5–45 causes the transistor 5–47 of the fourth divider stage 5–46 to be rendered also conductive but the next phase reference pulse renders the transistor 5–48 conductive. Thus the switching pulses developed in the collector circuit of the transistor 5–48 and supplied to the output circuit 5–57 have a pulse duration equal to the interval between the phase reference pulses and a pulse periodicity equal to one-eighth that of the phase reference pulses.

A representative one of the retrace-interval blanking pulses supplied to the output circuit 5–26 of FIG. 5 generator is represented by curve R of FIG. 7, and the combined retrace blanking pulse and phase reference blanking pulses developed in the output circuit 5–26 provide a composite blanking potential signal having the waveform represented by curve S of FIG. 7. Under present color transmission standards, the chrominance subcarrier frequency is related to the horizontal line scanning frequency by a factor of 227½ which is equal to 455/2. Therefore, the phase reference pulses have a periodicity equal to 455 times the horizontal line scanning periodicity whereas the switching pulses have a periodicity 455/8=56⅞ times the horizontal scanning frequency. In order to provide an even number of error samples during each horizontal scanning line as is required by the vertically oriented secondary emissive error sampling stripes earlier described in connection with FIG. 4, it is necessary that the sampling rate be a whole integer. To this end, and as shown in FIG. 5, the horizontal blanking pulses developed across the diode rectifier 5–28 are coupled through a condenser 5–59 to the emitter electrodes of the transistors 5–31 and 5–32 to provide an additional count upon each line retrace. This additional count causes the generation of 456/8=57 switching pulses during each complete line trace interval.

*Chrominance decoder unit 2–13*

Before considering the construction and operation of the chrominance decoder unit 2–13, it will be helpful to consider certain relationships between the luminance information and chrominance information carried by a present day color television signal. The characteristics of a particular illumination are typically represented in terms of the equivalent tri-stimulus values of three standard (CIE) or other suitable primary colors. They might equally well be represented in terms of the characteristics by which the psychological perception of light is interpreted. These are the brightness (A) or apparent intensity of illumination, the hue (H) which describes its relation to the pure achromatic colors, and the degree of purity or saturation (S) which is a measure of the departure from neutral (white) toward the achromatic boundary. FIG. 8*a* represents a color cone definitive of the operational characteristics of the present color TV receiver. An axial brightness vector A represents the brightness with which a color television image is reproduced, having maximum brightness at the base of the cone, and a vector S represents the saturation of a hue to be reproduced at the brightness A. The cone is bounded in diameter by the three color primaries used in television image reproduction so that a saturation vector S of amplitude extending to the cone boundary represents a hue saturation of 100% at the brightness A of reproduction. It will be evident that for full or 100% saturation the ratio of the length of the vector S corresponding to full saturation to the length of the vector A remains constant for any value of brightness A. This constant ratio relationship is utilized by the chrominance decoder in deriving the color saturation signal earlier described in connection with FIG. 4.

The phase angle of the saturation vector S with respect to a reference phase angle selects the hue to be reproduced at any time. This will be more evident from FIG. 8*b* which represents the chrominance plane of the color cone for maximum white. The phase orientations of the primary colors are shown in relation to the television chrominance subcarrier reference axis at zero phase, the reference subcarrier synchronizing burst when having a phase of 180°. In the present day color television signal, the chrominance (hue and saturation) information is carried by the chrominance subcarrier which is shifted in phase according to the hue to be reproduced and is modulated in amplitude principally as a function of the departure from white of the hue saturation to be reproduced. The chrominance subcarrier amplitude corresponding to full or 100% saturation thus varies with phase-angle hue selection according to an elliptical function indicated in broken lines in FIG. 8*b*. The phase angle for selection of a red hue is 103° and its amplitude at full saturation has a relative value 0.632 as indicated by the arrow R, the phase angle for selection of a green hue is 240° with a relative amplitude for full saturation of 0.593 as indicated by the arrow G, and the phase angle for selection of a blue hue is 347° with a relative amplitude for full saturation of 0.447 as indicated by the arrow B.

It will be evident from the foregoing that the chrominance subcarrier conveys a certain amount of luminance information. The chrominance decoder 2–13 presently to be described converts the chrominance subcarrier with its elliptical hue-saturation amplitude-phase characteristic to one of circular function wherein the chrominance subcarrier amplitude corresponding to full or 100% saturation remains constant irrespective of the hue selection phase angle. In doing so, the hue selection phase angle is decreased by 13° so that the selection for a red hue occurs at a phase angle of 90°, the selection of a green hue occurs at a phase angle of 228°, and the selection of a blue hue occurs at a phase angle of 334° as indicated in FIG. 8*b*. The range of reproducible colors lies within the triangle shown in FIG. 8*b* and which is bounded by the red, green and blue primary hues. Hence, full saturation occurs only at the primary hues whereas the complementary hues (yellow, magenta, and cyan) can be reproduced only at one-half saturation since these complementary hues are reproduced by the addition of two primary colors themselves reproduced at full saturation but only for one-half duty cycle as previously explained in connection with FIG. 3. The brightness information carried by the chrominance subcarrier is extracted from the chrominance information by the chrominance decoder 2–13 and is added to the luminance video signal to provide a brightness signal carrying all brightness information. As indicated in FIG. 8*b*, this is accomplished by synchronously detecting the chrominance subcarrier by a reference subcarrier signal shifted in phase angle by 19° from the zero phase angle of the chrominance subcarrier. It is found that the brightness information component D carried by the chrominance subcarrier then has the valve $$D=0.58C\cos(\omega t+19°)$$

where C represents the chrominance subcarrier amplitude and $\omega$ is its angular frequency. When this brightness component D is added to the luminance video signal Y, the brightness signal A then has the value $$A=Y+D=Y+0.58C\cos(\omega t+19°)$$

It will be noted that the chrominance demodulation reference angle of 19° is near a purplish hue.

FIG. 9 graphically represents the brightness signal composition and saturation signal amplitude when formed in the manner last described. White is represented as having unit brightness A and is composed of equal amounts (⅓) of blue, red and green light each reproduced with a duty cycle ratio (D.R.) of one-third (one-third of the total time devoted to reproduction of all colors). If a primary color is to be reproduced at equal brightness to white, and since it is reproduced in the present receiver at full duty cycle which provides three times as much light of a primary hue as that provided during the reproduction of white light, its reproduction should be accomplished by a brightness signal having an amplitude value of 0.33 the reference unit amplitude for the brightness A of white light, i.e., ⅓red×1*DR*). For a blue hue, the television luminance signal has 0.11 unit of brightness and the chrominance decoder 2–13 extracts from the chrominance information the brightness difference component D which when added to the luminance signal provides a brightness signal A having the required amplitude of 0.33. For a red hue, the luminance signal has an amplitude of 0.30 and here again the brightness component D is derived and added to the luminance signal to provide a brightness signal A having the amplitude value 0.33. For a green hue, the luminance signal has an amplitude value 0.59 and a chrominance difference component D now subtracts from the luminance signal again to provide a brightness signal A having the amplitude value 0.33.

The complementary colors are made up of equal amounts of two primaries which are sequentially presented with a duty ratio of one-half. Therefore, for reproduction of a complementary color having equal brightness to white light the amplitude of the brightness signal A should be two-thirds that of its brightness for white light [i.e., ⅔red×½*DR*+⅔blue×½*DR*]. Since the luminance signal for magenta hue has the amplitude value 0.41, the brightness component D extracted from the chrominance information is added to the luminance signal to provide a brightness signal A having an amplitude value of 0.67 as shown in FIG. 9. For a yellow hue, the chrominance information luminance difference D is subtracted from the luminance signal of value 0.80 again to provide a brightness signal amplitude having a value 0.67. For a cyan hue, the luminance information difference D of the chrominance information again is subtracted from the luminance signal of amplitude 0.76 to provide a brightness signal A of amplitude value 0.67.

It will be appreciated that the chrominance carrier has maximum amplitude for full saturation at the achromatic colors but decreases to zero amplitude for neutral (white or black) light output. The converted chrominance carrier signal derived by the chrominance decoder 2–13 has a half cycle peak amplitude equal to two-thirds the amplitude of the brightness signal corresponding to maximum white, and half cycles of such carrier are shown in FIG. 9 in association with the derived brightness signal A for each primary and complementary color hue. It was earlier explained that the ratio of the chrominance carrier amplitude to the brightness signal remained constant for full or 100% saturation without regard to the brightness signal amplitude value. Thus at 100% as shown in FIG. 10, the chrominance decoder 2–13 derives a saturation signal having an amplitude of two units for each of the primary colors (since the chrominance carrier has a half-cycle peak amplitude twice that of the brightness signal) and having unit amplitude for the complementary colors where the half-cyclic peak amplitude of the chrominance carrier is equal to the amplitude of the brightness signal.

The construction of the chrominance decoder 2–13 is shown in FIG 11. The reference subcarrier generator 2–10 extracts from the color video signal, translated by the video amplifier 1–20 to the input circuit 11–11 of the chrominance decoder, the subcarrier synchronizing burst and compares it in a phase detector with the oscillations of the generator 2–10. The phase detector output potential is used to lock the phase of the generator 2–10 to that of the synchronizing burst. The oscillations generated by the generator 2–10 are shifted in the output circuit of the generator from the subcarrier synchronizing burst phase of 180° to a phase of 19° for purposes presently to be explained, and the resultant phase shifted reference subcarrier is supplied from the output circuit of the generator 2–10 to an output circuit 11–12 extending to the phase reference and blanking pulse generater 2–11 (FIG. 2). The chrominance subcarrier of the color video signal supplied to the input circuit 11–11 is extracted from the video signal by a conventional chrominance carrier amplifier 11–13, and the extracted chrominance subcarrier is amplified and shifted 180° in phase by the amplifier 11–13 and supplied through a resistor 11–14 to the input circuit of an amplifier 11–15 to which the video signal is also supplied through a resistor 11–16. The chrominance subcarrier is thus removed from the video signal in the input circuit of the amplifier 11–15. The amplified output chrominance subcarrier signal of the amplifier 11–13 at zero reference phase is also supplied to a conventional synchronous detector 11–17 to which is also supplied the reference subcarrier generated by the generator 2–10. The synchronous detector 11–17 derives from the chrominance subcarrier the brightness information thereof to provide the brightness difference component D earlier mentioned in connection with FIGS. 8*b* and 9. This brightness difference component D is translated through a band pass filter (having a band pass from zero through 1.3 megacycles per second) in the output circuit of the detector 11–17 and the filtered brightness component D is supplied through a resistor 11–18 to the input circuit of the amplifier 11–15 where it adds to the luminance signal to provide a brightness signal A conveying all brightness information of the television image. This brightness signal of positive polarity is amplified by the amplifier 11–15, which also inverts its polarity, and is supplied through a resistor 11–19 to an output circuit 11–20 of the chrominance decoder unit.

As earlier mentioned, the brightness signal and the chrominance sub-carrier contain the essential information necessary to generate a saturation signal while the hue information is contained in the phase of the chrominance sub-carrier. As previously explained in connection with FIGS. 8*a* and 8*b*, a new chrominance sub-carrier signal is derived by the chrominance decoder and this newly derived signal has constant amplitude corresponding to full saturation at any hue but decreases to zero amplitude as the hue desaturates to white light or the brightness decreases to zero corresponding to a black area of the reproduced image. As also explained in connection with FIG. 8*b*, the chrominance sub-carrier signal transmitted according to present day transmission standards has an amplitude varying with hue selection according to an elliptical function with the major elliptical axis near the red hue and the minor elliptical axis along the axis of the sub-carrier synchronizing burst signal. This chrominance carrier is converted by the chrominance decoder to a chrominance carrier having uniform carrier amplitude at all hue selection phase angles and thus one corresponding to a circular function with hue selection. Such conversion is accomplished by supplying the chrominance carrier developed in the output circuit of the amplifier 11–13 to an elliptical to circular chrominance converter unit 11–24 to which is also supplied, at a phase angle of 4.9° and at 0.19 amplitude, a double frequency (i.e. 7.2 megacycle) sub-carrier provided by a doubler unit 11–25 from the output sub-carrier reference signal of the generator 2–10. The unit 11–24 is conventional except that its chrominance carrier output circuit provides a 180° phase shift (see "Processing of the NTSC Color Signal for One-Gun Sequential Color Displays" by Loughlin, page 299 of the January 1954 issue of Proceedings of the IRE).

The newly derived converted-amplitude chrominance sub-carrier is developed in the output circuit of the converter 11–24 and is supplied to a control electrode 11–26 of a penthode tube 11–27 which is included with a similar tube 11–28 in a saturation ratio regulator 11–29. The converted subcarrier signal is used by the regulator unit 11–29 to derive a saturation-function signal $f(S)$ having an amplitude given by the relation $$f(S)=C/A \qquad (1)$$

where C represents the amplitude of the newly derived sub-carrier signal having a half cycle peak-amplitude value of two-thirds times the amplitude A of the brightness signal corresponding to white light as previously explained in connection with FIGS. 9 and 10. To this end, the brightness signal of amplitude A is applied through a low pass filter 11–30 (having a band pass of 0–0.5 megacycle) to a control electrode 11–31 of the tube 11–28 corresponding to the control electrode 11–26 of the tube 11–27 as shown. The tubes 11–26 and 11–28 have respective anode load resistors 11–32 and 11–33, and a resistor 11–34 directly couples the anode of the tube 11–28 to a high transconductance control electrode 11–35 of the latter. The control electrode 11–35 is electrically connected to a corresponding high transconductance control electrode 11–36 of the tube 11–27. The cathodes of the tubes 11–27 and 11–28 are connected to ground, and the control electrodes 11–35 and 11–36 are provided with an operating bias potential by a resistive potential divider connected between the positive and negative terminals of an energizing voltage source E and which includes the resistors 11–33, 11–34 and a resistor 11–38. In operation, the resistor 11–34 which couples the anode of the tube 11–28 to its high conductance control electrode 11–35 provides a large amount of degeneration which causes the anode voltage of the tube 11–28 to remain substantially constant with variations of the brightness signal amplitude applied to the control electrode 11–31. Thus if the brightness signal amplitude increases in a positive direction at the control electrode 11–31, the anode potential tends to decrease but this decrease of potential is supplied through the resistor 11–34 to the high transconductance control electrode 11–35 which tends by reducing the anode current to restore the anode voltage to its initial value. This is accomplished at high gain due to the high transconductance of the control electrode 11–35, so that the product of the transconductances of the control electrodes 11–31 and 11–35 is substantially equal to a constant. That is, the transconductance product may be expressed by the relation $$G_1G_2=K \qquad (2)$$

where $G_1$ is the transconductance of the control electrode 11–35 and $G_2$ that of the control electrode 11–31. It follows from this relationship that the transconductance $G_{11}$ of the control electrode 11–35 or 11–36 has the following relation to the transconductance $G_{21}$ of the control electrode 11–31 or 11–26 to the associated control electrode 11–35 or 11–36

$$G_{11}=K/D_{21}=G_{12} \qquad (3)$$

where $G_{12}$ is the transconductance of the control electrode 11–35 or 11–36 to the control electrode 11–31 or 11–26.

Now if the chrominance sub-carrier signal C which is applied to the control electrode 11–26 of the tube 11–27 remains proportional in amplitude to the brightness signal A applied to the control electrode 11–31 of the tube 11–28, the resultant amplitude of the saturation-function signal $f(S)$ developed in the output circuit of the tube 11–27 remains constant regardless of the magnitudes of the brightness signal and chrominance sub-carrier signal. If the ratio of the brightness signal or the chrominance sub-carrier signal should change, however, the saturation-function signal $f(S)$ developed in the output circuit of the tube 11–27 will correspondingly change in amplitude in accordance with the relation $$G_{12}G_{22}=KG_{22}/G_{21}=KC/A=f(S) \qquad (4)$$

It is thus evident that the saturation-function signal $f(S)$ developed in the output circuit of the tube 11–27 has an amplitude functionally representative of a hue saturation value for any prevailing amplitude value of the brightness signal A. The tube 11–27 effects a phase reversal of the signal applied to its control electrode 11–26 so that the saturation-function signal $f(S)$ has the same phase as the chrominance carrier applied to the unit 11–24. The saturation-function signal $f(S)$ is applied from the output circuit of the tube 11–27 through a coupling condenser 11–40 to derive in an output circuit 11–42 of the chrominance decoder a unidirectional color saturation signal having an amplitude varying with that of the saturation-function signal $f(S)$ and represented by curve E of FIG. 4. This derived color saturation signal has an interesting property which will now be considered.

The primary color signals developed by the television camera at a transmitting station are gamma corrected before using them to develop the luminance signal and to modulate the chrominance sub-carrier signal. The purpose of this gamma correction is to correct for the gamma response of the cathode-ray image reproducing tube of the receiver, which does not control the cathode-ray beam current in a linear proportionality with respect to the amplitude of the video signal applied to the beam current control electrodes of the tube. The gamma correction provides a proper brightness signal A derived in the manner just described and which is used to modulate the beam intensity of the picture tube 1–22, and does not appreciably distort the phase angle of the saturation-function signal $f(S)$ which is used for hue selection signal generation in a manner presently to be described. It does, however, introduce substantial amplitude distortion into the saturation value of the saturation vector S previously discussed in relation to FIGS. 8*a* and 8*b*. Before considering furthere this matter of amplitude distortion of the saturation vector S, there are certain factors which should be considered concerning saturation control of reproduced hues by the method of color separation selection previously described in connection with FIG. 3.

It was explained in discussing FIG. 3 that the amplitude of the saw-tooth reverse-scan potential controls the saturation of any reproduced hue. It can be shown that if the amplitude of the saw-tooth potential is to vary linearly with the amplitude of the saturation vectors S (FIGS. 8*a* and 8*b*), then the scanning beam width in the direction of horizontal scan should be very small compared to a stripe width. For wider beam widths as is desirable in practice, the amplitude of the saw-tooth potential must vary non-linearly with the amplitude of the saturation vector S (free of gamma-correction amplitude distortion) if correct saturation reproduction is to prevail for all amplitudes of the saturation vector. The required non-linear variation in this respect is such that the amplitude of the saw-tooth potential must become progressively larger with increasing amplitude values of the saturation vector S.

Consider now the earlier mentioned amplitude distortion of the saturation vector S caused by gamma-correction of the chrominance carrier signal and the brightness signal. This distortion is in a direction to increase the amplitudes of these signals more rapidly at low signal levels than at high levels. This has the effect of producing colors with too much saturation at low signal levels as compared to correct saturation reproduction at high levels. For correct saturation reproduction under this condition of gamma-correction amplitude distortion of the saturation vector S, the amplitude of the saw-tooth saturation-control potential must again vary non-linearly in such manner that it becomes progressively larger with increasing values of the gamma-corrected saturation vector amplitude. As was explained in connection with FIG. 4, the amplitude of the saw-tooth reverse-scan saturation-control potential varies linearly with the amplitude of the color saturation signal (curve F of FIG. 4) and it was explained just above that the color saturation signal is derived from the saturation-function signal $f(S)$ developed in the output circuit of the saturation ratio regulators 11–29. As previously pointed out, the saturation-function signal $f(S)$ has an amplitude for 100% saturation established by the ratio of C/A to provide correct color saturation. For a constant value of the brightness signal A but for reduced amplitude values of the derived chrominance carrier signal C (i.e., desaturation of the reproduced hue), however, the amplitude of the saturation-function signal $f(S)$ varies non-linearly with changes of the amplitude of the derived chrominance carrier signal C. This non-linear variation results in reproduction of colors which are progressively less saturated than they should be as the amplitude of the chrominance carrier uniformly decreases. This non-linear variation as reflected in the amplitude of the drived color saturation signal causes the latter approximately to correct for the need to provide any non-linear variations in the amplitude of the saw-tooth reverse-scan saturation-control potential which as previously explained otherwise would be required for correct saturation reproduction by reason of the gamma-correction amplitude distortion of the saturation vector S and the desirable use of a finite beam width. Additional corrective non-linearity of the derived color saturation signal may be achieved by adjustment of the gain and operating (zero) point of the ratio regulator 11–29, both of which factors affect the linearity of operation of the regulator.

The chrominance decoder unit 2–13 also develops a unidirectional hue separation signal. To this end, the saturation-function signal $f(S)$ developed in the output circuit of the ratio regulator tube 11–27 is translated through an amplitude clipper unit 11–45 and a coupling condenser 11–46 to a common emitter electrode coupling resistor 11–47 of a pair of transistors 11–48 and 11–49 having base and collector electrodes intercoupled to provide a conventional bistable multivibrator counter 11–50. The amplitude clipper 11–45 is conventional and operates in conventional manner to clip the saturation-function signal and thus develop therefrom rectangular potential pulses having symmetrical positive and negative half-cycles and a cyclic period equal to that of the saturation-function signal. The leading and trailing edges of these pulses are differentiated by the condenser 11–46 and resistor 11–47 to produce sharp positive and negative pulses. The positive pulses, having the same periodicity as the saturation-function signal $f(S)$, cause the multivibrator counter 11–50 to operate in conventional binary counter mode so that there is developed in the collector output circuit of the transistor 11–49 pulses having twice the periodicity (one-half the frequency) of the saturation-function signal. These pulses are applied through a resistor 11–51, comprising one component of a summation input circuit, to the base electrode of a transistor 11–52 operating as a positive-peak amplitude clipper. The reference sub-carrier signal generated by the generator 2–10 is applied to an RC phase shifting network comprised by a series resistor 11–53 and a shunt condenser 11–54 to shift the phase of the sub-carrier signal by 90°. The phase shifted sub-carrier signal is supplied through a resistor 11–55 and a diode rectifier **11–55*a* to the common cathodes of a pair of transistors 11–56 and 11–57 having base and collector electrodes cross-coupled to provide a conventional bistable multivibrator counter 11–58. Phase reference pulses from the generator unit 2–11 (FIG. 2) are also supplied to the emitter electrodes of the transistors 11–56 and 11–57 through a coupling condenser 11–59 and the diode 11–55*a* so that the phase reference pulses are applied to the multivibrator counter 11–58** superimposed upon the phase shifted sub-carrier signal as represented by curve T of FIG. 11*a*. The peak amplitude of the reference sub-carrier signal is less than the emitter bias voltage so that the diode rectifier **11–55*a* becomes conductive only when the superimposed phase reference pulses exceed the emitter bias voltage. The multivibrator counter 11–58** thus responds only to every alternate phase reference pulse as indicated by the broken line T1 of FIG. 11*a* which indicates the triggering level of the multivibrator counter. There is thus developed in the collector electrode output circuit of the transistor 11–57 rectangular potential pulses having a periodicity twice that of the reference sub-carrier signal. These output pulses are supplied through a resistor 11–60 to the base electrode of the transistor amplifier 11–52.

There is thus applied to the base electrode of the transistor 11–52 rectangular waveform potential pulses represented by curve U of FIG. 11*a*, which are generated in the output circuit of the multivibrator counter 11–58 in synchronous relation with alternate ones of the phase reference pulses. Since the saturation signal S supplied to the amplifier clipper unit 11–45 is modulated in phase with hue selection (like the chrominance sub-carrier signal translated by the amplifier signal 11–13), the output potential pulses derived by the counter 11–50 from the saturation-function signal $f(S)$ are represented by curve V of FIG. 11*a* and have a phase shift corresponding to one-half of the phase shift of the saturation-function signal due to the halving of the periodicity of these pulses by the counter 11–58 in relation to the periodicity of the saturation-function signal. When the output pulses of the counter 11–50 as represented by curve V of FIG. 11*a* are added in the base electrode circuit of the transistor 11–52 to the output pulses of the counter 11–58, the resultant waveform of the pulse potential applied to the base electrode of the transistor 11–50 is that represented by the solid-line curve W of FIG. 11*a*. The base electrode of the transistor 11–52 is so biased through a resistor 11–63 from a source of bias potential −E that the transistor 11–52 becomes conductive only when the applied composite pulse potential amplitude exceeds a cut-off level indicated by the broken line X in FIG. 11*a*. It is thus evident that the transistor 11–52 is conductive for an interval dependent upon the phase relationship of the output potential pulses of the counters 11–50 and 11–58, having a maximum interval of conductivity when the pulses are in phase and zero interval of conductivity when the pulses are 180° out of phase. Since the phase relationship of the pulses supplied by the counter 11–50 varies in proportion to the phase of the saturation-function signal $f(S)$ from 0° to 360° for hue selection purposes, the unidirectional output potential of the transistor 11–52 likewise varies in amplitude with the phase of the saturation-function signal. It has minimum amplitude for a small phase shift of the saturation-function signal corresponding to a magenta hue selection and has maximum amplitude for a large saturation-function signal phase angle corresponding to the selection of a blue-purplish hue. This unidirectional hue selection signal, after translation through a low-pass filter comprised by a series inductor 11–64 and shunt condensers 11–65 and 11–66, is supplied to an output circuit 11–67 of the chrominance decoder and corresponds to the hue separation signal represented by the curve D of FIG. 4.

The amplitude of the saturation-function signal $f(S)$ is zero for reproduction of a white or black image area, and the counting operation of the multivibrator counter 11–50 halts while that of the multivibrator counter 11–58 may continue. To insure the proper interrelated phase-responsive counting operations of these counters, the collector electrode output circuit potential of the transistor 11–48 of the counter 11–50 is applied through a resistor 11–68 to a portion of a base bias resistor 11–69 of the transistor 11–56 to halt operation of the counter 11–58 whenever the counter 11–50 halts with the transistor 11–48 conductive. Reappearance of the saturation-function signal and resumed counting by the counter 11–50 then permits reinitiation of operation of the counter 11–58 in proper phase relationship. If the counter 11–50 halts with the transistors 11–49 conductive, the counting operation of the counter 11–58 continues but is halted (if its operation is not in proper phase with that of the counter 11–50) upon the next conductive interval of the transistor 11–48. This insures preservation of the correct phase relationships between the counting operations of the counters 11–50 and 11–58 at all times.

If desired, color balance shift may be achieved by supplying a portion of the hue separation signal, selected by adjustment of the position of a movable contact 11–69 along the resistive element 11–70 of a potentiometer connected across the output circuit 11–67, through a resistor 11–71 to the video output circuit 11–20 to provide an effective increase of the brightness signal for blue hue and a decrease of the brightness signal for red hue as compared to a green hue.

By reason of the mode of color separtion heretofore described, and wherein the beam deflection of the picture tube is halted for hue selection and is permitted to move as hue saturation shifts toward white (which is essentially a change in the method of operation from simultaneous color reproduction to sequential color reproduction), it is possible to achieve three times more color brightness than with the prior sequential type of color television receiver. This is because the required color brightness signal for full color saturation is only one-third the amplitude of the brightness signal when reproducing white light. This fact may be used to provide color enhancement. To this end, a proportionate part of the unidirectional saturation signal at the output circuit 11–42 is selected by the adjusted position of a contact 11–73 along the resistive element 11–74 of a potentiometer connected across the output circuit 11–42. This selected portion of the saturation signal is applied through a resistor 11–75 to a first control electrode 11–76 of a pentode amplifier tube 11–77, and the brightness signal A is applied to a second control electrode 11–78 of this tube. The output signal of the amplifier tube 11–77 is supplied through a resistor 11–79 to the video output circuit 11–20, and may provide as much as a three times multiplication of the brightness signal at full saturation and multiplication output at zero saturation. The brightness enhancement thus provided does not distrube the color balance or hue but does provide a very useful function in two important respects. Firstly, the color signals obtainable from many sources, particularly color film, is considerably desaturated compared to the original subject matter. The brightness enhancement provided enables a substantial improvement of the quality of the reproduced image in these instances. Secondly, the choice of primary colors and their limitation to positive light output precludes the reproduction of some of the more saturated colors. The eye is, however, a comparative device and psychologically for large color areas an increase in brightness of the given color compared to white is similar to a shift in white away from the color. This appears equivalent to increasing the saturation, and is a useful function of the brightness enhancement just described.

*The hue switching amplifier 2–18, the saturation signal switching amplifier 2–19, the velocity modulation signal generator 2–20, and the adder 2–21*

The construction of these component units is shown in FIG. 12. The velocity modulation deflection signal generator 2–20 is comprised by a condenser 12–10 which is charged from a source of potential +V through a series resistor 12–11, a coupling condenser 12–12 of relatively large capacitance, a series resistor 12–13, and a series resistor 12–14. As the condenser 12–10 charges during a trace portion of a saw-tooth potential which is developed across this condenser in a manner which will become more apparent hereinafter, an increasingly larger negative potential is applied to the base electrode of a transistor amplifier 12–15 to develop an increasingly larger positive potential in the collector electrode circuit of this transistor. Phase reference pulses generated by the phase reference generator described in connection with FIG. 5 are supplied from the output circuit 5–20 of the latter through a coupling condenser 12–16 and a series resistor 12–17 to the base electrode of a transistor 12–18 having a collector electrode energized from the positive terminal of the potential source +V and having an emitter electrode connected to the juncture of the coupling condenser 12–12 and the resistor 12–13. Each phase reference pulse, applied with positive polarity to the base electrode of the transistor 12–18, causes the latter to become highly conductive and this conductive state quickly reverse-charges the condenser 12–10 to develop the retrace portion of the saw-tooth voltage developed across the condenser 12–10. This reverse voltage when applied to the base electrode of the transistor 12–15 increases its conductivity and reduces its emitter electrode potential. Thus the saw-tooth potential developed across the condenser 12–10 is amplified and inverted in polarity by the transistor 12–15, and the amplified saw-tooth potential is supplied through a resistor 12–19 to the base electrode of an adder transistor 12–20.

The saturation signal developed in the output circuit 11–42 of the chrominance decoder last described in connection with FIG. 11 is supplied through a series resistor 12–24 to the base electrode of a transistor 12–25 which comprises the switching amplifier 2–19. The transistor 12–25 has its collector electrode energized through the resistor 12–14 and its base electrode biased through a resistor 12–26. The saturation signal is applied to the base electrode of the transistor 12–25 with positive polarity, so that increasing amplitudes of the saturation signal decrease the conductivity of the transistor 12–25. This decreased conductivity results in a decrease of the collector electrode energizing current supplied through the resistor 12–14, thus producing a smaller IR potential drop across this resistor. As a result, a larger potential is now supplied to charge the condenser 12–10 and thus increase the amplitude of the saw-tooth potential developed across this condenser. It is in this manner that the saturation signal controls the amplitude of the generated saw-tooth voltage which, as explained in reference FIGS. 3*d* and 3*e*, is the reverse-scan minor-deflection signal effective to control the saturation of a hue reproduced at any time by the cathode-ray beam of the picture tube. The saturation signal is amplified and inverted in polarity by the switching amplifier transistor 12–25, and the amplified saturation signal developed in the collector electrode circuit of this transistor is supplied through a half-amplitude reducing resistor 12–26 to be added with half amplitude in the base electrode circuit of the adder transistor 12–20 to the amplified saw-tooth potential supplied through the resistor 12–19.

The unidirectional hue separation signal developed in the output circuit 11–67 of the chrominance decoder just described in connection with FIG. 11 is supplied through a resistor 12–29 to the base electrode of a transistor 12–30 which comprises the switching amplifier 2–18. The hue separation signal has positive polarity as applied to the base electrode of the transistor 12–30, and is amplified and reversed in polarity by the transistor 12–30. The amplified hue separation signal is supplied through a resistor 12–31 to the base electrode of the adder transistor 12–20 for addition to the amplified half-amplitude saturation signal and amplified reverse-scan saw-tooth signal.

The resistive element 12–32 of a potentiometer is connected across a source of negative reference voltage, and the movable contact 12–33 of this potentiometer may be adjusted to supply a selected value of level adjust negative control potential through a resistor 12–34 to the base electrode of the adder transistor 12–20. This potential provides limited hue control adjustment of the composite signal developed in the collector electrode circuit of the adder transistor 12–20 and supplied as a chrominance selection output signal, represented by curve G of FIG. 4, to the cathode-ray beam deflection electrode 12–35 of the deflection electrode pair 1–23 of the picture tube. There is applied to the other of the deflecting electrodes 1–23 an error control potential derived by the error control system presently to be described.

It will be noted that the saw-tooth potential developed with negative polarity across the condenser 12–10 is inverted in polarity by the amplifier 12–15 and is applied with positive polarity to the adder transistor 12–20 which amplifies it and again inverts its polarity to apply it as a negative saw-tooth potential (the trace portion of the potential increasing in the negative direction with time) to the deflecting electrodes 1–23. The negative saw-tooth potential thus retards or halts the forward beam scanning motion in the major scanning direction shown by the arrow 12–36, and thus provides hue selection as earlier described in connection with FIG. 3. The positive polarity hue separation signal amplified and inverted in polarity by the transistor 12–30 is applied to the adder transistor 12–20 where it is further amplified and inverted in polarity to be applied as a positive deflection potential to the electrode 12–35, thus to advance the cathode-ray beam position according to the prevailing amplitude of the hue separation signal. The hue adjustment control voltage applied by the potentiometer 12–32 to the adder transistor 12–20 is likewise applied as a constant value of positive unidirectional voltage to the deflecting electrode 12–35 also to advance the position of the cathode-ray beam by a constant amount according to the magnitude of the hue control adjustment voltage. The saturation signal is amplified and inverted in polarity by the transistor amplifier 12–25, and the resistor 12–26 has a value selected such that the amplified saturation signal is applied with one-half amplitude to the adder transistor 12–20 which amplifies this signal and again inverts its polarity to apply it as a positive potential to the deflecting electrode 12–35. It was earlier explained that the amplitude of the saturation signal controls the amplitude of the saw-tooth voltage developed across the condenser 12–10, so that the one-half amplitude saturation signal applied to the adder transistor 12–20 effectively establishes the electrical axis of the saw-tooth voltage whereby the latter is able to center each stepped scanning motion of the cathode-ray beam on the color phosphor stripe selected by the hue separation signal as previously described in connection with FIG. 3.

During each cathode-ray beam position error correction operation, switching pulses generated by the switching pulse generator 2–12 are applied with positive polarity from the output circuit 5–57 of the latter through a resistor 12–40 to the base electrode of the switching amplifier transistor 12–25 to reduce the conductivity of the latter. This causes the collector voltage of the transistor 12–25 to increase in a negative direction until halted by a diode rectifier 12–41 having its anode electrode connected to a source of negative reference voltage as shown. A maximum amplitude saw-tooth potential is thereupon developed across the condenser 12–10 to halt the beam scanning motion, and a standard reference value of saturation signal is now applied through the resistor 12–26 to the adder transistor 12–20. The input switching pulse is also applied with positive polarity through a resistor 12–42 to the base electrode of the switching amplifier transistor 12–30 to decrease the conductivity of the latter and thus cause its collector voltage to increase in a negative direction until halted by a diode rectifier 12–43 having its anode connected to the negative reference voltage source. This causes a reference standard-amplitude hue separation signal to be applied to the adder transistor 12–20, but the amplitude of this hue separation signal is effectively reduced to one-half by application of a one-half amplitude switching pulse through a resistor 12–44 to the adder transistor 12–20. The resultant amplitude of the hue separation signal applied to the deflecting electrode 12–35 is such as to halt the cathode-ray beam on the position of what would be a green phosphor stripe but actually is one which includes a secondary electron emissive stripe 4–12 adjacent to a zero reference position of the picture tube fluorescent screen as previously explained in connection with FIG. 4. As will presently be explained more fully in connection with the operation of the automatic position error correction system next to be described, the beam current of the picture tube is controlled to a standard reference value at this time and an error correction signal is concurrently applied to the other of the deflection electrodes 1–23 from the error correction system.

*The error correction system including video switch amplifier 2–14, the video amplifier 2–23, the position error discriminator 2–24 and the error integrator amplifier 2–25*

The Automatic position error correction system has the circuit arrangement shown in FIG. 13 and includes a transistor 13–10 which normally receives and translates the brightness signal developed in the output circuit 11–20 of the chrominance decoder 2–13 earlier described in connection with FIG. 11. The transistor amplifier 13–10 is of the emitter-follower type and includes an emitter resistor 13–11 across which the brightness signal voltage is developed. The brightness signal is applied to the control electrode of a power amplifier tube 13–12 provided in the video amplifier 2–15, and the amplified brightness signal developed in the anode circuit of this tube is coupled through a condenser 13—13 to the beam modulation control electrode 13–14 of the picture tube 1–22. The amplified brightness signal is peak-stabilized on its black reference level in conventional manner by use of a diode rectifier 13–15 and shunt connected resistor 13–16 through which the control electrode 13–14 is negatively biased from a manually adjustable brightness control potentiometer 13–17 as shown.

During each error correction operational interval, a switching pulse generated in the output circuit 5–57 of the switching pulse generator 2–12 is applied to the base electrode of an emitter-follower transistor 13–20 to develop across an emitter resistor 13–21 a positive polarity switching pulse. This pulse is applied to the base electrode of a transistor 13–22 operating as an emitter-follower and utilizing the emitter resistor 13–11 in common with the emitter of the transistor 13–10. The switching pulse is also applied to the cathode electrode of an amplifier tube 13–12, which comprises the video amplifier 2–15, through a potential divider comprising an adjustable resistor 13–23 and a cathode resistor 13–24. The switching pulse renders the transistor 13–22 conductive to produce across the emitter-resistor 13–11 a positive potential pulse of sufficient amplitude to render the transistor 13–10 non-conductive and thus halt translation of the brightness signal to the amplifier tube 13–12. At the same time, the switching pulse developed across the emitter-resistor 13–11 is applied to the control electrode of the amplifier tube 13–12 but a portion of the pulse is concurrently applied to the cathode of this tube with an amplitude selected by adjustment of the value of the resistor 13–23. The resulting net amplitude of the switching pulse applied between the control electrode and cathode of the amplifier tube 13–12 develops in the output circuit of this tube a reference amplitude pulse which establishes a reference value of cathode-ray beam current. The latter in turn establishes the maximum amplitude of secondary electron emission from the secondary electron emissive error correction stripes 4–12 provided on the fluorescent screen of the picture tube as previously described in relation to FIG. 4*a*.

The secondary electrons emitted from the secondary emissive error correction stripes last mentioned are collected by the grid structure 2–22 which is positively biased, through a resistor 13–28 from a potential source 13–29, to a higher potential than the final anode of the cathode-ray gun as energized by the high voltage anode supply 1–30 here shown for convenience as comprised by a battery. The collector structure 2–22 is coupled through a condenser 13–30 to a resistor 13–31, and the collected secondary-emitted electrons accordingly develop across the resistor 13–31 an error correction pulse voltage of negative polarity. This voltage is applied to the error pulse amplifier 2–23 which includes a triode amplifier tube 13–32 normally having a zero value of control electrode-cathode bias and thus being normally fully conductive. The error control pulses applied to the control electrode of the tube 13–32 produce positive polarity error correction pulses in the anode circuit of this tube, and these positive pulses are coupled through a condenser 13–33 to a control electrode 13–34 of a pentode tube 13–35 included in the error discriminator unit 2–25. The control electrode 13–34 is connected through a resistor 13–36 to a negative bias voltage of such value that the tube 13–35 is biased to anode-current cut-off in the absence of such applied positive pulse. The non-conductive or cut-off state of the tube 13–35 permits a condenser 13–37 to charge through an adjustable resistor 13–38 included in the anode energizing circuit of the tube 13–35. The switching pulses developed across the resistor 13–21 as earlier explained are coupled through a condenser 13–39 to a high transconductance control electrode 13–40 of the tube 13–35 so that each switching pulse turns on the anode current of the tube 13–35 to an extent dependent upon and varying with the error pulse of constant amplitude but variable duration applied to the control electrode 13–34 from the error amplifier tube 13–32. The resultant increased conductivity of the discriminator tube 13–35 accordingly discharges the condenser 13–37 to an amount varying with the pulse duration of the error correction pulse applied to the control electrode 13–34. It will be evident that the condenser 13–37 thus increases its charge in the interval between switching pulses but has its charge reduced by the error pulses during each error correction operation of the error correction system so that its amplitude during each error correction operation and during the interval between error correction operations varies in a manner represented by curve I or curve I' of FIG. 4.

Each such error correction change of the potential developed across the condenser 13–37 is cumulative during each line trace and retrace interval and, as earlier mentioned, changes in amplitude during the line trace interval according to the nature and extent of any sweep amplitude or phase errors of the horizontal scan system. The error correction voltage thus developed across the condenser 13–37 is applied through a conductor 13–41 to the deflecting plate 13–42 of the pair of deflection plates 1–23 included in the picture tube to maintain the scanning beam correctly positioned in relation to successive groups or plural sets of tri-color phosphor stripes. The error correction voltage is also supplied through an output circuit 13–43 extending to the horizontal oscillator 1–27 and the horizontal amplifier 1–28 for purposes which will be explained hereinafter in describing the construction and operation of these units.

The mixed beam blanking pulses generated in the output circuit 5–26 of the generator previously described in connection with FIG. 5 are supplied through a coupling condenser 13–44 to the cathode of the picture tube 1–22 to extinguish the cathode-ray beam during the occurrence of each phase reference pulse and also during the horizontal line retrace blanking interval. This extinction of the cathode-ray beam principally serves to prevent reproduction by the tube 1–22 of any transients which may occur by reason of the initiation and termination of each error correction operation and the line retrace blanking operation.

The arrangement of the seconary emissive retrace-correction stripes earlier mentioned as being positioned to the right and left of the image area are illustrated in FIG. 14. There is one such stripe 14–10 positioned at the right hand side (viewed from the front of the image reproducing tube) and a plurality of such stripes 14–11, 14–12 and 14–13 positioned at the left of the image area. As just explained in connection with the error correction system of FIG. 13, a standard reference value of beam current is established during each error correction interval defined by the switching pulses. This continues through the retrace interval (even though the video signal is at the black amplitude level) except during the horizontal retrace blanking interval when the cathode-ray beam of the picture tube is extinguished by a blanking pulse generated by the FIG. 5 generator and supplied to the cathode of the tube through the coupling condenser 13–44 of the error correction system. Thus error correction of the beam positioning continues to the right of the image area until the blanking pulse begins, and resumes when the cathode-ray beam reaches its retrace position at the left and begins to move forward toward the image reproduction area. The corrective action in this instance is more rapid since the beam remains on the wide emissive stripes 14–10—14–13 throughout the error correction interval and the error correction pulses thus have prolonged pulse durations until such time as the beam is positioned just to the right edge of the innermost secondary emissive stripe 14–13 which occurs at the time the beam is ready to begin its scan across the tri-color sets of phosphor stripes 4–11 of the image reproduction area.

*Automatic frequency discriminator unit 1–26 and horizontal oscillator 1–27*

The automatic frequency discriminator and horizontal oscillator units have a circuit arrangement shown in FIG. 15 and include a conventional phase detector comprised by a phase-splitter triode vacuum tube 15–10 having a control electrode to which the horizontal synchronizing pulses are applied from the synchronizing signal separator 1–4. The tube 15–10 includes an anode load resistor 15–11 and cathode resistor 15–12 across which horizontal synchronizing pulses are developed with opposite polarities. These opposite polarity pulses are supplied to a rectifier system 15–13 which also receives horizontal reference saw-tooth potentials supplied from the output circuit 16–27 of the horizontal deflection amplifier hereinafter more fully described in connection with FIG. 16. A phase reference control potential is developed in the output circuit of the rectifier system 15–13 and is supplied through an RC filter network 15–14 to the control electrode of a triode tube 15–15. The latter is included with a triode tube 15–16 in a conventional cathode-coupled form of multi-vibrator utilizing a common cathode resistor 15–17 and having a horizontal frequency stabilizing shunt resonant circuit 15–18 included in the anode circuit of the tube 15–15.

Too large a positive voltage on the control electrode of the tube 15–15 or a negative voltage on the control electrode of the tube 15–16 tends to lower the periodicity of operation of the multivibrator, and this has the ultimate effect of delaying the deflection of the image tube cathode-ray beam with respect to the horizontal synchronizing pulses. This is equivalent to having the reproduced image shift to the left on the image reproducing area of the picture tube. Such a shift causes the error correction pulses to increase in duration and thus the error correction voltage developed in the output circuit 13–43 of the error correction system to decrease in amplitude for reasons previously explained in connection with FIG. 13. The error correction voltage is applied from the output circuit 13–43 of the error correction system through a resistive potential divider comprised by a series resistor 15–20 and a shunt resistor 15–21, and an error correction voltage of reduced amplitude is applied to the control electrode of a triode tube 15–23 having an anode load resistor 15–24. The anode potential of the tube 15–23 is applied through a resistive potential divider comprised by a resistor 15–25 and a resistor 15–26 to the control electrode of the multivibrator tube 15–16. A decrease in the magnitude of the error correction voltage applied to the tube 15–23 effects an increase of its anode voltage, and this is equivalent to applying a positive voltage to the control electrode of the tube 15–16 thus to raise the frequency of multivibrator oscillation which is equivalent to shifting the reproduced image to the right and thereby reduce the duration of the error corrective pulses supplied to the error correction system.

Thus the error correction voltage applied to the tube 15–23 provides an auxiliary phase stabilization against any tendency of the multivibrator oscillator to shift in frequency. In the use of auxiliary phase stabilization such as just described with normal phase lock and the usual horizontal scan amplitude control, the range of auxiliary operation should be limited to prevent the fine control of the auxiliary system from taking control during wide range adjustments of the horizontal scan deflection circuits. Such limiting is achieved by selection of the component values of the components associated with the tube 15–23 to provide control limits at each end of a small high gain amplitude range.

*The horizontal deflection unit 1–28 and high voltage unit 1–30*

The circuit arrangement of the horizontal deflection system and high voltage anode supply are shown in FIG. 16.

The horizontal deflection system includes a condenser 16–10 which is charged during the horizontal trace interval through a resistor 16–11 and series resistors 16–12 and 16–13. The condenser 16–10 is discharged during the horizontal retrace interval by a triode tube 16–14 which is rendered conductive by positive polarity horizontal drive pulses applied to its control electrode through a coupling condenser 16–15 from the output circuit 15–29 of the horizontal oscillator just described in connection with FIG. 15. The resultant saw-tooth and pulse voltage developed in the anode circuit of the tube 16–14 is coupled through a condenser 16–17 to the control electrode of a power amplifier tube 16–18. The amplifier tube 16–18 energizes the primary winding 16–19 of a horizontal scan transformer 16–20, the energizing circuit including a conventional B-boost circuit comprised by an L–C network 16–21 and a diode rectifier 16–22. The boost voltage energy is stored in the condensers of the network 16–21 and the adjustable inductor of this network provides conventional linearity correction. The transformer 16–20 includes a secondary winding 16–24 which energizes the horizontal scan winding 16–25 of the scanning yoke 1–29 through a resistor 16–26 across which there is developed a potential of saw-tooth waveform for supply through an output circuit 16–27 to the phase detector just described in connection with FIG. 15.

The high voltage supply 1–30 is conventional and includes a high voltage winding 16–29 provided on the transformer 16–20 and a rectifier 16–30 which develops across a filter condenser 16–31 a unidirectional high voltage for energization of tthe image reproducing tube through a high voltage output circuit 16–32.

In order to achieve optimum horizontal scan linearity and to enable the horizontal deflection system to respond to an amplitude control signal in a manner presently to be described, the power amplifier tube 16–18 is operated above the "knee" of its screen-anode saturation characteristic and a fixed value of negative bias potential is supplied to its control electrode from a regulated or constant-amplitude source of negative voltage through a resistive potential divider comprised by series resistor 16–35 and 16–36. Under these operating conditions and with proper choice of circuit component values, the amplitude of the saw-tooth and pulse energization of the scan transformer 16–20 varies linearly with changes in the potential at the juncture of the resistors 16–12 and 16–13 which potential control the magnitude of the charging current supplied to the condenser 16–10. The manner in which changes of the amplitude of this control potential are effected will now be considered.

A tap 16–37 on the transformer secondary winding 16–24 provides horizontal retrace blanking pulses which are supplied through a resistor 16–38 to an output circuit 16–39 extending to the generator unit previously described in connection with FIG. 5. These pulses are also supplied through a resistor 16–40 and a rectifier 16–41 to a condenser 16–42 to develop across the latter a positive unidirectional voltage varying in amplitude with the horizontal deflection scan amplitude. This voltage is coupled through a resistive potential divider comprised by a resistor 16–43, a resistor 16–44, and an adjustable resistor 16–45 to the negative regulated bias voltage source earlier mentioned. The resistive potential divider last mentioned effectively compares the positive voltage developed across the condenser 16–42 with a portion of the negative bias voltage and the net voltage of comparison is applied to the control electrode of an amplifier tube 16–47 having its anode connected to the juncture of the resistors 16–12 and 16–13. The net voltage applied to the control electrode of the tube 16–47 normally has a small negative value, and an increase in the voltage developed across the condenser 16–42 with increase in the horizontal deflection scan amplitude accordingly effects increased conductivity of the amplifier tube 16–47. This produces a larger voltage drop across the resistor 16–13 to decrease the amplitude of the saw-tooth and pulse voltage applied to the power amplifier tube 16–18, thus reducing the horizontal deflection scan amplitude. Conversely, a reduced value of voltage developed across the condenser 16–42 by a reduced horizontal deflection scan amplitude effects an increase of the saw-tooth-pulse voltage applied to the power amplifier tube 16–18 to increase the horizontal deflection scan amplitude. Thus a small change in the horizontal scan amplitude so controls the amplifier tube 16–47 as to provide by action of the latter a regulator control of the correct polarity to stabilize the voltage of the condenser 16–42 and thus stabilize the horizontal deflection scan amplitude. Adjustment of the value of the resistor 16–45 effects adjustment of the magnitude of the net voltage supplied to the control electrode of the tube 16–47 and accordingly provides a convenient horizontal size control coarse adjustment.

It will be apparent that control of the horizontal deflection scan amplitude may be effected by applying an appropriate potential to the control electrode of the regulator amplifier tube 16–47. Thus the parabolic vertical-frequency voltage developed in an output circuit of the focus modulation generator 2–27 may be applied with positive polarity through a condenser 16–50 and an adjustable resistor 16–51 to the control electrode of the regulator tube 16–47 to produce a scanning raster on the fluorescent screen of the image reproducing tube having decreased width at the top and bottom. This is the correction necessary for pincushion distortion, and accordingly a raster with straight sides may readily be attained.

It was previously explained in connection with the error control system of FIG. 13 that the amplitude of the error signal during a horizontal line trace interval is a measure of the difference between the size of the fluorescent screen with its secondary emissive error-correction stripes and the horizontal scan size. The error correction signal may thus be applied from the output circuit 13–43 of the error correction system through a coupling condenser 16–52 to the control electrode of an amplifier tube 16–53 for amplification of the signal and its peak-to-peak rectification by a rectifier system 16–54. The resultant unidirectional potential developed across the rectifier output condenser 16–55 is supplied through a resistor 16–56 to the control electrode of the regulator tube 16–47. The polarity of this voltage is such that an increase in the amplitude of the error signal during a line trace interval causes an increase in the horizontal deflection scan amplitude, thereby reducing this error. The error correction system output potential thus enables control of any scan distortion and drift which occur in the horizontal scanning system at frequencies below the horizontal line scanning frequency.

*Focus modulation generator 2–27*

To avoid spurious desaturation of a hue reproduced at any time, the beam width (in the direction of horizontal scan) relative to a phosphor stripe width should be maintained. The principal factor affecting beam cross-sectional size at the fluorescent screen is beam defocusing. It results from the fact that the focal distance changes with beam position on the fluorescent screen as a result of the relatively flat face plate typically used in the image reproducing tube. Correction of any beam defocusing may be achieved by refocusing the beam during the vertical and horizontal line scanning intervals as the beam moves from edge to edge and top to bottom of the image reproducing tube having an electrostatic focus element. The focus correction may be accomplished by applying to the focus element a relatively large negative voltage having both horizontal and vertical parabolic voltage components.

The focus modulation generator has a circuit arrangement shown in FIG. 17. The vertical deflection voltage developed across the vertical deflection winding of the deflection yoke 1–29 is applied through a resistor 17–10 connected in series with a condenser 17–11 to derive across the latter the saw-tooth scanning voltage component of vertical scan frequency. This derived voltage is applied through an adjustable resistor 17–12, a resistor 17–13, and a coupling condenser 17–14 to the base electrode of a transistor amplifier 17–15. A condenser 17–16 coupled between the collector and base electrodes of the transistor 17–15 causes the latter to operate as an integrator-amplifier-inverter to provide a positive polarity parabolic voltage of vertical scanning frequency at its collector electrode. This voltage is supplied through an output circuit 17–17 to the horizontal deflection system earlier described in connection with FIG. 16. The resistor 17–12 provides an adjustment of the amplitude of the output parabolic voltage.

The parabolic voltage developed in the collector circuit of the transistor 17–15 is also directly coupled through a resistor 17–18 to the control electrode of an amplifier tube 17–19 having its anode energized from a suitable source of voltage through an anode load resistor 17–20 and a decoupling choke 17–21. The amplified parabolic voltage is inverted in polarity by the amplifier tube 17–19 and is coupled through a coupling condenser 17–22 to a focus modulation output circuit 17–23 which is connected to the focus electrode of the image reproducing tube.

The horizontal scanning voltage developed across the horizontal scanning winding of the scanning yoke 1–29 by the horizontal deflection system just described in connection with FIG. 16 is supplied from the output circuit 16–28 of the latter to an RC integrating network comprised by a series resistor 17–25 and a series condenser 17–26 to develop across the latter the line frequency saw-tooth component of the horizontal scan voltage. This saw-tooth potential is applied through an adjustable resistor 17–27, a resistor 17–28, and a coupling condenser 17–29 to the control electrode of the tube 17–19. The control electrode-cathode bias of this tube is provided by a cathode resistor 17–30 having a shunt-connected condenser 17–31. A condenser 17–32 couples the anode and control electrode of the tube 17–19, and the value of this condenser and those of the coupling condenser 17–29 and cathode condenser 17–31 are selected sufficiently small as to have high impedance at the vertical scanning frequency so that they do not affect the amplifying characteristics of the tube 17–19 with respect the vertical frequency parabolic voltage. The condensers 17–29, 17–31 and 17–32 nevertheless have sufficiently low impedances, and the decoupling choke 17–21 has sufficiently high impedance, at the horizontal scanning frequency as to cause the tube 17–19 to operate as a feedback integrator-amplifier by reason of the feedback condenser 17–32 and thus convert the input saw-tooth voltage to one of line-frequency parabolic waveform. The amplified voltage of parabolic waveform likewise is coupled through the coupling condenser 17–32 to the output circuit 17–23, and the amplitude of the parabolic voltage is adjusted by adjustment of the resistor 17–27. A unidirectional focusing voltage of selectable amplitude is also applied to the focus output circuit 17–23 through a series-resistor 17–33 from the adjustable contact 17–34 of a potentiometer 17–35 connected across the energizing voltage for tube 17–19. The resultant focus modulation voltage supplied to the output circuit 17–23 has a unidirectional focus component of value selected by adjustment of the potentiometer contact 17–34, and has mixed vertical-frequency and horizontal frequency parabolic components of values selected by adjustment of the respective resistors 17–12 and 17–27 and thus is one suitable to provide overall uniform focus of the cathode-ray beam during its vertical and horizontal scanning movement over the fluorescent screen of the picture tube. The composite waveform of this output voltage, neglecting the unidirectional focusing component, is similar to that graphically shown in FIG. 17*a*.

The color television image reproduction system described above effects hue selection by selecting the number of color sets used in relation to the chrominance carrier frequency, and particularly by making the ratio of the number of horizontal-line color sets to carrier frequency cycles per horizontal scanning line a whole small number. In practice, this whole number ratio will usually have either the value one or two of which the latter value is preferable to attain a fine line image structure. Higher ratio values impose increasingly severe limitations upon the picture tube cathode-ray beam spot cross-sectional size, the difficulty of generating and translating with freedom from amplitude and phase distortions the hue selection and saturation signals, and the attainment of sufficiently accurate switching for error correction.

The modified form of color image reproduction system next to be described avoids the need to effect hue selection by use of a whole small number ratio of color sets to carrier frequency cycles, per scanning line. The modified system uses an even number of color sets within the length of the horizontal image reproduction line.

The modified system is described by way of example as using a different configuration of linear phase detector and a hue selection saw-tooth signal of different waveform than that previously described, as also using any number of color sets between error correction positions and particularly a smaller number than that first described, and by way of example as one having an odd number of color sets between the error correction positions. Further, error correction in the modified system utilizes an error-correction-position sampling interval significantly shorter than is used in the system first described, and the error correction position now intervenes between two adjacent color sets which enables the scanning beam to be jumped at high velocity over each error position during the image reproduction interval.

The manner in which the modified color image reproduction system effects hue selection and saturation control will be explained in relation to FIG. 18. The vertically oriented color stripe sequence and arrangement of successive color sets used in the fluorescent screen of the image reproducing tube is illustrated in FIG. 18*a* and is the same as that previously described in relation to FIG. 3. The manner of hue selection with stepped velocity modulation of the cathode ray beam as graphically represented in FIG. 18*b*, effected by the reverse scan minor deflection potential of saw-tooth waveform graphically represented in FIG. 18*c*, is also essentially the same as that previously described in relation to FIG. 3 except that the color reference is shown by way of example as being centered on red. Saturation control in the modified system differs, however, from that previously described. Thus referring to FIG. 18*d*, the reverse scan saw-tooth potential changes with decreasing saturation from the amplitude and waveform represented by the solid line curve R′–1 at 100% saturation to the 67% saturation value of reduced amplitude and waveform represented by the dot-and-dash curve R′–2 to the 33% saturation value of further reduced amplitude and waveform represented by dash-line curve R′–3 and has zero amplitude as indicated by the axis W for full desaturation. The stepped velocity modulation of the cathode-ray beam with changing saturation is now that graphically represented by FIG. 18*e*. It will be evident from FIG. 18*e* that the cathode-ray beam scans at a velocity decreasing from essentially infinite velocity represented by the solid-line curve R–1 at full saturation to progressively lesser velocities with decreasing saturation as represented by curves R–2 and R–3 (thus moving across three color phosphorous between each scan step), and dwells on the selected hue phosphor for a discrete time interval the value of which also decreases with decreasing saturation.

The modified form of color image reproduction system mentioned above is shown in block diagram form in FIG. 19, and components in FIG. 19 which correspond to the same components in FIGS. 1, 2 and 11 are identified by the same reference numerals. As previously noted, the modified system enables use of any number of color sets between adjacent ones of the error reference positions. The FIG. 19 system by way of example uses three such color sets between adjacent error reference positions, and it will be noted that this number of color sets is smaller and has odd value in contrast to the larger and even valued number of color sets used in the system first described above.

To this end, the modulated chrominance carrier of intermediate frequency value is abstracted from an intermediate frequency filter stage 19–10 interposed between the intermediate frequency amplifier 1–14 and the video detector 1–15. In particular, the filter stage 19–10 separates the modulated chrominance carrier signal of intermediate frequency from the intermediate frequency video and sound signals and supplies the separated chrominance carrier signal to a heterodyne mixer 19–11. The filter stage 19–10 also prevents or blocks the transmission of any significant amount of the modulated chrominance carrier signal to the video detector 1–15. The heterodyne mixer 19–11 also receives oscillations generated by a local oscillator 19–12 having an operating frequency controlled by a conventional reactance control unit 19–13 in a manner and for a purpose presently to be explained. For the moment, it may be explained that the oscillator 19–12 has an average operating frequency which differs from the intermediate frequency chrominance carrier signal by a value such that (1) the total number of cycles of the difference-frequency chrominance carrier signal during a complete horizontal scanning cycle interval is a whole integer (2) equal to the quotient of the horizontal scan interval divided by the line-averaged time interval required to scan between adjacent error reference positions. For the exemplary arrangement particularly described in relation to FIG. 19, wherein there are three color sets between adjacent error reference positions and there are the equivalent of 160 error reference positions which theoretically would be scanned if the scanning beam moved at constant velocity throughout the entire horizontal cycle time interval (including both trace and retrace intervals), the difference frequency last considered has a value of 7.56 megacycles per second. The chrominance carrier signal of this difference frequency is selected by a conventional filter unit 19–14 and is applied to the synchronous detector and filter unit 11–17 and to the ratio regulator 11–29.

The difference frequency established by the operating frequency of the oscillator 19–12 is maintained at the desired value by a control potential supplied from the output circuit 13–43 of the automatic error correction system through an error frequency control unit 19–15 and the output circuit 19–15′ of the latter to the reactance control unit 19–13. As previously explained in connection with FIG. 11, the error correction system comprised by the units 2–23, 2–24 and 2–25 develops an output potential having an amplitude change reflecting the cumulative beam positional error during a line trace interval. The error frequency control unit 19–15 translates the line-frequency component of the error potential in such manner that the oscillator 19–12, under control of the reactance control unit 19–13, has its frequency increased or decreased during the line trace interval to provide a corresponding frequency change of the difference-frequency chrominance carrier signal selected by the filter unit 19–14. This frequency change of the difference-frequency chrominance carrier signal changes its period to correspond more closely to the period required for the cathode-ray beam to traverse each color set during the trace interval. During the horizontal retrace interval, the error frequency control unit 19–15 controls the frequency of the oscillator 19–12 in opposite sense to that of the line trace interval change and by an amount such that the total number of cycles of the difference-frequency chrominance carrier signal has the whole integer value referred to above.

The present reproduction system also includes a reference frequency oscillator 19–16 having an operating frequency which is maintained equal to and in phase with the intermediate frequency chrominance carrier signal translated by the separator 19–10. This frequency and phase control is effected by a conventional phase detector 19–17 which receives the oscillations of the oscillator 19–16 and the intermediate frequency chrominance carrier signal of the separator 19–10. The phase detector 19–17 is controlled by the horizontal blanking pulses which are developed in the output circuit 16–39 of the horizontal deflection system of FIG. 16 earlier described, these blanking pulses having such time phase as to permit the phase detector 19–17 to be operative during the portion of each horizontal line retrace interval when the reference synchronizing burst signal is present in the intermediate frequency chrominance carrier signal. The conventional output phase-control potential of the phase detector 19–17 has an amplitude and phase varying with the phase difference and sense of difference between the reference oscillations of the oscillator 19–16 and the reference synchronizing burst signal oscillations. This phase-control potential is supplied to a conventional reactance control unit 19–18 which so controls the operating frequency of the oscillator 19–16 as to maintain it locked in frequency and phase with the reference synchronizing burst signal, thus causing the oscillator 19–16 to provide a reference source of oscillations having a frequency equal to that of the intermediate frequency chrominance carrier reference burst signal translated by the separator 19–10 during the latter part of the horizontal retrace interval.

A conventional heterodyne mixer 19–19 receives the oscillations generated by the oscillator 19–12 and those generated by the reference oscillator 19–16 and develops a difference-frequency reference sub-carrier signal of approximately 7.56 megacycles per second, which is selected and translated by a filter unit 19–21. The reference frequency sub-carrier signal appearing in the output of the filter unit 19–21 is translated by a phase shifting circuit 19–23 and a clipper unit 19–27 to the switch pulse generator included in a generator unit 19–30. It was previously mentioned that the present modified form of image reproduction system is herein described by way of example as using three color phosphor sets between adjacent error correction positions, and accordingly the switching pulse generator of the unit 19–30 generates and applies to the automatic error correction system 2–23, 2–24 and 2–25 one switching potential pulse for each three cycles of the reference frequency sub-carrier signal. The earlier described phase control of the reference oscillator 19–16 maintains its operating frequency at a constant difference from the average frequency of the oscillator 19–12, and thus the difference-frequency sub-carrier signal translated by the filter unit 19–21 has a frequency varying with the prevailing frequency of the oscillator 19–12. The number of color sets scanned by the scanning beam per unit of time should correspond to the frequency of the reference sub-carrier translated by the filter 19–21 when the oscillator 19–12 has its average frequency. The switching pulses of the generator 2–12 so control the error correction system that the error voltage, developed as previously described, in the output circuit 13–43 of this system accurately reflects the prevailing frequency departure of the oscillator 19–12 from its average frequency.

By reason of the heterodyning process employed and by which the chrominance intermediate frequency carrier signal is derived from a received color television signal as previously described in connection with FIG. 1, and by reason of the heterodyning process employed by use of the oscillator 19–12 and mixer 19–11, the difference-frequency chrominance carrier signal translated by the filter 19–14 is subject to prevailing change of its frequency both with respect to short-term transient and long-term drift character. Since it is the period of one cycle of the chrominance carrier which establishes the time interval within which one color phosphor set must be exactly scanned by the scanning beam of the image reproducing tube, an assumed perfectly linear rate of beam scanning would dictate that the difference-frequency chrominance carrier translated by the filter 19–14 have a preselected constant frequency value. For this assumed condition, the error correction voltage in the error system output circuit 13–43 would indicate any deviation (and the sense of such deviation) of the chrominance carrier signal translated by the filter 19–14 from its preselected frequency. Thus the error voltage may be used so to control the reactance control unit 19–13 as to shift the frequency of the oscillator 19–12 in a direction and to an extent as necessary to return the chrominance carrier signal translated by the filter 19–14 to its preselected frequency. It will be evident, however, that any prevailing non-linearity of the horizontal scan velocity of the scanning beam or any prevailing geometrical distortion appearing in the fabrication of the phosphor image reproduction screen will likewise create an error system output voltage even though the output chrominance carrier signal of the filter 19–14 has a precisely constant frequency. In this case, the frequency of the chrominance carrier signal should actually experience a corresponding change to correct for such non-linearity of scan or geometrical distortion. In such case, the error correction voltage again so controls the reactance control unit 19–13 and the frequency of the oscillator 19–12 as actually to provide the required corrective change of frequency of the output chrominance carrier signal of the filter 19–14. Non-linearities of horizontal scan velocity are reduced by supplying the error correction voltage to the horizontal deflection system as earlier explained in connection with FIGS. 15 and 16, and any remaining small non-linearity may be further compensated by supplying to the reactor control unit 19–13 a proportionate part of the horizontal-scan-frequency parabolic and/or saw-tooth voltage developed in the respective output circuits 17–23 and 16–27 of the generator described in connection with FIG. 17 and the horizontal deflection system described in connection with FIG. 16.

The chrominance carrier signal of the filter 19–14 and the reference sub-carrier signal of the filter 19–21, after translation of the latter to a 19° phase angle by a phase shifting circuit 19–25, are applied to the synchronous detector and filter unit 11–17 which operates as previously described in relation to FIG. 11 to derive and supply through the resistor 11–18 to the video switch unit 2–14 the brightness component of the chrominance carrier signal.

The chrominance carrier signal of the filter 19–14 and the 19° phase shifted sub-carrier signal of the filter 19–21 are applied to the elliptical-to-circular chrominance converter and ratio regulator system comprised by the units 11–24, 11–25, 11–29 and 11–30 which operate in the manner previously described in connection with FIG. 11 to derive and apply to the amplitude detector 11–41 and linear phase detector 19–26 the saturation-function signal $f(S)$. The linear phase detector 19–26 also is supplied with the reference sub-carrier signal of the filter 19–21 after translation through the phase shifting circuit 19–23 and a clipper 19–27 which clips both negative and positive half cycles of the delayed reference sub-carrier signal. The zero reference positions required for operation of the error correction system are each placed on the fluorescent screen of the image reproducing tube between green and blue phosphor stripes, this position corresponding to 270° (cyan) of the chrominance carrier signal. The saturation-function signal $f(S)$ from the ratio regulator is 180° phase displaced from the chrominance sub-carrier which places it in phase with the reference sub-carrier. Thus to place the reference sub-carrier at the 270° cyan phase angle, the delay circuit 19–23 provides a 90° phase delay. The linear phase detector 19–26 is responsive to the saturation-function signal and the delayed and clipped reference sub-carrier signal to derive, and apply to a modified form of velocity modulation deflection generator 19–29, a unidirectional hue selection signal potential having an amplitude which increases with hue selection progressing from green through red to blue.

The delayed and clipped reference sub-carrier signal translated by the clipper 19–27 is applied to the unit 19–30 which operates to develop positive-polarity and negative-polarity switching potential pulses each initiated at that point of time when the delayed reference sub-carrier signal reaches zero amplitude in going from a negative half cycle to a positive half cycle. The positive-polarity switching pulses are applied to the video switch 2–14 to control its translation operation as earlier explained, to a reference saw-tooth generator 19–31, and to the automatic error correction system. Both the positive-polarity and negative-polarity switching pulses are applied to a minor deflection switch unit 19–32.

The saw-tooth generator 19–31 develops and applies to the switch unit 19–32 an error position reference potential of saw-tooth waveform having increasing amplitude during each switching pulse and decreasing amplitude during the interval between successive switching pulses. This potential is combined with a constant value of unidirectional potential of such value that, when translated by the switching unit 19–32 to the reverse-scan deflecting electrodes 1–23, the cathode ray beam is deflected to a zero reference position of the fluorescent screen where it is held stationary during each switching pulse interval by the error position reference saw-tooth potential generated as just explained.

The unit 19–30 generates from the switching pulses a phase compensating potential of saw-tooth waveform and of the periodicity of the switching pulses and supplies this potential through an input circuit summation resistor 19–34 to a phase reference pulse-saw-tooth generator 19–35. The summation input circuit of the latter includes a resistor 19–36 through which the 90° delayed sub-carrier signal, translated by the delay circuit 19–23, is also applied to the generator 19–35. The generator 19–35 generates and applies to the saw-tooth generator 19–29 a phase reference saw-tooth potential of constant amplitude and having three equal saw-tooth cycles beginning at the trailing edge of each switching pulse and ending at the leading edge of the succeeding switching pulse.

The velocity modulation saw-tooth generator 19–29 receives from the amplitude detector 11–41 a unidirectional hue saturation signal. The generator 19–29 in responding to the hue selection signal of the phase detector 19–26 shifts the potential level of the phase reference saw-tooth potential generated by the generator 19–35 to accomplish hue selection as previously described in connection with FIGS. 18*b* and 18*c*. The generator 19–29 is responsive to the hue saturation signal of the amplitude detector 11–41 to modify the waveform and amplitude of the phase reference saw-tooth potential generated by the generator 19–35 to accomplish hue saturation control as previously described in connection with FIGS. 18*d* and 18*e*. The resultant phase reference saw-tooth potential as thus shifted in potential level and modified in amplitude and waveform constitutes a chrominance selection potential component of the reverse scan minor-deflection signal, and accordingly is supplied through a summation input-circuit resistor 19–38 to the minor deflection switch unit 19–32.

The chrominance selection potential developed by the unit 19–29 is also supplied through a summation input-circuit resistor 19–39 to a coincidence step generator 19–40. The summation input circuit of the latter also includes a resistor 19–41 through which is supplied a simulation saw-tooth potential generated by the unit 19–30. The purpose of this simulation potential is to simulate the major scan deflection during the interval extending from the trailing edge of each switching pulse to the leading edge of the succeeding switching pulse. The step generator 19–40 is responsive to the applied potentials to generate a coincidence step potential of pulse waveform of which the leading edge of each pulse, when generated, coincides with the trailing edge of a corresponding switching pulse and the duration of each coincidence pulse varies according to the prevailing waveform of the chrominance selection potential component supplied through the resistor 19–39. This coincidence pulse potential is supplied through a summation input circuit resistor 19–43 to the minor deflection switch unit 19–32.

The minor deflection switch unit 19–32 is responsive to the several applied potentials to develop and apply to the horizontal scan control deflection electrodes 1–23 a reverse-scan velocity-modulation potential effective to accomplish hue and saturation selection accompanied by error corrective scanning beam halt in a manner which will now be more particularly considered by reference to FIG. 20. FIG. 20*a* illustrates in horizontal cross section a portion of the image reproducing tube fluorescent screen similar to that of FIG. 4*a* earlier described, structural components in FIG. 20*a* corresponding to those of FIG. 4*a* being identified by the same reference numerals used in the latter figure. In the FIG. 20*a* screen construction, the zero reference position is shown by way of example as located between green and blue phosphor stripes rather than replacing a green phosphor stripe as in FIG. 4*a* and as previously noted there are three phosphor color sets positioned between adjacent error reference positions rather than the eight color sets used in the FIG. 4*a* construction.

Constant velocity major scan of the cathode-ray beam in the image reproducing tube is indicated in FIG. 20 by the sloping arrow W which represents a constant value of beam displacement per unit of time. As earlier explained, constant velocity beam displacement produces white light by creating equal amounts of red, blue and green phosphor emission. The solid-line curve B′ in FIG. 20 represents the reverse-scan potential applied to the reverse scan deflection electrodes of the picture tube for selection of a saturated blue hue, and the resultant stepped scan movement of the cathode-ray beam is that shown by the solid-line curve B centered on the blue phosphor stripes. Upon completion of scanning of three successive color sets, the reverse scan potential is provided with a forward-deflection pulse-saw-tooth-potential component which immediately deflects the beam forwardly to and retains it at an error reference position where secondary emission from a secondary emissive stripe 4–12 enables the automatic error correction system to provide corrective beam positioning as previously described. The deflection pulse-saw-tooth component which accomplishes this reference position beam deflection is represented by the solid-line portion of curve B′ in the time interval $t_0$–$t_a$ and is created by switching to a reference potential (generated by the generator 19–31) having a constant-amplitude reverse-scan saw-tooth component and a constant-valued unidirectional reference level amplitude component. Upon termination of the error corrective deflection pulse-saw-tooth component, the cathode-ray beam will immediately return to the displacement position which it occupied at the beginning of the error corrective interval except in the single instance where the beam in returning to its former displacement position is concurrently stepped forward by the forward-deflection retrace-portion of a fully saturated hue selection reverse-scan saw-tooth potential.

As the hue saturation progressively decreases, the amplitude and waveform of the reverse-scan potential changes in the manner previously described in relation to FIG. 18*d* with corresponding progressive decrease of beam forward scan velocity as described in relation to FIG. 18*e*. The changed amplitude and waveform of the reverse-scan potential with progressively decreasing hue saturation is represented in FIG. 20 by the dash-line curve B′–2 and dash-and-dot line curve B′–3. The corresponding horizontal scan velocities of the beam are represented in FIG. 20 by the dash-line curve B–2 and dash-and-dot line curve B–3. The broken-line curve B′–0 represents the zero saw-tooth amplitude value of the reverse-scan potential for zero hue saturation, and the corresponding dash-line curve B–0 represents the constant scan velocity of the beam in reproducing white light. It will be noted that in approaching complete desaturation of a blue hue, for example, the reverse-scan potential reflects the blue-hue selection unidirectional potential component earlier described in connection with FIG. 18*c* and this fact would tend to create a displacement lag of the cathode-ray beam position as indicated by the displacement between the dash-line curve B–0 and the reference white arrow W. In practice, however, such displacement would not actually be present at zero saturation since the linear phase detector would shift to the zero reference phase (270° chrominance signal phase) and provide an output value of hue selection voltage corresponding to the error correction voltage reference level and thus to reference white represented by the arrow W in FIG. 20.

It will be noted from the reverse-scan potential waveforms shown in FIG. 20 that the waveforms for any value of hue saturation is the same during scan of two color sets, but contains a reverse-scan impulse (negative) component immediately following each error corrective interval $t_o$–$t_a$ and a forward-scan impulse (positive) component appearing later in time by an amount varying with the hue desaturation (and with hue also). It is the reverse-scan impulse component which causes the first cycle of reverse-scan potential following the error correction interval at time $t_a$ to have the larger step-value of unidirectional component shown, and it is the forward-scan impulse component which causes this first cycle to have a steeply rising waveform portion AA'. The corresponding displacement effect of this first cycle of reverse-scan potential on the scanning beam position is evidenced by the initial reversed-step displacement immediately following the error corrective interval and by the forward-step displacement AA occurring later in time according to the amount of hue desaturation (and hue also). This forward-step displacement of the cathode-ray beam serves the important function of essentially instantaneous deflection of the beam across each non-light-emissive zero error correction position, and by a deflection amount corresponding to whatever width is selected for these positions, so that the beam always scans the correct phosphor stripe in its movement across the fluorescent screen. Thus, if the curves B', B'–2, B'–3, B, B–2, B–3 and B–0 in FIG. 20 are assumed to be shifted to the right in effecting selection of a red or green hue, the forward-step displacement portions AA and the error corrective positioning of the beam during each interval $t_o$–$t_a$ would nevertheless remain displacement-centered on one of the zero reference positions of the fluorescent screen again to serve their important function noted just above. In doing so, it will be evident that the forward-step displacement portions AA for selection of a red hue would occur sooner in point of time (for any given value of desaturation) following termination of the error corrective interval $t_o$–$t_a$ than for the selection of a blue hue as particularly illustrated in FIG. 20 and would occur even earlier in point of time following the interval $t_o$–$t_a$ for selection of a green hue.

The manner of generating the reverse-scan potential of waveform shown to the right in FIG. 20 will now be described more fully by reference to FIG. 21, wherein there are shown the electrical circuit arrangements of a number of component units used in the FIG. 19 image reproduction system, and to FIG. 22 which graphically represents certain voltages and voltage relationships occurring at selected points in the FIG. 21 arrangement.

The clipper 19–27 is comprised as shown in FIG. 21, by a transistor 21–10 to the base electrode of which there is applied through a resistor 21–11 the reference sub-carrier signal translated by the delay circuit 19–23 and graphically represented by curve BB of FIG. 22. The transistor 21–10 is driven to saturation conduction by each positive half cycle of the sub-carrier signal and to a non-conductive state by each negative half cycle thereof, so that there is developed across a collector load resistor 21–12 a clipped voltage of rectangular waveform represented by curve CC in FIG. 22. This voltage is supplied through a coupling condenser 21–13 to a series resistor 21–14 and inductor 21–15, to develop across the approximately critically damped inductor 21–15 a negative pulse potential coincident with the initial time $t_o$ of the error corrective interval $t_o$–$t_a$ earlier mentioned.

This negative pulse potential is translated through a rectifier device 21–16 to the collector electrode of a transistor 21–17 included with a transistor 21–18 in a bistable multivibrator provided in the linear phase detector 19–26, the negative potential pulse being effective to render the transistor 21–17 conductive if the latter is non-conductive at the time $t_o$. The linear phase detector also includes a clipper similar to that just described, those components of the second clipper which corresponds to similar components of the first-described clipper being identified by similar reference numerals primed. This second clipper derives from the saturation function signal $f(S)$, developed by the ratio regulator 11–29 as earlier described and represented by curve $f(S)$ in FIG. 22, a potential of rectangular pulse waveform represented by curve DD of FIG. 22. It was earlier explained that the reference sub-carrier signal has a reference phase corresponding to the 270° cyan phase angle of the saturation function signal which itself has a phase varying with the hue selection phase of the chrominance carrier signal, so that the rectangular waveform potential represented by curve DD is likewise variably displaced in phase with respect to the rectangular waveform potential represented by curve CC. The second clipper similarly derives across the series resistor 21–14' and inductor 21–15' a negative pulse potential identifying the prevailing phase of the saturation function signal, and this pulse potential is coupled through a rectifier device 21–16' to the collector electrode of the transistor 21–18 to render the latter conductive. The transistors 21–17 and 21–18, in being thus rendered alternately conductive by the negative pulses applied to their collector electrodes, develop in the collector output circuit of the transistor 21–18 a potential of pulse waveform represented by curve EE having one pulse for each cycle of the reference sub-carrier signal. The positive-going leading edge of each pulse of this potential corresponds to the transition of the reference sub-carrier signal through zero voltage in going from a negative to a positive half cycle, and the negative-going lagging edge of each pulse corresponds to the similar transition of the saturation function signal so that the pulse duration varies as the latter is hue shifted in phase. This developed pulse potential is supplied through a low-pass filter network comprising a series inductor 21–20, a series resistor 21–21 and shunt condensers 21–22. This filter network establishes the time-average amplitude of the pulse potential to derive in the output of the network the unidirectional hue selection signal having a minimum potential value when the difference frequency chrominance carrier signal has a phase angle of 269° corresponding to selection of a cyan hue and having increasingly larger value when the phase of the difference-frequency chrominance carrier-decreases phase angle in progressing through green, red and blue back to a 271° phase angle again corresponding to a cyan blue.

Included in the generator 19–30 is a switch-pulse potential generator comprised by a blocking oscillator generally of conventional form. This oscillator includes a transistor 21–23 having its collector electrode connected to ground (negative energizing potential) through the primary winding 21–25 of a blocking oscillator transformer provided with a secondary winding 21–26 connected through a series resistor 21–27 and a series condenser 21–28 to the base electrode of the transistor 21–23. The base electrode is biased through a resistor 21–24 from a relatively large negative potential source —B having its positive potential terminal connected to ground. The blocking oscillator has component values so selected that a blocking oscillator cycle is slightly longer than three cycles of the reference sub-carrier signal, and the clipped reference sub-carrier signal is coupled through a condenser 21–19 to the base electrode of the transistor 21–23 to initiate each new blocking oscillator cycle on each third cycle of the reference sub-carrier. The conductive interval of the transistor 21–23 is established by an open circuited delay line 21–29 having input terminals connected across the transformer primary winding 21–25. There is thus developed across the transformer primary and secondary windings respective positive-polarity and negative-polarity switching pulses represented by respective curves FF and GG of FIG. 22, each having a pulse duration or width established by the delay line 21–29.

The reference saw-tooth generator 19–31 is comprised by a condenser 21–30 which is charged through a resistor 21–31 and a diode rectifier 21–32 by each positive-polarity switching pulse developed by the switching pulse generator 19–30 just described. The condenser 21–30 discharges in the interval between switching pulses through a resistor 21–33 toward the negative potential of the source −B. There is thus developed across the condenser 21–30 a reference potential of linear saw-tooth waveform represented by curve HH of FIG. 22.

This saw-tooth potential is coupled through a condenser to the base electrode of a transistor 21–35 which with a transistor 21–36 forms one translation switch amplifier of the minor deflection switch unit 19–32. The emitter electrodes of these transistors have a common emitter resistor 21–37, and the base electrode of the transistor 21–36 has negative switching pulses applied thereto through a coupling condenser 21–38. The latter finds the electrical axis of the negative-polarity switching pulses, so that the base electrode of the transistor 21–36 receives short-duration negative switching pulses which render the transistor 21–36 non-conductive and also receives low-amplitude positive-polarity pulses occurring in the interval between switching pulses and which are effective to render the transistor 21–36 conductive. The conductive state of the transistor 21–36 develops a bias potential across the emitter resistor 21–37 of sufficient value as to render the transistor 21–35 non-conductive during the intervals between switching pulses, while the non-conductive state of the transistor 21–36 permits the transistor 21–35 to be conductive and amplify the linear saw-tooth potential developed across the condenser 21–30 during the interval of each switching pulse. The values of the condenser 21–30 and resistor 21–31 are selected in relation to the amplitude of the positive-polarity switching pulses such that the switching-pulse-portion of the saw-tooth potential amplified by the transistor 21–35 and applied to the deflecting electrodes 1–23 maintains the scanning beam of the picture tube stationary during the switching pulse interval. The base electrode of the transistor 21–35 is supplied with a unidirectional potential by a resistive potential divider comprised by series resistors 21–40 and 21–41. The magnitude of this potential, established by the relative values of the latter resistors, is so selected that after amplification by the transistor 21–35 it establishes an error correction reference potential equal in value to that of the hue selection signal (as amplified and applied to the deflection electrodes 1–23 in a manner presently to be described) when selecting saturated cyan as approached from the green phase angle direction.

The generator 19–30 includes the earlier mentioned phase compensation saw-tooth generator which comprises a condenser 21–43 charged through a diode rectifier 21–44 during each negative-polarity switching pulse generated by the generator 19–30 and discharged in the interval between switching pulses through a resistor 21–45 toward the relative large potential +B′ of a source having its negative terminal connected to ground. There is thus developed across the condenser 21–43 a saw-tooth potential having a positive-going linear waveform portion during the interval between switching pulses.

This saw-tooth potential is supplied through the resistor 19–34 to the base electrode of a transistor 21–46 included in the phase reference pulse-saw-tooth generator 19–35. The base electrode of this transistor is also supplied with the reference sub-carrier signal applied thereto through the resistor 19–36. There is thus applied to the base electrode of the transistor 21–46 a combined sine wave sub-carrier potential and a linear saw-tooth potential having a period equal to three periods of the sub-carrier signal as represented by curve II of FIG. 22. The transistor 21–46 clips by non-conductivity the negative-polarity portions of the composite applied signal and clips by conductive saturation the positive-polarity portions of the composite applied signal to provide in its collector output circuit a potential of rectangular waveform in which successive negative going waveform edges have equal time spacings slightly less than a period of the subcarrier signal. The value of this time spacing is established by the amplitude of the phase compensation saw-tooth potential developed across the condenser 21–43. This amplitude is so selected, by selection of the values of the condenser 21–43 and resistor 21–45 in relation to the value of the potential +B′, that the first of the above-mentioned negative-going waveform edges in each saw-tooth potential cycle occurs at the termination $t_a$ of each error correction interval $t_o$–$t_a$.

The rectangular waveform potential developed in the collector output circuit of the transistor 21–46 is applied through a condenser 21–47 to a generally conventional blocking oscillator included in the unit 19–35. The blocking oscillator includes a transistor 21–48 having a collector electrode connected through the primary winding 21–49 of a blocking oscillator transformer to a positive potential energizing source +V and having a base electrode coupled to ground potential through a series condenser 21–50, a series resistor 21–51, and a secondary winding 21–52 of the blocking oscillator transformer. The output potential pulses of the transistor 21–46 are differentiated by the condenser 21–47 and the resultant negative-polarity pulses of differentiation represented by curve JJ of FIG. 22, trigger the blocking oscillator to to initiate each new cycle thereof. When the transformer winding 21–52 causes the transistor 21–48 to be conductive each time, the condenser 21–50 charges and is then discharged through a resistor 21–53 toward the source of positive potential +B during the succeeding non-conductive interval of the transistor 21–48. There is thus developed across the condenser 21–50 a phase reference potential of linear saw-tooth waveform as represented by the solid-line curve KK of FIG. 22.

This phase reference saw-tooth potential is coupled through a condenser to the base electrode of a transistor 21–56 included in the velocity modulation saw-tooth generator 19–29. The transistor 21–56 has an emitter load resistor 21–57 and operates as an emitter follower to develop the phase reference saw tooth potential across the emitter resistor 21–57. This saw tooth potential is coupled through a diode rectifier device 21–58 to a condenser 21–59. There is also supplied to the condenser 21–59 through a resistor 21–60 a hue saturation signal derived by a peak-to-peak form of amplitude detector 11–41 from the saturation function carrier signal supplied from the unit 19–14, the hue saturation signal being filtered by a conventional low-pass filter as shown. Increasing hue saturation of the saturation function carrier signal causes the saturation signal to have a negative excursion from a zero saturation reference level voltage +E selected equal to the positive peak-amplitude value of the saw-tooth potential developed across the emitter resistor 21–57. Thus for the 100% saturation level indicated in association with curve KK of FIG. 22, the diode rectifier 21–58 becomes conductive to charge the condenser 21–59 during essentially the entire interval when the saw-tooth potential across the resistor 21–57 is increasing in positive amplitude. When the saw-tooth potential decreases negatively in amplitude, the diode 21–58 becomes non-conductive and the condenser 21–59 is quickly discharged by the large-amplitude negative-polarity saturation signal from the amplitude detector 11–41. For this condition, there is developed across the condenser 21–59 a potential of saw-tooth waveform essentially similar to that represented by the solid-line curve KK. If the hue saturation signal should now decrease in amplitude with decreased hue saturation, the condenser 21–59 discharges more slowly to a point where it is equal to the amplitude of the saw-tooth potential developed across the resistor 21–57 at which time the diode rectifier 21–58 again becomes conductive to charge the condenser 21–59 to increasingly larger positive amplitude. The resultant potential of saw-tooth waveform developed across the condenser 21–59 is now that represented by the dash-line curve LL of FIG. 22. In the same manner, a smaller amplitude saturation signal causes the saw-tooth potential of the condenser 21–59 to have the waveform represented by the dot-dash curve MM of FIG. 22. At zero saturation when the amplitude of the saturation signal is zero, the diode rectifier 21–58 remains nonconductive throughout each saw-tooth cycle and the condenser 21–59 now remains charged to the unidirectional voltage of the source +E as represented by the horizontal-line NN of FIG. 22.

Any component of saw-tooth voltage developed across the condenser 21–59 is coupled through a condenser to the base electrode of a transistor 21–62 having an emitter resistor 21–63 and operating as an emitter follower. There is also applied to the base electrode of the transistor 21–62, through a D.C. level restoring network 21–64, the hue selection signal developed by the linear phase detector 19–26. The applied saw-tooth component and hue selection signal are combined at the base electrode of transistor 21–62 with the network 21–64 causing the peak positive potential of the saw-tooth component to coincide with the positive amplitude value of the applied hue selection signal, and the combined signal potential is developed across the emitter resistor 21–63.

This combined signal is applied through the resistor 19–39 to the base electrode of a transistor 21–66 included in the coincidence step generator 19–40. The blocking oscillator earlier described in connection with the construction of the generator 19–30 develops across its base-electrode circuit condenser 21–28, in similar manner to that described in relation the condenser 21–50 of the generator 19–35 blocking oscillator, a negative saw-tooth potential represented by curve PP of FIG. 22 and this saw-tooth potential is supplied through the resistor 19–41 to the base electrode of the transistor 21–66. The combined signals at the base electrode of the transistor 21–66 are represented in FIG. 22 by the curve PP combined with solid-line, dash-line and dot-and-dash line sawtooth voltage components corresponding to the respective curve KK, LL and MM. The rate of change of the negative-going amplitude of the saw-tooth potential PP is selected, by selection of the related values of the resistors 19–39 and 19–41, to be equal to the rate of change of the positive-going amplitude of the saw-tooth potential KK. The transistor 21–66 is arranged with a transistor 21–67 in a conventional common-emitter coupled bi-stable multivibrator. The multivibrator is operatively biased to turn ON and OFF according to the respective conductive and non-conductive states of the transistor 21–66 in relation to a coincidence voltage level QQ (FIG. 22) on the base electrode of the transistor 21–67 near but slightly lower than the potential +V. The coincidence voltage level QQ is selected, in relation to the minimum amplitude of the hue selection signal corresponding to selection of a cyan hue, such that as this amplitude of hue selection signal is developed across the resistor 21–63 the multivibrator is just on the verge of being able to be turned OFF and ON by the composite signal applied to the base electrode of the transistor 21–66. Increasingly larger positive values of the hue selection signal with decreasing phase angles of the saturation function carrier signal cause the composite signal applied to the base electrode of the transistor 21–66 to have an increasingly larger value of unidirectional potential component, whereby the saw-tooth potential PP and associated combined saw-tooth signals KK, LL and MM all are shifted in a more positive direction with relation the coincidence reference voltage level QQ. The minimum amplitude of the hue selection signal corresponding to 270° phase shift of the saturation function signal causes the composite signal waveform portion KK′ substantially to coincide with the coincidence reference potential level QQ. Whenever any portion of the composite signal amplitude at the base of the transistor 21–66 exceeds the coincidence reference potential level QQ, the steeply-rising positive-going leading edge of each cycle of the saw-tooth potential PP turns the multivibrator OFF and the latter is then turned ON again when the composite signal at the base of the transistor 21–66 decreases below the coincidence reference potential level QQ. The output-circuit collector potential of the transistor 21–67 accordingly is of pulse waveform as represented by curve RR of FIG. 22, having a pulse leading edge at time $t_a$ of the error corrective interval $t_o$–$t_a$ and having a pulse duration varying (as indicated by the broken-line portions of curve RR) both with the amplitude of the hue selection signal and with the amount of hue desaturation. It is the leading edge of each pulse of this potential which provides the reverse-scan impulse component immediately following each error corrective interval $t_o$–$t_a$ as described in relation to FIG. 20, and it is the trailing edge of each such potential pulse which provides the forward-scan impulse component AA and AA′ described in relation to FIG. 20.

This coincidence step potential is supplied through the resistor 19–43 to the base electrode of a transistor 21–70 which with a transistor 21–71 forms a second translation switch amplifier of the switch unit 19–32. The signal developed across the emitter resistor 21–63 of the generator 19–29 is also supplied to the base electrode of the transistor 21–70 through the resistor 19–38. The composite potential waveforms thus supplied to this base electrode are represented by curve SS of FIG. 22. The transistors 21–70 and 21–71 have a common emitter resistor 21–72, and positive-polarity switching pulses applied to the base electrode of the transistor 21–71 cause the latter to render the transistor 21–70 non-conductive during each switching pulse interval. In the intervals between switching pulses, the transistor 21–70 is conductive and amplifies the composite voltage applied to its base electrode. This transistor and the transistor 21–35 have a common collector load resistor 21–72, and together supply to the reverse-scan deflection electrodes 1–23 a reverse-scan velocity modulation potential having for selection of a blue hue waveforms varying with saturation as represented by the curves TT of FIG. 22. This reverse-scan potential is effective, by stepped-scan velocity modulation of the picture tube cathode-ray beam, to accomplish hue selection and hue saturation with periodic error correction (by operation of the automatic error correction system) as explained in reference FIG. 20 where the right-hand graphical representation of the chrominance selection signal corresponds to curves TT of FIG. 22.

The circuit arrangement of the error frequency control unit 19–15 is shown in FIG. 23. The output circuit 13–43 and output-circuit condenser 13–37 of the error connection system described in relation to FIG. 13 are shown in FIG. 23, and horizontal retrace pulses developed in the output circuit 16–39 of the horizontal deflection system of FIG. 16 are supplied through a condenser 23–10 and a diode rectifier device 23–11 to the ungrounded terminal of the condenser 13–37 as shown. The amplitude of these retrace pulses as applied to the condenser 23–10 is reduced by a resistive potential divider comprised by the resistor 16–38 and a resistor 23–12. The retrace pulses translated by the condenser 23–10 are also supplied through a diode rectifier device 23–13 to a condenser 23–14 serially connected through a resistor 23–15 to the condenser 13–37. A resistive potential divider comprised by series resistors 23–16 and 23–17 is connected across the condenser 13–37 and the juncture of the resistors 23–16 and 23–17 is connected to the juncture of the diode rectifier devices 23–11 and 23–13 and the condenser 23–10. During the horizontal trace interval, the diode rectifier devices 23–11 and 23–13 are biased by the potential divider 23–16 and 23–17 to their non-conductive states. Each horizontal retrace pulse supplied to the condenser 23–10 renders the diode rectifiers 23–11 and 23–13 conductive to charge the condensers 13–37 and 23–14 in a positive direction with respect ground potential. The condenser 23–14 has a relatively large capacitance in comparison with that of the condenser 13–37, and with the resistor 23–15 provides a relatively long time constant to develop across the condenser 23–14 a charge voltage corresponding to the average voltage developed across the condenser 13–37 over many horizontal line scan intervals. There is developed across the condenser 13–37 during each horizontal line trace interval a negative-going error corrective potential that cumulatively reflects the positional error which occurs due to an error in horizontal scan size. The retract pulses render the diode rectifier 23–11 conductive and quickly reduces the magnitude of the error potential to the value of the charge voltage developed across the condenser 23–14 at which time the rectifier device 23–11 becomes non-conductive and the diode rectifier device 23–13 becomes conductive. Since the condenser 23–14 has a relatively large capacitance, the charge voltage developed across this condenser does not appreciably change during the remainder of the retrace pulse when the rectifier 23–13 is conductive.

The value of the condenser 23–10 is selected in relation to the amplitude of the retrace pulse such that it effectively limits the pulse current amplitude to a value adequate to charge the condenser 13–37 back to a reference voltage level determined by the prevailing charge voltage of the condenser 23–14. Size errors are therefore corrected each horizontal scan cycle and do not cumulatively add from one scan cycle to the next. The size error voltage thus developed across the condenser 13–37 is a negative voltage of sawtooth waveform and of scan cycle period, and the frequency-control voltage required to compensate for such size error is a voltage of rectangular waveform derived as the differential of such sawtooth voltage. Such differentiation is provided by supplying the sawtooth voltage through a low pass filter, comprised by a series resistor 23–20 and a shunt condenser 23–21, and including a differentiating condenser 23–22, to the base electrode of a transistor 23–23 having a resistor 23–24 connected between its collector and base electrodes to operate as a differentiating device. The prevailing average value of the low-frequency component of the frequency-control output voltage is supplied to the output circuit 19–15′ through a series resistor 23–25, and the rectangular compensating voltage component of the frequency-control output voltage is supplied through a series condenser 23–26 from the collector circuit of the transistor 23–23. The error frequency control arrangement just described assists the horizontal scan automatic size control system earlier described in connection with FIG. 16, thus reducing the amount of size correction required to be provided by the latter, or can be used to supplant such size control system.

In a further modified form of color image reproduction system embodying the present invention and next to be described, an error corrective reference position is provided for each color phosphor stripe set and is preferably inserted between the green and blue phosphor stripes of adjacent color sets where the eye is least sensitive to shift in hue selection phase of the chrominance carrier signal. The scanning beam position is then sampled once each chrominance carrier cycle and appropriate positional error correction is made by the error correction system operating as previously described. To accomplish this single color set form of error correction, the hue selective phase relationships of the chrominance carrier signal are deliberately altered as vectorially illustrated in FIG. 24 prior to use of this carrier signal for hue selection in the image reproduction. To this end, a vector component of the reference sub-carrier signal at approximately 90° (red) phase is added to the chrominance carrier signal. This slightly reduces the amplitudes and shifts both the blue and green hue selective phases of the chrominance carrier toward the red hue selective phase, as represented by the respective broken-line vector arrows B′ and G′ in FIG. 24, and increases the amplitude of the carrier at its 90° red hue selective phase but without change of the red phase as represented by the broken-line extension R′ of the vector R in FIG. 24. Accordingly, selection of cyan hue now is accomplished with a reduced amplitude chrominance carrier and over a range of positive and negative phase angles centered about 270° as indicated by the two broken-line cyan vectors C′, C′ in FIG. 24. These alterations of the chrominance carrier hue selective phases provide a small range of phase angles, centered on the 270° phase position, which are now used for error correction in a manner presently to be explained.

The previously mentioned increased amplitude of the chrominance carrier signal at the red hue selection phase angle produces a brighter red color in the reproduced image if the red, blue, and green phosphors are arranged to exhibit equal brightness intensities for a given value of cathode ray beam current as in the image reproduction system described above. However, currently known red phosphors exhibit a lower brightness (i.e. are less efficient) than known green and blue phosphors so that the increased amplitude of the chrominance carrier signal at the red hue selective phase angle aids in compensating the lesser efficiency of the red phosphor and accordingly equal brightness primary colors may now be achieved by permitting the blue and green phosphors to operate at higher brightness efficiencies. Where this is done, however, the reproduction of white light would be out of balance for phosphor stripes of equal widths but balance will be restored by slight widening of the red phosphor stripes and slightly narrowing the blue and green phosphor stripes. Thus correct color balance is achieved for both saturated hues and reproduction of white.

Figure 25:
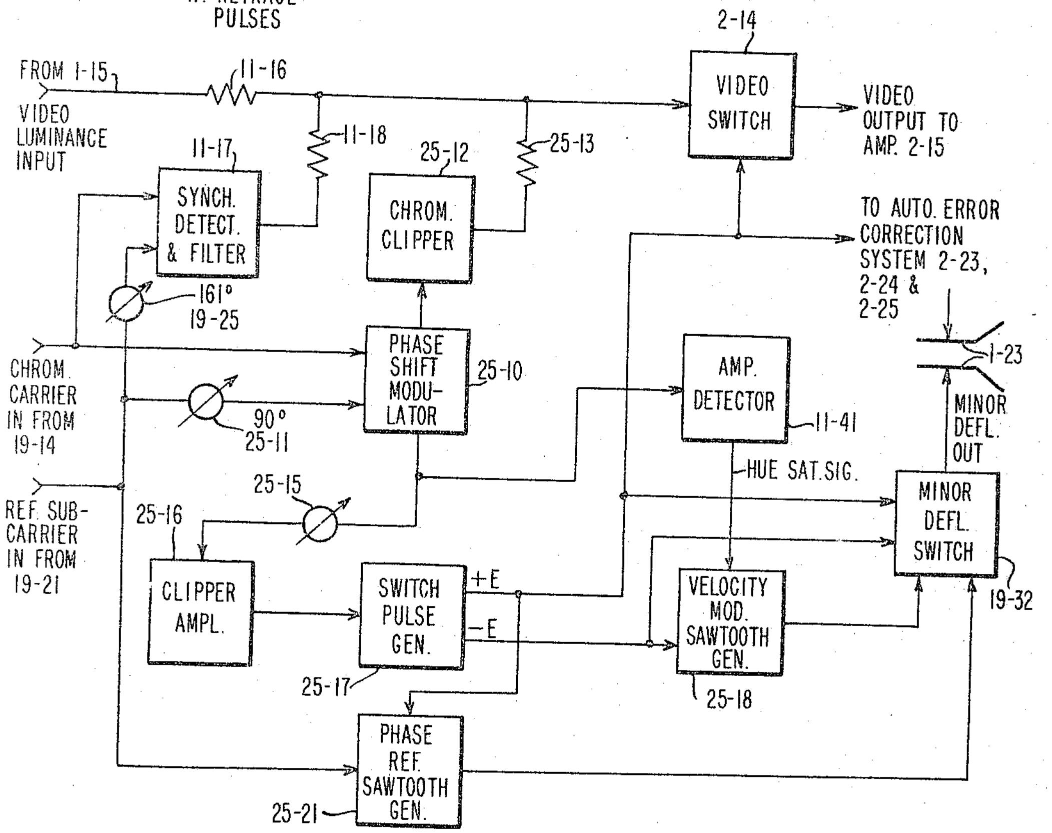

This modified color image reproduction system utilizes an arrangement of components shown in block diagram form in FIG. 25. It will be understood that, except for certain differences hereinafter discussed, the present image reproduction system is essentially similar to that last described and components in FIG. 25 corresponding to similar components earlier considered are identified by similar reference numerals. The chrominance carrier signal translated by the filter 19–14 and the reference sub-carrier signal translated by the filter 19–21 and by the phase shifting network 19–25 are applied to the synchronous detector and filter unit 11–17 to derive and apply to the video switch unit 2–14 the brightness component carried by the chrominance carrier signal. The chrominance carrier signal is also applied to a phase-shift modulator 25–10, and the reference sub-carrier signal is also applied to the latter unit through a 90° phase delay network 25–11. The unit 25–10 is a conventional amplitude modulator which amplitude modulates the chrominance carrier with a reduced-amplitude portion of the reference sub-carrier to effect the altered amplitude and hue selection phase relationships of the latter as previously described in connection with FIG. 24. The altered-phase chrominance carrier signal developed by the modulator 25–10 is supplied to a clipper 25–12 which clips the carrier slightly above its electrical axis and inverts its polarity as represented by the solid-line curve UU of FIG. 26 drawn for a chrominance carrier at a phase angle corresponding approximately to the selection of a red hue. The portion of the carrier amplitude before clipping is indicated in broken lines in relation to curve UU, and a typical carrier hue selection phase shift is indicated in relation to curve BB representing the reference sub-carrier. It was earlier explained that the reference sub-carrier signal is synchronized with the reference synchronizing burst of the video signal and thus has a phase 180° displaced from the zero degrees hue selection phase of the chrominance carrier, but the latter itself is phase displaced by 180° (a polarity reversal) by the modulator 25–10. Accordingly, curve BB of FIG. 26 can be considered to represent both the reference sub-carrier and the chrominance carrier at its zero degree hue selection phase angle. The clipped chrominance carrier signal is supplied through a resistor 25–13 to the input circuit of the video switch unit 2–14 in order that the clipped signal may modulate the image reproducing tube cathode ray beam intensity according to the prevailing image brightness level and hue selection. In particular the clipped chrominance amplitude is selected in relation to the video brightness signal amplitude and cut off level of the cathode ray beam to maintain the saturation of the complementary hues in proper proportion to the saturation of the primary hues over the brightness range of image reproduction.

Figure 26:
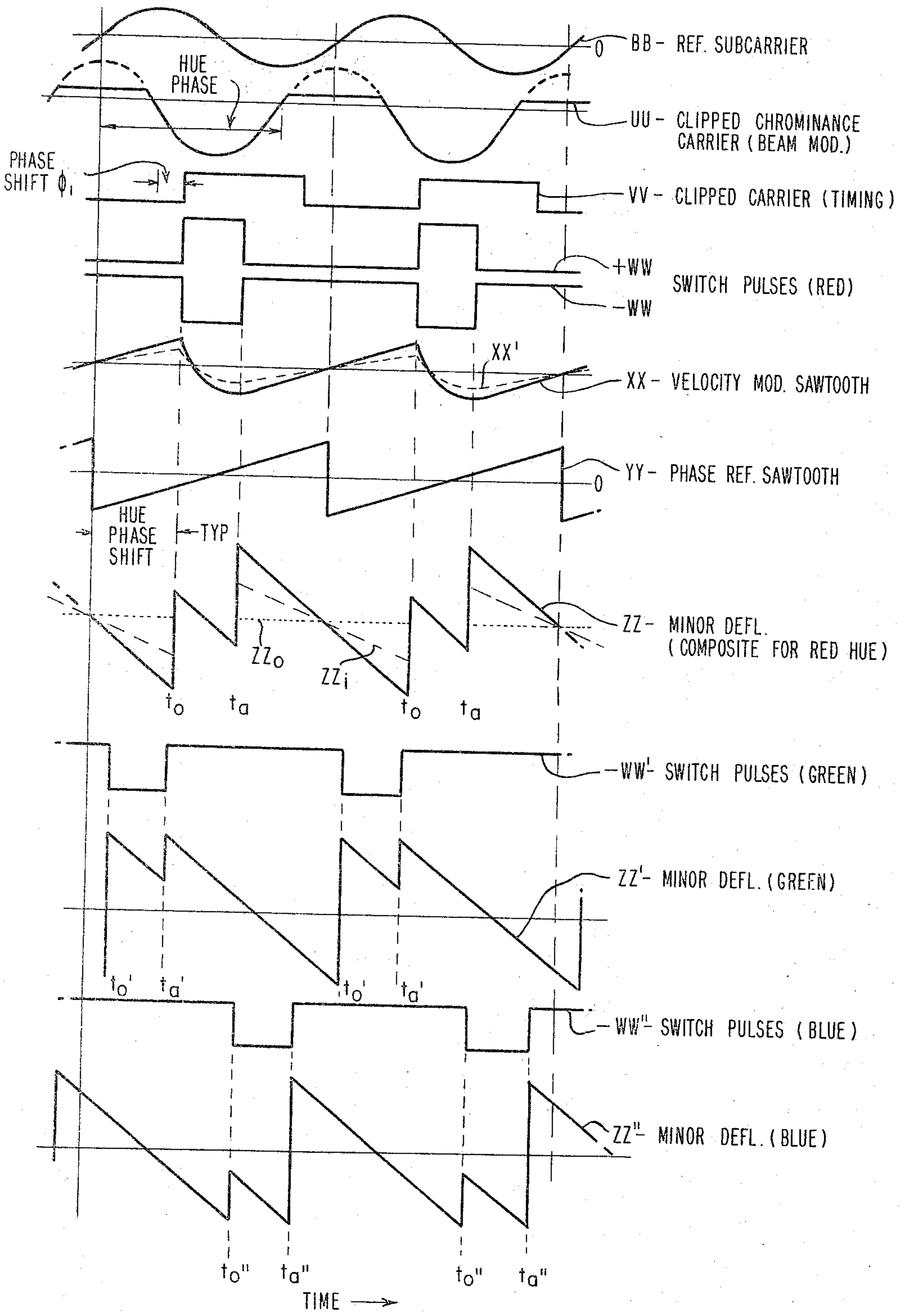

The altered phase chrominance carrier signal developed by the modulator 25–10 is also supplied through a phase delay circuit 25–15 to an amplitude clipper 25–16 which reverses the phase of the carrier signal and clips both the positive and negative half cycles of the reversed-phase carrier to develop a voltage of rectangular waveform represented by curve VV of FIG. 26 having the delay carrier at a phase angle corresponding approximately to the selection of a red hue, provided by the delay network 25–15. This derived voltage is applied to a switching pulse generator 25–17 of the blocking oscillator type, and the positive-going leading edge of each pulse of the applied voltage initiates a cycle of the generator 25–17 to develop positive-polarity and negative-polarity switching pulses as represented by the respective curves +WW and −WW of FIG. 26. The phase delay provided by the delay circuit 25–15 in particular is selected such that the midpoint of the generated switching pulses corresponds to the peak amplitude point of the negative half cycles of the chrominance carrier signal (curve UU of FIG. 26) and it will be evident that this relationship prevails for any hue selection phase angle of the chrominance carrier. The switching pulses, as in the systems above described, establish the interval of error correction of the scanning beam position with relation to a color phosphor stripe set and the generation of the switching pulses at the peak of the chrominance carrier negative half cycles ensures that the error correction occurs when the scanning beam modulation by the clipped chrominance carrier supplied through the resistor 25–13 is minimized. The positive-polarity switching pulses are applied as shown to the video switch unit 2–14, the automatic error correction system, the minor deflection switch unit 19–32, and a phase reference sawtooth generator unit 25–21. The negative-polarity switching pulses are applied to the minor deflection switch unit 19–32 and to a velocity modulation sawtooth generator 25–18. The latter generates a voltage of sawtooth waveform, represented by curve XX of FIG. 26, having a linear change of amplitude in the interval between successive switching pulses. The peak-to-peak amplitude of this generated sawtooth voltage varies, as indicated by the broken-line curve XX′ of FIG. 26, directly with the amplitude of a unidirectional potential derived by the amplitude detector 11–41 from the chrominance carrier signal and thus varies directly with the hue saturation (having maximum sawtooth amplitude for saturated hues). This generated sawtooth voltage is supplied to the minor deflection switch unit 19–32.

The reference sub-carrier signal translated by the filter 19–21 is supplied to the phase reference sawtooth generator 25–21 which generates a phase reference voltage of linear sawtooth waveform, represented by curve YY of FIG. 26, having negative-going amplitude at the moment the reference sub-carrier signal reaches zero value in going from a negative to a positive half cycle and having positive-going amplitude during the remaining cycle of the reference sub-carrier signal. This phase reference sawtooth voltage is applied to the minor deflection switch unit 19–32.

The minor deflection switch unit 19–32 reverses the polarity of the several signals supplied to it and develops and applies to the reverse-scan deflection electrodes 1–23*a* reverse-scan velocity-modulation potential made up of so much of that portion of the phase reference sawtooth voltage (curve YY of FIG. 26) as is generated by the generator 25–21 during each switching pulse interval $t_o$–$t_a$ and so much of that portion of the velocity modulation sawtooth voltage (curve XX of FIG. 26) as is generated by the generator 25–18 during the interval $t_a$–$t_o'$ between switching pulses. The reverse-scan potential thus has a waveform represented by the solid-line curve ZZ of FIG. 26 for a chrominance carrier phase angle corresponding to selection of a saturated red hue as explained above in relation to curve UU. Dash-line curve $ZZ_i$ represents the waveform of the reverse-scan potential for a red hue of intermediate saturation, and dotted-line curve $ZZ_o$ represents the waveform of the reverse-scan potential for zero saturation. If the chrominance carrier has a phase angle to select a green hue, the switching pulses are generated at an advanced phase angle in relation to the reference sub-carrier signal as represented by curve −WW′ of FIG. 26 and the resultant reverse-scan velocity-modulation potential applied to the deflecting electrodes 1–23 now has the waveform represented by curve ZZ′ for a saturated green hue. Chrominance carrier selection of a blue hue retards the generation of the switching pulses as represented by curve WW″ and the reverse-scan potential now has the waveform represented by curve ZZ″ for saturated blue. It will be seen that the advance or delay in the time of generation of the switching pulses consequent upon hue selection causes corresponding selection of different amplitude portions of the phase reference sawtooth (curve YY) to be applied to the deflection switch unit 19–32. It will further be evident from comparison of curves ZZ, ZZ′ and ZZ″ that such selection effectively causes insertion of a unidirectional scan-deflection component during the error correction intervals $t_o$–$t_a$, $t_o'$–$t_a'$, etc., which varies linearly with hue phase and increases from a minimum value at cyan hue as approached from blue to a maximum value at cyan hue as approached from green.

The manner in which the reverse-scan velocity-modulation potential, derived as just described, effects hue selection and error correction will be evident from FIG. 27 wherein FIG. 27*a* shows a small horizontal cross-sectional portion of the cathode ray tube screen. The reverse-scan potential corresponding to selection of red, green and blue hues is graphically shown to the right in FIG. 27 where the reverse-scan potential waveforms are identified as ZZ, ZZ′ and ZZ″ as in FIG. 26. The stepped scan motion of the cathode ray tube beam during selection of red, green and blue hues is graphically represented by the respective curves R, G and B to the left in FIG. 27 and constant velocity scan of the beam in reproducing white light is represented by the arrow W. It will be evident that, in the image reproduction system just described, the scanning beam is halted for the interval of a switching pulse at an error reference position and that this halt now immediately follows the full interval of dwell on a phosphor stripe of selected hue. This is in contrast to the FIG. 19 system earlier described and wherein there is interruption of hue reproduction while specifically jumping the beam forward to an error correction position for the switching pulse interval followed by return of the beam to its former position for continued hue reproduction.

The circuit arrangement of the amplitude clipper 25–16 and the several generator units of FIG. 25 are shown in FIG. 28. The clipper unit 25–16 includes a transistor 28–10 which clips the positive half cycles of the chrominance carrier by transistor saturation and clips the negative half cycles by transistor emitter-current cutoff. The clipped carrier wave (curve VV of FIG. 26) is supplied to the switching pulse generator 25–17 having a transistor 28–11 included in a blocking oscillator arrangement of the type described above and wherein an oscillator cycle is established by triggering from the positive-going leading edge of the clipped chrominance carrier translated by the transistor 28–10. This blocking oscillator generates the positive-polarity and negative-polarity switching pulses (curves +WW and −WW of FIG. 26) having a pulse interval established by a delay line 28–12.

The negative switching pulses are applied to a transistor 28–15, provided in the velocity modulation sawtooth generator 25–18, to render it conductive during each switching pulse and thereby discharge a condenser 28–16 which charges in the interval between switching pulses through a resistor 28–17 from the applied hue saturation input signal. A transistor 28–18 is coupled degeneratively to the condenser 28–16 to cause the latter to generate a sawtooth potential having a linear change of amplitude during the interval between switching pulses (curve XX of FIG. 26). The slope of the linear sawtooth portion of this potential increases with increase of the hue saturation signal from which the condenser 28–16 is charged.

The phase reference sawtooth generator 25–21 includes a blocking oscillator of the type earlier described and having a transistor 28–20 to the base electrode of which the reference sub-carrier signal is applied. The latter synchronizes the cyclic operation of the blocking oscillator, which generates and applies to the base electrode of a transistor 28–21 a positive-polarity potential pulse initiated as the reference sub-carrier signal nominally goes through zero amplitude between a negative and a positive half cycle. The transistor 28–21 is rendered conductive by each applied positive-polarity pulse and rapidly discharges a condenser 28–22 which in the interval between applied pulses charges through a resistor 28–23 connected to a relatively large source of potential +B. There is thus developed across the condenser 28–22 the phase reference sawtooth potential (curve YY of FIG. 26) having a period equal to that of the reference sub-carrier signal.

While not mentioned for simplicity in the foregoing consideration of the operation of the FIG. 25 image reproducing system in relation to FIG. 26, a more detailed analysis will show that a cyan hue selection phase angle of the chrominance carrier would cause the switching pulses to center upon the negative-going steep waveform portion of the phase reference sawtooth potential and thus cause the cathode ray beam to jump from one error correction position to another during the error correction interval. While this would not be detrimental to the error correction operation if such jump is made essentially instantly, this character of operation is avoided by slightly changing the time-phase position with which the phase reference sawtooth potential is generated in the manner last described. To this end, the negative polarity switching pulses are reduced in amplitude by a resistive potential divider comprised by resistors 28–25 and 28–26 and are then applied through a diode rectifier 28–27 to charge a condenser 28–28 to a peak potential equal to the difference between the reduced amplitude switching pulses and the prevailing amplitude of the phase reference sawtooth potential at the instant of each applied switching pulse. The resultant charge potential of the condenser 28–28 thus has a value varying linearly with the hue selection phase angle of the chrominance carrier. The unidirectional charge potential developed across the condenser 28–28 is supplied to the base electrode of the transistor 28–30 through a low pass R-C filter network 28–29. The magnitude of this charge potential is so selected that the phase reference sawtooth voltage has the phase relation shown by curve YY of FIG. 26 when the chrominance carrier selects a red hue, but is advanced in phase when the chrominance carrier selects a green hue and is retarded in phase when the chrominance carrier selects a blue hue. The amount of this phase shift is selected such that the error correction pulses always remain on the linear portion of the phase reference sawtooth potential even for cyan hue selection by the chrominance carrier.

FIG. 29 shows in block diagram form an image reproduction system essentially similar to that of FIG. 25, similar components being identified by similar reference numerals. The velocity modulation sawtooth generator 25–18 and amplitude detector 11–41 of the FIG. 25 arrangement are replaced in the FIG. 29 system by the ratio regulator 11–29. The latter is supplied with the altered phase chrominance carrier signal (FIG. 24) developed by the phase shift modulator 25–10, and with a brightness signal developed at the juncture of resistors 11–16′ and 11–18′ equivalent to the brightness signal component which is developed at the juncture of the resistors 11–16 and 11–18 and supplied to the video switch unit 2–14. There is developed in the output circuit of the ratio regulator 11–29 an altered-phase form of saturation function signal, and this signal is supplied through the phase delay circuit 25–15 to the clipper amplifier 25–16 and is also supplied through a 90° delay network 29–10 directly to the minor deflection switch unit 19–32, in lieu of the sawtooth signal which is supplied to the latter by the generator 25–18 of the FIG. 25 system. The switch pulse generator 25–17 generates from the delayed-phase saturation function signal the positive-polarity and negative-polarity switching pulses in the same manner as described in relation to FIG. 25, and the negative-polarity switching pulses are graphically shown for reference as curve −WW in FIG. 30. The altered-phase form of saturation function signal which is developed by the ratio regulator 11–29 and supplied to the minor deflection switch unit 19–32 is represented by curve $f(S)'$ in FIG. 30. It will be evident that the portion of this signal between successive switching pulses provides a reverse-scan-hue-selection signal of sinusoidal waveform similar to the velocity modulation sawtooth signal represented by curve XX of FIG. 26 applicable to the FIG. 25 arrangement. Broken line curve $f(S')_1$ of FIG. 30 represents an intermediate saturation amplitude of this reverse-scan-hue-selection signal, which decreases to zero amplitude at zero saturation as represented by the dotted-line curve $f(S)'_0$.

In the image reproduction systems described above, error correction is accomplished by secondary electron emission from secondary emissive stripes at the reference positions of the fluorescent screen. Error correction can also be accomplished by numerous equivalent energy emissive structures providing a change of emissive energy level indicative of the beam positioning. Thus as illustrated in FIG. 31*a*, the fluorescent screen may be provided with spaced narrow stripes of an ultra violet emissive phosphor 31–10 at the spaced error reference positions, and with terminal broad stripes of such phosphor at the sides of the image reproduction area equivalent to the emissive stripes 14–10—14–13 described in relation to FIG. 14. The ultra violet energy emitted when the cathode ray beam strikes each such stripe is projected through an ultra violet transmissive window 31–11 provided in the usual anode graphite film 31–12 which conventionally coats the flared bulb portion of the picture tube 1–22 as illustrated in FIG. 31*b*, is received by a conventional photomultiplier tube 31–13, and the resultant error correction electrical pulses developed in the output circuit of the latter are amplified by an amplifier 31–14 and supplied to the control electrode of the error amplifier ube 13–32 included in the automatic position error correction system described in relation to FIG. 13.

In the foregoing description of the invention and in the following claims, the term "chrominance carrier signal" is used to mean the chrominance information conveyed by the simultaneous pair of chrominance components transmitted as the amplitude modulation sidebands which are derived at the television signal source by use of a pair of suppressed chrominance subcarrier signals in phase quadrature and is applicable either to the chrominance information with video frequency spectrum as received or to that converted to have a different chrominance frequency band. The term "reference subcarrier" is used to denote a locally generated signal having the same frequency and phase as the reference synchronizing burst component of the received color television video signal or having a frequency and phase corresponding to the synchronizing burst component in the converted chrominance frequency band.

It will be apparent from the foregoing description of the invention that a color television receiver embodying the invention is one characterized by substantially simplified construction and reduced cost as compared to prior color television receivers, and also is one inherently exhibiting high reliability and stability of its operational characteristics over prolonged periods of use. A color television receiver embodying the invention enables substantial simplification and cost reduction in fabricating the color television picture tube used for color and monochrome image display, reduces its physical size and avoids numeraus critical adjustments required in using prior forms of color television picture tubes, and also permits attainment of substantial improvement in the color, brilliance and resolution with which a color image may be reproduced. It will be evident that these new and improved constructional and operational characteristics are attained in accordance with the invention by the new and simplified manner of accomplishing effective separation and use of the image chrominance information conveyed by the color television signal.

While there have been described specific embodiments of the invention for purposes of illustration, it is contemplated that numerous changes may be made without departing from the spirit of the invention.

What is claimed is:

1. A color television image reproduction system comprising means having an input circuit adapted to receive a chrominance carrier type of color television video signal having a chrominance carrier signal with chrominance reference phase and cyclic periodicity and including a cathode ray image reproduction tube for reproducing from said signal a monochrome television image, said tube having a fluorescent screen composed of repetitive sets of plural primary-color-related light-emissive phosphor stripes oriented transverse to the line scanning direction and having a composite set width corresponding substantially to the constant-velocity scanning displacement of the cathode ray beam during an interval having a preselected proportional relation to said reference cyclic periodicity, said screen including a plurality of beam-position indexing stripe elements each associated with a non-emissive reference position portion both oriented transverse to the line scan direction and spaced across said screen in like positional relationship to said phosphor stripe sets to provide by beam scan periodic changes of an emissive energy level indicative of a prevailing horizontal positional relationship between said beam and successive ones of said indexing stripe elements, means responsive to the amplitude and phase of said chrominance carrier signal for controlling the line scan motion of said cathode ray beam at substantially said displacement-interval periodicity to effect substantially uniform-velocity scanning motion of said beam during reproduction of neutral color image areas and to effect line scanning motion of said beam with variable velocity at substantially said displacement-interval periodicity for hue selection reproduction of image areas, and means operative at periodic error correction intervals and responsive to each of said periodic changes of emissive energy level for effecting a corresponding deflection adjustment of the prevailing position of said beam during each said interval to move said beam substantially to the adjacent non-emissive reference position portion and thereby maintain a preselected positional relationship thereof to said indexing stripe elements and thus to said phosphor stripe sets.

2. A color television image reproduction system comprising means having an input circuit adapted to receive a chrominance carrier type of color television video signal having a chrominance carrier signal with chrominance reference phase and cyclic periodicity and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to said reference cyclic periodicity, said screen including a plurality of beam-position indexing stripe elements vertically oriented and spaced horizontally across said screen in preselected fixed positional intervening relationship between like light-emissive pairs of phosphors in said phosphor stripe sets to provide by beam scan periodic changes of an emissive energy level differing from that of said phosphor pairs and indicative of a prevailing horizontal positional relationship between said beam and successive ones of said indexing stripe elements, means operative at error correction intervals recurring at a periodicity proportionally related to said displacement-interval periodicity for utilizing each of successive ones of said emissive energy level changes to effect during each said correction interval a corresponding individual deflection adjustment of the prevailing scan position of said beam in a preselected scan direction and by a scan displacement amount leaving said beam at the conclusion of said each error correction interval preselectably positioned at least partially to one side of the edge of a corresponding indexing stripe element, and means responsive to the amplitude and phase of said chrominance carrier signal for controlling the horizontal-direction scan motion of said cathode ray beam at said displacement-interval periodicity to effect during reproduction of neutral color image areas substantially uniform-velocity scanning motion of said beam positionally related to said phosphor stripe sets and to effect horizontal scanning motion of said beam in steps positionally related to said phosphor stripe sets for hue selection reproduction of image areas.

3. A color television image reproduction system comprising means having an input circuit adapted to receive a chrominance carrier type of color television video signal having a chrominance carrier signal with chrominance phase and cyclic periodicity and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to the cyclic period of the chrominance carrier signal, means for deriving from said video signal a chrominance carrier signal having an amplitude representative of the prevailing hue saturation value of the received chrominance carrier signal and having a phase representative of the prevailing hue value of said received chrominance carrier signal, and means responsive to the hue selective phase of said derived chrominance carrier signal for causing said beam to halt substantially all scanning motion on each said phosphor stripe set at an essentially fixed position thereon corresponding to the phase selected hue and for a part of said displacement interval period proportional to the ratio of the prevailing amplitude of said derived chrominance carrier signal to a saturation amplitude value thereof and to cause said beam thereafter to scan at substantially constant velocity over a complete phosphor stripe set and for the remaining part of said displacement interval period.

4. A color television image reproduction system comprising means having an input circuit adapted to receive a chrominance carrier type of color television video signal having a chrominance carrier signal with chrominance reference phase and cyclic periodicity and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to said reference cyclic periodicity, said screen including a plurality of beam-position indexing stripe elements vertically oriented and spaced horizontally across said screen in preselected positional relationship to said phosphor stripe sets to provide by beam scan periodic changes of an emissive energy level indicative of a prevailing horizontal positional relationship between said beam and successive ones of said indexing stripe elements, means operative at error correction intervals recurring at a periodicity proportionally related to said displacement-interval periodicity for utilizing each of successive ones of said emissive energy level changes to effect during each said correction interval a corresponding individual deflection adjustment of the prevailing scan position of said beam in a preselected scan direction and by a scan displacement amount leaving said beam at the conclusion of said each error correction interval preselectably positioned at least partially to one side of the edge of a corresponding indexing stripe element, and means responsive to the amplitude and phase of said chrominance carrier signal for controlling the horizontal-direction scan motion of said cathode ray beam at said displacement-interval periodicity and during the intervals between successive of said emissive energy level changes to effect substantially uniform-velocity scanning motion of said beam during reproduction of neutral color image areas and to effect variable velocity horizontal scanning motion of said beam at said displacement-internal periodicity for hue selection reproduction of image areas.

5. A color television image reproduction system comprising means having an input circuit adapted to receive a chrominance carrier type of color television video signal having a chrominance carrier signal with chrominance phase and cyclic periodicity and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to the cyclic period of the chrominance carrier signal, said screen including a plurality of beam-position indexing stripe elements vertically oriented and spaced horizontally across said screen in preselected positional relationship to said phosphor stripe sets and adapted upon movement of the cathode ray beam across each thereof to effect a change of an emissive energy level indicative of the positional relationship between said beam and said each indexing stripe element, means for halting the scanning motion of said beam at the region of each said indexing stripe element and for a preselected error corrective interval, means for utilizing each of said changes of emissive energy level during each of said error corrective intervals to effect a deflection halt adjustment of the prevailing horizontal deflection position of said beam into a preselected positional relation to a corresponding indexing stripe element to maintain throughout each line scan forward trace of said beam a preselected beam-scan positional relationship thereof to said indexing stripe elements and thereby to said phosphor stripe sets, and means responsive to the amplitude and phase of said chrominance carrier signal for controlling between error correction intervals the horizontal-direction scan motion of said cathode ray beam at said displacement-interval periodicity to effect substantially uniform-velocity scanning motion of said beam during reproduction of neutral color image areas and to effect variable velocity horizontal scanning motion of said beam at substantially said displacement-interval periodicity for hue selection reproduction of image areas.

6. A color television image reproduction system comprising means having an input circuit adapted to receive a chrominance carrier type of color television video signal having a chrominance carrier signal with chrominance phase and cyclic periodicity and including a cathode ray image reproduction tube for reproducing from said signal a monochrome television image.

said tube having a fluorescent screen composed of repetitive sets of plural vertically-oriented primary-color-related light emissive phosphor stripes having a composite set width corresponding substantially to the constant-velocity scanning displacement of the cathode-ray beam during an interval having a preselected proportional relation to the cyclic period of the chrominance carrier signal, said screen including a plurality of beam-position indexing stripe elements vertically oriented and spaced horizontally across said screen in preselected positional relationship to said phosphor stripe sets and adapted upon movement of the cathode-ray beam across each thereof to effect a change of an emissive energy level indicative of the positional relationship between said beam and said each indexing stripe element, means operative during each of periodic error correction intervals for establishing a finite minimum value of cathode-ray beam current and for halting said beam during each succeeding error correction interval at the region of successive ones of said indexing stripe elements, means for utilizing said changes of emissive energy level during each of said error corrective intervals for adjusting the prevailing horizontal deflection position of said beam throughout each line scan forward trace thereof to maintain a preselected positional relationship thereof to said indexing stripe elements, and means responsive to the amplitude and phase of said chrominance carrier signal for controlling between error correction intervals the horizontal-direction scan motion of said cathode ray beam at said displacement-interval periodicity to effect substantially uniform-velocity scanning motion of said beam during reproduction of neutral color image areas and to effect variable-velocity horizontal scanning motion of said beam at substantially said displacement-interval periodicity for hue selection reproduction of image areas.

7. A color television image reproduction system comprising means having an input circuit adapted to receive a chrominance carrier type of color television video signal having a chrominance carrier signal with chrominance phase and cyclic periodicity and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to the cyclic period of the chrominance carrier signal, said screen including a plurality of beam-position indexing stripe elements vertically oriented and spaced horizontally across said screen at a preselected hue reference position in relation to said phosphor stripe sets and adapted upon movement of the cathode-ray beam across each thereof to effect a change of an emissive energy level indicative of the positional relationship between said beam and said each indexing stripe element, means operative during each of periodic error correction intervals for establishing a finite preselected value of cathode-ray beam current and for deflecting said beam to and halting said beam at successive ones of said preselected hue reference positions, means for utilizing said changes of emissive energy level during each of said error corrective intervals for adjusting the prevailing horizontal deflection position of said beam throughout each line scan forward trace thereof to maintain a preselected beam-scan positional relationship thereof to said indexing stripe elements and thereby to said phosphor stripe sets, and means responsive to the amplitude and phase of said chrominance carrier signal for controlling between error correction intervals the horizontal-direction scan motion of said cathode ray beam at said displacement-interval periodicity to effect substantially uniform-velocity scanning motion of said beam during reproduction of neutral color image areas and to effect horizontal scanning motion of said beam in steps for hue selection reproduction of image areas.

8. A color television image reproduction system comprising means having an input circuit adapted to receive a chrominance carrier type of color television video signal having a chrominance carrier signal of the hue selective phase accompanied by a reference burst synchronizing signal component and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to the cyclic period of the chrominance carrier signal, said screen including a plurality of beam-position indexing stripe elements vertically oriented and spaced horizontally across said screen at a preselected hue reference position in relation to said phosphor stripe sets and adapted upon movement of the cathode-ray beam across each thereof to effect a change of an emissive energy level indicative of the positional relationship between said beam and said each indexing stripe element, means responsive to said reference burst synchronizing signal component of said video signal for providing a phase-reference subcarrier signal, means controlled by said subcarrier signal for establishing periodic error correction intervals, means operative during said error correction intervals for establishing a finite preselected value of cathode-ray beam current and for deflecting said beam to and halting said beam at successive ones of said preselected hue reference positions, means for utilizing said changes of emissive energy level during each of said error corrective intervals for adjusting the prevailing horizontal deflection position of said beam throughout each line scan forward trace thereof to maintain a preselected positional relationship thereof to said indexing stripe elements and thereby to said phosphor stripe sets, and means responsive to the amplitude of said chrominance carrier signal and to the phase thereof relative to said subcarrier signal for controlling between error correction intervals the horizontal-direction scan motion of said cathode ray beam at said displacement-interval periodicity to effect substantially uniform-velocity scanning motion of said beam during reproduction of neutral color image areas and to effect horizontal scanning motion of said beam in steps for hue selection reproduction of image areas.

9. A color television image reproduction system comprising means having an input circuit adapted to receive a chrominance carrier type of color television video signal having a chrominance carrier signal of hue selective phase accompanied by a reference burst synchronizing signal component and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to the cyclic period of the chrominance carrier signal, said screen including a plurality of beam-position indexing stripe elements vertically oriented and spaced horizontally across said screen at a preselected hue reference position in relation to said phosphor stripe sets and adapted upon movement of the cathode-ray beam across each thereof to effect a change of an emissive energy level indicative of the positional relationship between said beam and said each indexing stripe element, means responsive to said reference burst synchronizing signal component of said video signal for providing a phase reference subcarrier signal, means controlled by said chrominance carrier signal for establishing repetitive error correction intervals, means operative during said error correction intervals and responsive to a preselected phase of said subcarrier signal for establishing a finite preselected value of cathode-ray beam current and for deflecting said beam to and halting said beam at successive ones of said preselected hue reference positions, means for utilizing said changes of emissive energy level during each of said error corrective intervals for adjusting the prevailing horizontal deflection position of said beam throughout each line scan forward trace thereof to maintain a preselected positional relationship thereof to said indexing stripe elements and thereby to said phosphor stripe sets, and means responsive to said chrominance carrier signal for controlling between error correction intervals the horizontal-direction scan motion of said cathode ray beam at said displacement-interval periodicity to effect substantially uniform-velocity scanning motion of said beam during reproduction of natural color image areas and to effect horizontal scanning motion of said beam in steps for hue selection reproduction of image areas.

10. A color television image reproduction system comprising means having an input circuit adapted to receive a chrominance carrier type of color television video signal having a chrominance carrier signal and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to the cyclic period of the chrominance carrier signal, said screen including a plurality of narrow beam-position indexing stripe elements vertically oriented and equally spaced horizontally across said screen intervening in positional relationship to said phosphor stripe sets to provide by beam scan periodic changes of an emissive energy level indicative of a prevailing horizontal positional relationship between said beam and successive ones of said indexing strip elements, means responsive to the amplitude and phase of said chrominance carrier signal for controlling the horizontal-direction scan motion of said cathode ray beam at substantially said displacement-interval periodicity to effect substantially uniform-velocity scanning motion of said beam during reproduction of neutral color image areas and to effect horizontal scanning motion of said beam in steps for hue selection reproduction of image areas, and means operative at error correction intervals recurring at a periodicity proportionally related to said displacement-interval periodicity for utilizing each of successive ones of said emissive energy level changes to effect during each said correction interval a corresponding individual deflection adjustment of the prevailing scan position of said beam in a preselected scan direction and by a scan displacement amount leaving said beam at the conclusion of said each error correction interval preselectably positioned at least partially to one side of the edge of a corresponding indexing stripe element and for concurrently changing the cyclic period of said chrominance carrier signal as required to maintain said preselected proportional relation between said displacement interval and said chrominance carrier signal cyclic period.

11. A color television image reproduction system comprising means having an input circuit adapted to receive a chrominance carrier type of color television video signal having a chrominance carrier signal of hue selective phase accompanied by a reference burst synchronizing signal component and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to the cyclic period of the chrominance carrier signal, means responsive to said reference burst synchronizing signal component of said video signal for providing a phase-reference subcarrier signal, means responsive to the amplitude of said chrominance carrier signal for controlling the horizontal-direction scan motion of said cathode ray beam at substantially said displacement-interval periodicity to effect substantially uniform-velocity scanning motion of said beam during reproduction of neutral color image areas and to effect horizontal scanning motion of said beam by variable velocity at a preselected periodicity proportionally related to the period of said phase-reference subcarrier signal for color saturation reproduction of image areas, means controlled by said phase-reference subcarrier signal for establishing a preselected hue reference phase of said variable velocity scanning motion of said beam, and means responsive to the phase difference between said chrominance carrier and subcarrier signals for controlling the horizontal-direction beam displacement position for hue selection reproduction of the color image areas.

12. A color television image reproduction system comprising means having an input circuit adapted to receive a chrominance carrier type of color television video signal having a chrominance carrier signal of hue selective phase accompanied by a reference burst synchronizing signal component and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to the cyclic period of the chrominance carrier signal, means responsive to said reference burst synchronizing signal component of said video signal for providing a phase-reference subcarrier signal, means for developing from said reference subcarrier signal a synchronizing signal periodically phase-locked to the phase of said subcarrier signal and having a period corresponding to said phosphor set displacement interval period, variable velocity scan control means responsive to the amplitude of said chrominance carrier signal for controlling the horizontal-direction scan motion of said cathode-ray beam at substantially said displacement-interval periodicity to effect for zero amplitude of said carrier signal substantially uniform-velocity scanning motion of said beam to reproduce neutral color image areas and to effect for finite amplitude of said carrier signal variable velocity scanning motion of said beam in positional relationship to said phosphor sets for color saturation reproduction of image areas, means for locking the phase of said variable velocity scan control means to the phase of said synchronizing signal, and means responsive to the phase difference between said chrominance carrier and subcarrier signals for controlling the horizontal-direction beam displacement position for hue selection reproduction of the color image areas.

13. A color television image reproduction system comprising means having an input circuit adapted to receive a chrominance carrier type of color television video signal having a chrominance carrier signal of hue selective phase accompanied by a reference burst synchronizing signal component and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to the cyclic period of said chrominance carrier signal, means responsive to said reference burst synchronizing signal component of said video signal for providing a phase-reference subcarrier signal, means controlled solely by the phase of said subcarrier signal for generating and applying to said image reproduction tube a velocity-modulation reverse-scan signal having substantially said displacement-interval periodicity and effective to control the horizontal scanning motion of said beam in discrete steps spaced by the width of a phosphor stripe set, means responsive to the amplitude of said chrominance carrier signal for controlling the amplitude of said reverse-scan signal to effect substantially uniform-velocity scanning motion of said beam during reproduction of neutral color image areas and to effect horizontal scanning motion of said beam in steps for hue selective reproduction of colored image areas, means responsive to the phase of said chrominance carrier signal for deriving a hue selection signal, and means for utilizing said hue selection signal for laterally displacing horizontally the stepped scan of said beam to effect the selection of hue with which said colored image areas are reproduced.

14. A color television image reproduction system comprising an input circuit adapted to have applied thereto a color television video signal including synchronizing signal components, a luminance signal component conveying image luminance information, and an amplitude-phase modulated chrominance carrier signal conveying image chrominance information;

means for synchronously detecting said carrier signal to derive therefrom a signal representative of brightness information conveyed by said carrier signal and for combining said derived signal and said luminance signal component to provide a brightness signal;

an image reproducing cathode-ray tube having means for producing a cathode-ray beam intensity modulated by said brightness signal and including a fluorescent screen composed of repetitive sets of plural vertically-oriented primary-color-related light-emissive phosphor stripes having a composite set width corresponding substantially to the constant-velocity scanning displacement of the cathode-ray beam during an interval equal to a preselected portion of a cycle of said chrominance carrier signal;

means responsive to said synchronizing signal components for vertically and horizontally deflecting said cathode-ray beam in a synchronized raster of horizontal scanning lines to reproduce a television image;

means for deriving from said chrominance carrier signal an amplitude-phase modulated chrominance carrier signal devoid of brightness information;

means for phase detecting one of said carrier signals to derive a unidirectional hue selection potential having an amplitude varying with the phase thereof;

means responsive jointly to said derived carrier signal and to said brightness signal for deriving a unidirectional saturation-control potential having an amplitude varying with the ratio of derived carrier signal amplitude to brightness signal amplitude; and means for utilizing said derived potentials to control the horizontal-direction scan motion of said cathode-ray beam at a periodicity corresponding to said preselected cyclic portion of said chrominance carrier signal to effect substantially uniform-velocity scanning motion of said beam for reproduction of neutral color image areas and to effect horizontal scanning motion of said beam in steps horizontally displaceable according to the amplitude of said hue selection potential and with an amount of beam velocity between steps decreasing with the amplitude of said saturation-control potential to provide hue-selection and hue-saturation reproduction of image areas.

15. A color television image reproduction system comprising an input circuit adapted to have applied thereto a color television video signal including vertical and horizontal synchronizing signal components, a luminance signal component conveying image luminance information, and an amplitude-phase modulated chrominance carrier signal conveying image chrominance information;

an image reproducing cathode-ray tube having means for producing a cathode-ray beam intensity modulated by said luminance signal component and including a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to a cycle of said chrominance carrier signal;

means responsive to said synchronizing signal components for vertically and horizontally deflecting said cathode-ray beam in a synchronized raster of horizontal scanning lines to reproduce a television image;

error correction means operative at error correction intervals recurring at a periodicity proportionally related to said displacement-interval periodicity for utilizing each of successive ones of said emissive energy level changes to effect during each said correction interval a corresponding individual deflection adjustment of the prevailing scan position of said beam in a preselected scan direction and by a scan displacement amount leaving said beam at the conclusion of said each error correction interval preselectably positioned at least partially to one side of the edge of a corresponding indexing stripe element;

means controlled by said error correction means for controlling said deflecting means to control the phase relationship between said horizontal synchronizing signal components and the synchronized horizontal deflections of said cathode-ray beam to reduce over a line scanning interval the magnitude of said automatic horizontal displacements of the prevailing position of said beam; and means responsive to the amplitude and phase of said chrominance carrier signal for controlling the horizontal-direction scan motion of said cathode-ray beam substantially at said displacement interval periodicity to effect substantially uniform-velocity scanning motion of said beam for reproduction of neutral color image areas and to effect variable velocity horizontal scanning motion of said beam at said displacement-internal periodicity for hue selection reproduction of image areas.

16. A color television image reproduction system comprising an input circuit adapted to have applied thereto a color television video signal including synchronizing signal components, a luminance signal component conveying image luminance information, and an amplitude-phase modulated chrominance carrier signal conveying image chrominance information;

an image reproducing cathode-ray tube having means for producing a cathode-ray beam intensity modulated by said luminance signal component and including a fluorescent screen composed of repetitive sets of plural vertically oriented primary-color-related light-emissive phosphor stripes having a composite set width corresponding substantially to the constant-velocity scanning displacement of the cathode-ray beam during an interval having a preselected proportional relation to a cycle of said chrominance carrier signal;

means responsive to said synchronizing signal components for vertically and horizontally deflecting said cathode-ray beam in a synchronizing raster of horizontal scanning lines to reproduce a television image;

means including plural pairs of stripes of vertically oriented secondary emissive and non-emissive materials devoid of visible excitation and spaced horizontally across said screen and positioned in preselected relationship to said phosphor sets for electrically measuring the prevailing position of said beam in relation to said phosphor sets and responsive to such measurement for automatically horizontally deflecting said beam by incremental steps to move the beam in the direction of line scan from the emissive to the non-emissive of said materials and thereby maintain a preselected positional relationship between the scanning position of said beam and the leading edge of said phosphor sets; and means responsive to the amplitude and phase of said chrominance carrier signal for controlling the horizontal direction scan motion of said cathode-ray beam at a periodicity corresponding to said preselected cyclic portion of said chrominance carrier signal to effect substantially uniform-velocity scanning motion of said beam for reproduction of neutral color image areas and to effect variable velocity horizontal scanning motion of said beam at said displacement-internal periodicity for hue selection reproduction of image areas.

17. A color television image reproduction system comprising an input circuit adapted to have applied thereto a color television video signal including synchronizing signal components, a luminance signal component conveying image luminance information, and an amplitude-phase modulated chrominance carrier signal conveying image chrominance information;

an image reproducing cathode-ray tube having means for producing a cathode-ray beam intensity modulated by said luminance signal component and including a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to a cycle of said chrominance carrier signal;

means responsive to said synchronizing signal components for vertically and horizontally deflecting said cathode-ray beam in a synchronized raster of horizontal scanning lines to reproduce a television image;

a grid of equally spaced and vertically oriented stripes of secondary electron emissive material fixedly positioned in preselected relation to said phosphor sets;

means repetitively operative during each horizontal line scan interval for briefly terminating said image reproduction and for briefly establishing a reference standard value of beam current while concurrently halting the motion of said beam at the vicinity of a grid stripe;

means responsive to a characteristic of secondary electron emission during each said halt of said beam for deriving an error-control electrical signal;

means responsive to said signal for automatically horizontally deflecting said beam by incremental steps to maintain a preselected positional relationship between the scanning position of said beam and successive phosphor sets; and means responsive to the amplitude and phase of said chrominance carrier signal for controlling the horizontal-direction scan motion of said cathode-ray beam substantially at said displacement interval periodicity to effect substantially uniform-velocity scanning motion of said beam for reproduction of neutral color image areas and to effect variable velocity horizontal scanning motion of said beam at said displacement-interval periodicity for hue selection reproduction of image areas.

18. A color television image reproduction system comprising an input circuit adapted to have applied thereto a color television video signal including synchronizing signal components, a luminance signal component conveying image luminance information, and an amplitude-phase modulated chrominance carrier signal conveying image chrominance information;

an image reproducing cathode-ray tube having means for producing a cathode-ray beam intensity modulated by said luminance signal component and including a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to a cycle of said chrominance carrier signal;

scanning means responsive to said synchronizing signal components for vertically and horizontally deflecting said cathode-ray beam in a synchronized raster of horizontal scanning lines to reproduce a television image;

a grid of horizontally spaced and vertically oriented stripes of secondary electron emissive material fixedly positioned in preselected relation to said phosphor sets;

means repetitively operative during each horizontal line scan interval for briefly terminating said image reproduction and for briefly establishing a reference standard value of beam current while concurrently halting the motion of said beam at the vicinity of a grid stripe;

means responsive to a characteristic of secondary electron emission during each said halt of said beam for deriving an error-control electrical signal;

means responsive to said signal for automatically horizontally deflecting said beam by incremental steps to maintain a preselected positional relationship between the scanning position of said beam and successive phosphor sets;

means responsive to the amplitude of said error-control signal over each line scan interval for controlling said scanning means to improve the linearity of line scanning effected thereby and to reduce the amplitude of line scanning from the center to each edge of the image reproduction area of said fluorescent screen; and means responsive to the amplitude and phase of said chrominance carrier signal for controlling the horizontal-direction scan motion of said cathode-ray beam at said displacement interval periodicity to effect substantially uniform-velocity scanning motion of said beam for reproduction of neutral color image areas and to effect variable velocity horizontal scanning motion of said beam at said displacement-interval periodicity for hue selection of image areas.

19. A color television image reproduction system comprising an input circuit adapted to have applied thereto a color television video signal including synchronizing signal components, a luminance signal component conveying image luminance information, and an amplitude-phase modulated chrominance carrier signal conveying image chrominance information;

an image reproducing cathode-ray tube having means for producing a cathode-ray beam intensity modulated by said luminance signal component and including a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to a cycle of said chrominance carrier signal;

means responsive to said synchronizing signal components for vertically and horizontally deflecting said cathode-ray beam in a synchronized raster of horizontal scanning lines to reproduce a television image;

means responsive to the phase of said chrominance carrier signal for deriving a hue-selection signal;

means responsive to the amplitude of said chrominance carrier signal for deriving a hue-saturation signal;

means for utilizing said derived signals to control the horizontal-direction scan motion of said cathode-ray beam substantially at said displacement interval periodicity to effect substantially uniform-velocity scanning motion of said beam for reproduction of neutral color image areas and to effect horizontal scanning motion of said beam in discrete steps for hue-selection and hue-saturation reproduction of image areas; and means for combining at least a portion of said hue-selection signal with said luminance signal to increase progressively across the color spectrum the brightness of the colors with which a color image is reproduced.

20. A color television image reproduction system comprising an input circuit adapted to have applied thereto a color television video signal including synchronizing signal components, a luminance signal component conveying image luminance information, and an amplitude-phase modulated chrominance carrier signal conveying image chrominance information;

an image reproducing cathode-ray tube having means for producing a cathode-ray beam intensity modulated by said luminance signal component and including a fluorescent screen composed of repetitive sets of plural vertically-oriented primary-color related light-emissive phosphor stripes having a composite set width corresponding substantially to the constant-velocity scanning displacement of the cathode-ray beam during an interval having a preselected proportional relation to a cycle of said chrominance carrier signal;

means responsive to said synchronizing signal components for vertically and horizontally deflecting said cathode-ray beam in a synchronized raster of horizontal scanning lines to reproduce a television image;

means responsive to the phase of said chrominance carrier signal for deriving a hue-selection signal;

means responsive to the amplitude of said chrominance carrier signal for deriving a hue-saturation signal;

means for utilizing said derived signals to control the horizontal-direction scan motion of said cathode-ray beam substantially at said displacement interval periodicity to effect substantially uniform-velocity scanning motion of said beam for reproduction of neutral color image areas and to effect horizontal scanning motion of said beam in steps for hue-selection and hue-saturation reproduction of image areas; and means responsive to the amplitude of said hue-saturation signal for effecting a proportional partial increase of the prevailing amplitude of said brightness signal effectively to enhance the saturation of image color reproduction.

21. In a color television receiver, a saturation signal generator comprising an input circuit adapted to have applied thereto a color television video signal including a luminance signal component conveying image luminance information and an amplitude-phase modulated chrominance carrier signal conveying image chrominance information and a limited amount of image brightness information;

means responsive to the phase and amplitude of said carrier signal for deriving therefrom a signal representative of brightness information conveyed thereby and for combining said derived signal and said luminance signal component to provide a brightness signal;

a pair of conductance-control devices having output electrodes, having first conductance-control electrodes electrically coupled together and degeneratively coupled through a resistor to the output electrode of one of said devices, and having second conductance-control electrodes; and means for supplying said brightness signal to the second conductance-control electrode of said one device and for supplying said chmrominance carrier signal to the second conductance-control electrode of the other of said devices to derive in an output-electrode circuit of said other device a phase-amplitude modulated chrominance carrier signal having an amplitude representative of chrominance saturation and a phase representative of hue for all values of said brightness signal.

22. In a color television receiver, a saturation signal generator comprising an input circuit adapted to have applied thereto a color television video signal including a luminance signal component conveying image luminance information and an amplitude-phase modulated chrominance carrier signal conveying image chrominance information and a limited amount of image brightness information, means responsive to the phase and amplitude of said carrier signal for deriving therefrom a signal representative of brightness information conveyed thereby and for combining said derived signal and said luminance signal component to provide a brightness signal, a pair of amplifiers each including a multi-control-electrode vacuum tube of which a high-transconductance control electrode of each tube is electrically connected to a high-transconductance control electrode of the other and a high-transconductance electrode of one tube is degeneratively coupled through a resistor to the anode electrode of the one tube, and means for supplying said brightness signal to a low-transconductance control electrode of said one tube and for supplying said chrominance carrier signal to a low-transconductance electrode of said other tube to derive in an output circuit of said other tube a phase-amplitude modulated carrier signal having an amplitude accurately representative of chrominance saturation for all amplitude values of said brightness signal.

23. A color television image reproduction system comprising means having an input circuit adapted to receive a chrominance carrier type of color television video signal having a chrominance carrier signal of hue selective phase accompanied by a reference burst synchronizing signal component and including a cathode ray image reproduction tube for reproducing from said signal a monochrome television image, said tube having a fluorescent screen composed of repetitive sets of plural primary-color-related light-emissive phosphor stripes oriented transverse to the line scanning direction and having a composite set width corresponding substantially to the constant-velocity scanning displacement of the cathode-ray beam during an interval having a preselected proportional relation to the cyclic period of the chrominance carrier signal, said screen including a plurality of beam-position indexing stripe elements oriented transverse to the line scanning direction and spaced across said screen in like preselected positional relationship to said phosphor stripe sets to provide by line scan of said beam periodic changes of an emissive energy level indicative of a prevailing scan positional relationship between said beam and successive ones of said indexing stripe elements, means operative at error correction intervals recurring at a periodicity proportionally related to said displacement-interval periodicity for utilizing each of successive ones of said emissive energy level changes to effect during each said correction interval a corresponding individual deflection adjustment of the prevailing scan position of said beam in a preselected scan direction and by a scan displacement amount leaving said beam at the conclusion of said each error correction interval preselectably positioned at least partially to one side of the edge of a corresponding indexing stripe element, means responsive to said reference burst synchronizing signal component of said video signal for providing a phase-reference subcarrier signal, means responsive to the amplitude of said chrominance carrier signal for controlling the horizontal-direction scan motion of said cathode ray beam at substantially said displacement-interval periodicity to effect substantially uniform-velocity scanning motion of said beam during reproduction of neutral color image areas and to effect horizontal scanning motion of said beam by variable velocity at a preselected periodicity proportionally related to the period of said phase-reference subcarrier signal for color saturation reproduction of image areas, means controlled by said phase-reference sub-carrier signal for establishing a preselected hue reference phase of said variable velocity scanning motion of said beam, and means responsive to the phase difference between said chrominance carrier and subcarrier signals for controlling the horizontal-direction beam displacement position for hue selection reproduction of the color image areas.

24. A color television image reproduction system comprising means having an input circuit adapted to receive a chrominance carrier type of color television video signal having a chrominance carrier signal with chrominance phase and cyclic periodicity and including a cathode ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to the cyclic period of the chrominance carrier signal, said screen including a plurality of beam-position indexing stripe elements vertically oriented and spaced horizontally across said screen in preselected positional relationship to said phosphor stripe sets and adapted upon movement of the cathode-ray beam across each thereof to effect a change of an emissive energy level indicative of the positional relationship between said beam and said each indexing stripe element, means operative during each of periodic error correction intervals for establishing a finite minimum value of cathode-ray beam current and for deflecting said beam during each succeeding error correction interval to the region of successive ones of said indexing stripe elements, means for utilizing said changes of emissive energy level during each of said error corrective intervals for adjusting the prevailing horizontal deflection position of said beam throughout each line scan forward trace thereof to maintain a preselected positional relationship thereof to said indexing stripe elements, means responsive to the amplitude and phase of said chrominance carrier signal for controlling between error correction intervals the horizontal-direction scan motion of said cathode ray beam at said displacement-interval periodicity to effect substantially uniform-velocity scanning motion of said beam during reproduction of neutral color image areas and to effect horizontal scanning motion of said beam in steps for hue selection reproduction of image areas, and means effective to alter a waveform characteristic of said cyclic chrominance carrier signal and for utilizing said altered waveform to modulate said cathode ray beam to effect hue saturation reproduction of image areas.

25. A color television image reproduction system comprising means having an input circuit adapted to receive a chrominance carrier type of color television video signal having a chrominance carrier signal of hue selective phase accompanied by a reference burst synchronizing signal component and including a cathode ray image reproduction tube and means for deflecting the cathode ray beam thereof in rasters of scanning lines to reproduce from said signal a monochrome television image, said tube having a fluorescent screen composed of repetitive sets of plural primary-color-related light-emissive phosphor stripes oriented transverse to the line scanning direction and having a composite set width corresponding substantially to the constant-velocity scanning displacement of the cathode-ray beam during an interval having a preselected proportional relation to the cyclic period of the chrominance carrier signal, said screen including a plurality of beam-position indexing stripe elements oriented transverse to the line scanning direction and spaced across said screen in like preselected positional relationship to said phosphor stripe sets to provide by line scan of said beam periodic changes of an emissive energy level indicative of a prevailing scan positional relationship between said beam and successive ones of said indexing stripe elements, error control means operative at error correction intervals recurring at a periodicity proportionally related to said displacement-interval periodicity for utilizing each of successive ones of said emissive energy level changes to effect during each said correction interval a corresponding individual deflection adjustment of the prevailing scan position of said beam in a preselected scan direction and by a scan displacement amount leaving said beam at the conclusion of said each error correction interval preselectably positioned at least partially to one side of the edge of a corresponding indexing stripe element, means responsive to the amplitude and phase of said chrominance carrier signal for controlling the horizontal-direction scan motion of said cathode ray beam at said displacement-interval periodicity to effect during reproduction of neutral color image areas substantially uniform-velocity scanning motion of said beam positionally related to said phosphor stripe sets and to effect horizontal scanning motion of said beam in steps positionally related to said phosphor stripe sets for hue selection reproduction of image areas, and means for utilizing said changes of emissive energy levels during each line scanning interval for controlling the linearity and amplitude of line scanning effected by said scanning means to minimize the correction required to be effected by said error control means from the center to each edge of the image reproduction area of said screen.

26. A color television image reproduction system comprising means having an input circuit adapted to receive a chrominance carrier type of color television video signal having a chrominance carrier signal of hue selective phase accompanied by a reference burst synchronizing signal component and including a cathode-ray image reproduction tybe for reproducing from said signal a monochrome television image, said tube having a fluorescent screen composed of repetitive sets of plural vertically-oriented primary-color-related light-emissive phosphor stripes having a composite set width corresponding substantially to the constant-velocity scan displacement of the cathode-ray beam during an interval having a preselected proportional relation to the cyclic period of the chrominance carrier signal, means responsive to said reference burst synchronizing signal component of said video signal for providing a phase-reference subcarrier signal, means for generating a signal of substantially linear saw-tooth waveform having a rapid retrace interval phase-locked at said preselected proportional relation to said reference subcarrier signal and having an amplitude varying with the amplitude of said chrominance carrier signal for hue saturation in image area reproduction, means responsive to the phase difference between said chrominance carrier and subcarrier signals for developing a signal having an amplitude varying with said phase difference for hue selection in image area reproduction, and means for concurrently utilizing said last-mentioned developed signals for variable velocity line scan control displacement of said cathode-ray beam for image reproduction.

27. A color television image reproduction system comprising an input circuit adapted to have applied thereto a color television video signal including synchronizing signal components, a luminance signal component conveying image luminance information, and an amplitude-phase modulated chrominance carrier signal conveying image chrominance information, means responsive to the phase and amplitude of said carrier signal for deriving therefrom a signal representative of brightness information conveyed by said carrier signal and for combining said derived signal and said luminance signal component to provide a brightness signal, an image reproducing cathode-ray tube having means for producing a cathode-ray beam intensity modulated by said brightness signal and including a fluorescent screen composed of repetitive sets of plural vertically-oriented primary-color-related light-emissive phosphor stripes having a composite set width corresponding substantially to the constant-velocity scanning displacement of the cathode-ray beam during an interval equal to a preselected portion of a cycle of said chrominance carrier signal; means responsive to said synchronizing signal components for vertically and horizontally deflecting said cathode-ray beam in a synchronized raster of horizontal scanning lines to reproduce a televsion image, means for deriving from said chrominance carrier signal an amplitude-phase modulated chrominance carrier signal devoid of brightness information, means for phase detecting one of said carrier signals to derive a unidirectional hue selection potential having an amplitude varying with the phase thereof, means responsive jointly to said derived carrier signal and to said brightness signal for deriving a unidirectional saturation-control potential having an amplitude varying with the ratio of derived carrier signal amplitude to brightness signal amplitude, and means for utilizing said derived potentials to control the horizontal-direction scan motion of said cathode-ray beam at a periodicity corresponding to said preselected cyclic portion of said chrominance carrier signal to effect substantially uniform-velocity scanning motion of said beam for zero amplitude of said saturation-control potential to reproduce neutral color image areas and to effect variable velocity scanning motion of said beam for finite amplitudes of said saturation-control potential and with horizontal displacements thereof controlled by the amplitude of said hue selection potential for hue-saturation reproduction of image areas.

28. A color television image reproduction system comprising means having an input circuit adapted to receive a chrominance carrier type of color television video signal having a chrominance carrier signal with chrominance reference phase and cyclic periodicity and including a cathode-ray image reproduction tube for reproducing from said signal a monochrome television image, said tube having a fluorescent screen composed of repetitive sets of plural vertically-oriented primary-color-related light-emissive phosphor stripes having a composite set width corresponding substantially to the constant-velocity scanning displacement of the cathode-ray beam during an interval having a preselected proportional relation to said reference cyclic periodicity, said screen including a plurality of beam-position indexing stripe elements vertically oriented and spaced horizontally across said screen in preselected positional relationship to said phosphor stripe sets to provide by beam scan periodic changes of an emissive energy level indicative of a prevailing horizontal positional relationship between said beam and successive ones of said indexing stripe elements, means for utilizing said periodic changes of emissive energy level for periodically adjusting the prevailing horizontal deflection position of said beam during each line scan interval to maintain a preselected beam-scan positional relationship thereof to said indexing stripe elements and thereby to said phosphor stripe sets, means responsive to the amplitude and phase of said chrominance carrier signal for controlling the horizontal-direction scan motion of said cathode-ray beam at said displacement-interval periodicity and during the intervals between successive ones of said emissive energy level changes to effect substantially uniform-velocity scanning motion of said beam during reproduction of neutral color image areas and to effect variable velocity horizontal scanning motion of said beam at said displacement-interval periodicity for hue selection reproduction of image areas, and means operative at said energy level change periodicity and during image reproduction intervals for rapidly and automatically displacing the beam across any indexing stripe element encountered by the beam during such image reproduction intervals.

References Cited by the Examiner

UNITED STATES PATENTS

| | | | |
|---|---|---|---|
| 2,689,269 | 9/1954 | Bradley | 178—5.4 |
| 2,798,114 | 7/1957 | Schlesinger | 178—5.4 |
| 2,966,544 | 12/1960 | Gargini | 178—5.4 |
| 2,989,582 | 6/1961 | Zworykin et al. | 178—5.4 |
| 2,990,449 | 6/1961 | Valensi | 178—5.4 |
| 3,004,098 | 10/1961 | Gargini | 178—5.4 |
| 3,096,395 | 7/1963 | Gargini | 178—5.4 |
| 3,235,656 | 2/1966 | Loughlin | 178—5.4 |

DAVID G. REDINBAUGH, *Primary Examiner.*

J. A. O'BRIEN, *Assistant Examiner.*